(12) United States Patent
Flint et al.

(10) Patent No.: US 10,048,757 B2
(45) Date of Patent: Aug. 14, 2018

(54) DEVICES AND METHODS FOR CONTROLLING MEDIA PRESENTATION

(71) Applicant: Apple Inc., Cupertino, CA (US)

(72) Inventors: Gary Flint, Santa Cruz, CA (US); Stefan Hafeneger, San Francisco, CA (US)

(73) Assignee: APPLE INC., Cupertino, CA (US)

(*) Notice: Subject to any disclaimer, the term of this patent is extended or adjusted under 35 U.S.C. 154(b) by 266 days.

(21) Appl. No.: 14/866,159

(22) Filed: Sep. 25, 2015

(65) Prior Publication Data

US 2016/0259412 A1 Sep. 8, 2016

Related U.S. Application Data

(60) Provisional application No. 62/129,941, filed on Mar. 8, 2015.

(51) Int. Cl.
| | |
|---|---|
| G06F 3/0488 | (2013.01) |
| G06F 3/01 | (2006.01) |
| G11B 27/00 | (2006.01) |
| H04N 21/472 | (2011.01) |
| G06F 3/16 | (2006.01) |

(52) U.S. Cl.
CPC ............ *G06F 3/016* (2013.01); *G06F 3/0488* (2013.01); *G06F 3/165* (2013.01); *G11B 27/005* (2013.01); *H04N 21/47217* (2013.01)

(58) Field of Classification Search
CPC ......... G06F 3/0488; G06F 3/016; G06F 3/165
See application file for complete search history.

(56) References Cited

U.S. PATENT DOCUMENTS

| | | |
|---|---|---|
| 4,674,044 A | 6/1987 | Kalmus et al. |
| 4,750,135 A | 6/1988 | Boilen |
| 4,864,520 A | 9/1989 | Setoguchi et al. |
| 4,903,201 A | 2/1990 | Wagner |
| 5,038,284 A | 8/1991 | Kramer |

(Continued)

FOREIGN PATENT DOCUMENTS

| | | |
|---|---|---|
| AU | 2016100649 A4 | 6/2016 |
| CA | 2 355 434 A1 | 2/2002 |

(Continued)

OTHER PUBLICATIONS

Anonymous, "Nokia 808 PureView screenshots", retrieved from Internet; no URL, Nov. 12, 2012, 8 pages.

(Continued)

*Primary Examiner* — Andrea Leggett
(74) *Attorney, Agent, or Firm* — Morgan, Lewis & Bockius LLP

(57) ABSTRACT

An electronic device is configured to: while presenting media content at a first non-zero playback speed, detect a press input by a first contact on a first media control; and, in response to detecting the press input: determine whether an intensity of the first contact is above a first intensity threshold; if the intensity of the first contact is above the first intensity threshold, present the media content at a second playback speed, where the second playback speed is faster than the first non-zero playback speed; and, if the intensity of the first contact is below the first intensity threshold, maintain presentation of the media content at the first non-zero playback speed.

21 Claims, 33 Drawing Sheets

(56) References Cited

U.S. PATENT DOCUMENTS

| | | |
|---|---|---|
| 5,077,665 A | 12/1991 | Silverman et al. |
| 5,101,353 A | 3/1992 | Lupien et al. |
| 5,136,501 A | 8/1992 | Silverman et al. |
| 5,184,120 A | 2/1993 | Schultz |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,428,730 A | 6/1995 | Baker et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagallo |
| 5,689,651 A | 11/1997 | Lozman |
| 5,695,400 A | 12/1997 | Fenell, Jr. et al. |
| 5,710,896 A | 1/1998 | Seidl |
| 5,717,438 A | 2/1998 | Kim et al. |
| 5,717,725 A | 2/1998 | Campana, Jr. |
| 5,719,796 A | 2/1998 | Chen |
| 5,727,165 A | 3/1998 | Ordish et al. |
| 5,736,656 A | 4/1998 | Fullen et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A | 2/2000 | Cordell |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,121,960 A | 9/2000 | Carroll et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,243,080 B1 | 6/2001 | Molne |
| 6,247,000 B1 | 6/2001 | Hawkins et al. |
| 6,252,594 B1 | 6/2001 | Xia et al. |
| 6,266,684 B1 | 7/2001 | Kraus et al. |
| 6,272,474 B1 | 8/2001 | Garcia |
| 6,278,982 B1 | 8/2001 | Korhammer et al. |
| 6,282,521 B1 | 8/2001 | Howorka |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 6,954,899 B1 | 10/2005 | Anderson |
| 7,036,088 B2 | 4/2006 | Tunney |
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |
| 7,441,204 B2 | 10/2008 | Thomson et al. |
| 7,461,026 B2 | 12/2008 | Schluetter |
| 7,479,949 B2 | 1/2009 | Jobs et al. |
| 7,492,720 B2 | 2/2009 | Pruthi et al. |
| 7,532,206 B2 | 5/2009 | Morrison et al. |
| 7,533,352 B2 | 5/2009 | Chew et al. |
| 7,552,397 B2 | 6/2009 | Holecek et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,629,966 B2 | 12/2009 | Anson |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas-Ribikauskas et al. |
| 7,694,231 B2 | 4/2010 | Kocienda et al. |
| 7,694,236 B2 | 4/2010 | Gusmorino et al. |

(56) References Cited

U.S. PATENT DOCUMENTS

| | | |
|---|---|---|
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Luttter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,271,900 B2 | 9/2012 | Walizaka et al. |
| 8,279,180 B2 | 10/2012 | Hotelling et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,479,122 B2 | 7/2013 | Hotelling et al. |
| 8,482,535 B2 | 7/2013 | Pryor |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,046,999 B1 | 6/2015 | Teller et al. |
| 9,058,186 B2 | 6/2015 | Chaudhri |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0140740 A1 | 10/2002 | Chen |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |

(56) References Cited

U.S. PATENT DOCUMENTS

| | | |
|---|---|---|
| 2002/0186257 A1 | 12/2002 | Cadiz et al. |
| 2003/0001869 A1 | 1/2003 | Nissen |
| 2003/0074413 A1 | 4/2003 | Nielsen et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0119562 A1 | 6/2003 | Kokubo |
| 2003/0122779 A1 | 7/2003 | Martin et al. |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0022138 A1 | 1/2005 | Tunney |
| 2005/0039141 A1 | 2/2005 | Burke et al. |
| 2005/0073961 A1 | 4/2005 | Paik et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0145045 A1 | 7/2005 | Papakostas et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0031776 A1 | 2/2006 | Glein et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0224989 A1 | 10/2006 | Pettiross et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152959 A1 | 7/2007 | Peters |
| 2007/0152980 A1 | 7/2007 | Kocienda et al. |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270186 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2007/0299923 A1 | 12/2007 | Skelly et al. |
| 2008/0001924 A1 | 1/2008 | de los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |

(56) References Cited

U.S. PATENT DOCUMENTS

| | | |
|---|---|---|
| 2008/0222545 A1 | 9/2008 | Lemay et al. |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Chou |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0197635 A1 | 8/2009 | Kim et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293007 A1 | 11/2009 | Duarte et al. |
| 2009/0293009 A1 | 11/2009 | Meserth et al. |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0090988 A1 | 4/2010 | Park |
| 2010/0110082 A1 | 5/2010 | Myrick et al. |
| 2010/0111434 A1 | 5/2010 | Madden |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0018695 A1 | 1/2011 | Bells et al. |
| 2011/0035145 A1 | 2/2011 | Yamasaki |
| 2011/0035662 A1 | 2/2011 | King et al. |
| 2011/0043652 A1 | 2/2011 | King et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |

(56) References Cited

U.S. PATENT DOCUMENTS

| | | |
|---|---|---|
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0107272 A1 | 5/2011 | Aquilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167369 A1 | 7/2011 | van Os |
| 2011/0167382 A1 | 7/2011 | Van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296333 A1 | 12/2011 | Bateman et al. |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0086666 A1 | 4/2012 | Badaye et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |

(56) References Cited

U.S. PATENT DOCUMENTS

| | | |
|---|---|---|
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097564 A1 | 4/2013 | Kermoian et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120295 A1 | 5/2013 | Kim et al. |
| 2013/0120306 A1 | 5/2013 | Furukawa |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0305184 A1 | 11/2013 | Kim et al. |
| 2013/0307792 A1 | 11/2013 | Andres et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1* | 2/2014 | Nagar ............... G06F 3/016 345/173 |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0063316 A1 | 3/2014 | Lee et al. |
| 2014/0063541 A1 | 3/2014 | Yamazaki |
| 2014/0072281 A1* | 3/2014 | Cho ............... G11B 20/10 386/282 |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0118268 A1 | 5/2014 | Kuscher |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |

(56) References Cited

U.S. PATENT DOCUMENTS

| | | |
|---|---|---|
| 2014/0253305 A1 | 9/2014 | Rosenberg et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0067559 A1 | 2/2015 | Missig et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067560 A1 | 3/2015 | Cieplinski et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0067563 A1 | 5/2015 | Bernstein et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1* | 7/2015 | Golyshko ............... G06F 3/016 715/702 |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0139565 A1 | 5/2017 | Choi |
| 2018/0024681 A1 | 1/2018 | Bernstein et al. |

FOREIGN PATENT DOCUMENTS

| | | |
|---|---|---|
| CN | 1658150 | 8/2005 |
| CN | 1661556 | 8/2005 |
| CN | 1808362 A | 7/2006 |
| CN | 1955906 | 5/2007 |
| CN | 101102573 | 1/2008 |
| CN | 101118469 A | 2/2008 |
| CN | 101202866 A | 6/2008 |
| CN | 101222704 A | 7/2008 |
| CN | 201107762 | 8/2008 |
| CN | 101320303 A | 12/2008 |
| CN | 100524183 | 8/2009 |
| CN | 101593077 A | 12/2009 |
| CN | 101727268 | 6/2010 |
| CN | 101809526 A | 8/2010 |
| CN | 102004593 A | 4/2011 |

(56) References Cited

FOREIGN PATENT DOCUMENTS

| | | |
|---|---|---|
| CN | 102037435 | 4/2011 |
| CN | 102099776 | 6/2011 |
| CN | 102112946 A | 6/2011 |
| CN | 102160021 A | 8/2011 |
| CN | 102385478 A | 3/2012 |
| CN | 102438092 A | 5/2012 |
| CN | 102483677 A | 5/2012 |
| CN | 102662573 A | 9/2012 |
| CN | 102841677 A | 12/2012 |
| CN | 103097992 A | 5/2013 |
| DE | 100 59 906 A1 | 6/2002 |
| DE | 102 24 155 C1 | 12/2003 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1 406 150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 375307 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 437 145 A1 | 4/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 A | 3/2011 |
| GB | 2 474 153 A | 4/2011 |
| JP | 58-182746 | 10/1983 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2000-148348 A | 5/2000 |
| JP | 2001-202192 A | 7/2001 |
| JP | 2002-041023 A | 2/2002 |
| JP | 2002-149312 A | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-222553 A | 8/2005 |
| JP | 2005-309933 A | 11/2005 |
| JP | 2006-185443 A | 7/2006 |
| JP | 2007-116384 A | 5/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-516348 A | 5/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2009-217815 A | 9/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-192179 A | 9/2011 |
| JP | 2011-192215 A | 9/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |

(56) References Cited

FOREIGN PATENT DOCUMENTS

| | | |
|---|---|---|
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-140112 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0023637 | 3/2010 |
| KR | 2010-0034608 | 4/2010 |
| KR | 2010 0046087 | 6/2010 |
| KR | 2010 0133246 A | 12/2010 |
| KR | 2011 0086501 A | 7/2011 |
| KR | 20120103670 A | 9/2012 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/073020 A1 | 7/2006 |
| WO | WO 2006/094308 A2 | 9/2006 |
| WO | WO 2007/121557 A1 | 11/2007 |
| WO | WO 2008/030976 A2 | 3/2008 |
| WO | WO 2006/043209 A1 | 4/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2010/122813 A1 | 10/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169300 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |

OTHER PUBLICATIONS

Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.

B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.

Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.

Clark, "Global Moxie, Touch Means a Renaissance for Radial Menus," http://globalmoxie.com/blog/radial-menus-for-touch-ui~print.shtml, Jul. 17, 2012, 7 pages.

Cohen, Cinemagraphs are Animated Gifs for Adults, http://www.tubefilter.com/2011/07/10/cinemagraph, Jul. 10, 2011, 3 pages.

Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.

Flaherty, "Is Apple Watch's Pressure-Sensitive Screen A Bigger Deal Than the Gadget Itself?", http://www.wired.com/2014/09/apple-watchs-pressure-sensitive-screen-bigger-deal-gadget, Sep. 15, 2014, 3 pages.

iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.

Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.

Kumar, "How to Enable Ripple Effect on Lock Screen of Galaxy S2", YouTube, http, http://www.youtube.com/watch?v+B9-4M5abLXA, Feb. 12, 2013, 3 pages.

Laurie, "The Power of the Right Click," http://vlaurie.com/right-click/customize-context-menu.html, 2002-2016, 3 pages.

Matthew, "How to Preview Photos and Images From Right-Click Context Menue in Windows [Tip], https://dottech.org/159009/add-image-preview-in-windows-context-menu-tip", Jul. 4, 2014, 5 pages.

Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.

(56) References Cited

OTHER PUBLICATIONS

Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
VGJFeliz, "How to Master Android Lollipop Notifications in Four Minutes!", https://www.youtube.com/watch?v=S-zBRG7GJgs, Feb. 8, 2015, 5 pages.
Wikipedia, "Context Menu," Wikipedia, the free encyclopedia https://en.wikipedia.org/wiki/Context menu, Last Modified May 15, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Office Action, dated Oct. 18, 2016, received in Australian Patent Application No. 2013368440, which corresponds with U.S. Appl. No. 14/536,426, 3 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Certificate of Grant, dated Sep. 15, 2016, received in Australian Patent Australian Patent Application No. 2013259606, which corresponds with U.S. Appl. No. 14/536,426, 1 page.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Certificate of Grant, dated Jul. 29, 2016, received in Australian Patent Application No. 2013368441, which corresponds with U.S. Appl. No. 14/608,926, 1 page.
Notice of Allowance, dated Jul. 5, 2016, received in Australian Patent Application No. 2013259613, which corresponds with U.S. Appl. No. 14/536,646, 3 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Certificate of Grant, dated Jul. 7, 2016, received in Australian Patent Application No. 2013368443, which corresponds with U.S. Appl. No. 14/536,141, 3 pages.
Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/536,141, 4 pages.
Office Action, dated Aug. 1, 2016, received in U.S. Appl. No. 14/536,203, 14 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Jul. 22, 2016, received in European Office Action No. 13798465.4, which corresponds with U.S. Appl. No. 14/608,965, 8 pages.
Office Action, dated Oct. 20, 2016, received in U.S. Appl. No. 14/536,247, 10 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.
Notice of Allowance, dated Sep. 26, 2016, eceived in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Office Action, dated Mar. 31, 2016, received in U.S. Appl. No. 14/864,737, 17 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.

(56) References Cited

OTHER PUBLICATIONS

Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action (Search Report), dated Mar. 30, 2016, received in Australian Patent Application No. 201500588, which corresponds with U.S. Appl. No. 14/868,078, 9 pages.
Office Action, dated Sep. 2, 2016, received in Australian Patent Application No. 201500588, which corresponds with U.S. Appl. No. 14/868,078, 4 pages.
Office Action, dated May 9, 2016, received in U.S. Appl. No. 14/863,432, 26 pages.
Office Action, dated Aug. 19, 2016, received in Australian Patent Application No. 2016100647, which corresponds with U.S. Appl. No. 14/863,432, 5 pages.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Patent, dated Aug. 8, 2016, received in Australian Patent Application 2016100653, corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Innovation Patent, dated Sep. 22, 2016, received in Australian Patent Application No. 2016101418, which corresponds with U.S. Appl. No. 14/866,992, 1 page.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Office Action, dated Oct. 7, 2016, received in Danish Patent Application No. 201500585, which corresponds with U.S. Appl. No. 14/864,627, 3 pages.
Notice of Allowance, dated Jul. 19, 2016, received in U.S. Appl. No. 14/866,361, 8 pages.

(56) References Cited

OTHER PUBLICATIONS

Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Intention to Grant, dated Jun. 10, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Certificate of Exam, dated Jul. 21, 2016, received in Australian Patent Application No. 2016100652, which corresponds with U.S. Appl. No. 14/866,989, 1 page.
Intention to Grant, dated Jun. 10, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action and Search Report, dated Jun. 9, 2016, received in Danish Patent Application No. 201500596, which corresponds with U.S. Appl. No. 14/870,882, 9 pages.
Office Action, dated Oct. 17, 2016, received in Australian Patent Application No. 2016203040, which corresponds with U.S. Appl. No. 14/871,227, 7 pages.
Oct. 18, 2016, received in Australian Patent Application No. 2016101431, which corresponds with U.S. Appl. No. 14/871,227, 3 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, Sep. 14, 2016, received in Danish Patent Application No. 201500598, which corresponds with U.S. Appl. No. 14/867,892, 4 pages.
Office Action, dated Jul. 5, 2016, received in Chinese Patent Application No. 201620176221.9, which corresponds with U.S. Appl. No. 14/867,990, 4 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Aug. 29, 2016, received in International Patent Application No. PCT/US2016/021400, which corresponds with U.S. Appl. No. 14/869,899, 48 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Sood, "MultitaskingGestures", http://cydia.saurik.com/package/org.thebigboxx.multitaskinggestures/, Mar. 3, 2014, 2 pages.
YouTube, "How to Master Android Lollipop Notifications in Four Minutes!", Video Gadgets Journal (VGJFelix), https://www.youtube.com/watch?v=S-z8RG7GGJgs, Feb. 8, 2015, 4 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in A Tap", https://www.youtube.com/watch?v=qailSHRgsTo, May 15, 2015, 1 page.
Office Action, dated Jun. 29, 2017, received in U.S. Appl. No. 14/608,895, 30 pages.
Certificate of Grant, dated Apr. 29, 2017, received in Australian Patent Application No. 2013368440, which corresponds with U.S. Appl. No. 14/536,426, 3 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.

(56) References Cited

OTHER PUBLICATIONS

Office action, dated Aug. 3, 2017, received in U.S. Appl. No. 14/536,426, 10 pages.
Office Action, dated May 15, 2017, received in Australian Patent Application No. 2016216580, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Final Office Action, dated Aug. 25, 2017, received in U.S. Appl. No. 14/536,464, 30 pages.
Office Action, dated Sep. 25, 2017, received in U.S. Appl. No. 14/536,644, 29 pages.
Office Action, dated Oct. 19, 2017, received in U.S. Appl. No. 14/608,926, 14 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 2017-7018250, which corresponds with U.S. Appl. No. 14/608,926, 2 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Patent, dated May 26, 2017, received in European Patent Application No. 13724102.2, which corresponds with U.S. Appl. No. 14/536,646, 1 page.
Notice of Allowance, dated Sep. 20, 2017, received in U.S. Appl. No. 14/536,141, 10 pages.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Office Action, dated Jun. 16, 2017, received in Chinese Patent Application No. 201380068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Oct. 25, 2017, received in Chinese Patent Application No. 201380035977.0, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Notice of Allowance, dated Oct. 30, 2017, received in Korean Patent Application No. 2016-7033834, which correponds with U.S. Appl. No. 14/536,203, 5 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Office Action, dated Sep. 13, 2017, received in European Patent Application No. 16177863.4, which corresponds with U.S. Appl. No. 14/536,267, 6 pages.
Notice of Allowance, dated Sep. 1, 2017, received in Korean Patent Application No. 2016-7029533, which corresponds with U.S. Appl. No. 14/536,267, 4 pages.
Office Action, dated Jul. 21, 2017, received in Australian Patent Application No. 2016216658, which corresponds with U.S. Appl. No. 14/536,291, 3 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Notice of Allowance, dated Sep. 19, 2017, received in Chinese Patent Application No. 201380068399.0, which corresponds with U.S. Appl. No. 14/608,985, 3 pages.
Summons, dated Oct. 6, 2017, received in European Patent Application No. 13811032.5, which corresponds with U.S. Appl. No. 14/608,985, 6 pages.
Notice of Allowance, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Patent, dated Jul. 12, 2017, received in Dutch Patent Application No. 2016452, which corresponds with U.S. Appl. No. 14/864,737, 2 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.

(56) References Cited

OTHER PUBLICATIONS

Notice of Allowance, dated Sep. 1, 2017, received in Australian Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Office Action, dated Jun. 12, 2017, received in Danish Patent Application No. 201500582, which corresponds with U.S. Appl. No. 14/863,432, 5 pages.
Grant, dated Jul. 21, 2017, received in Dutch Patent Application No. 2016801, which corresponds with U.S. Appl. No. 14/871,227, 8 pages.
Notice of Allowance, dated Oct. 4, 2017, received in U.S. Appl. No. 14/866,511, 37 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Sep. 22, 2017, received in Japanese Patent Application No. 2017-029201, which corresponds with U.S. Appl. No. 14/857,636 8 pages.
Office Action, dated Oct. 11, 2017, received in U.S. Appl. No. 14/857,700, 13 pages.
Office Action, dated Jun. 15, 2017, received in Danish Patent Application No. 201500579, which corresponds with U.S. Appl. No. 14/866,361, 2 pages.
Notice of Allowance, dated Sep. 29, 2017, received in Danish Patent Application No. 201670463, which corresponds with U.S. Appl. No. 14/866,987, 2 pages.
Notice of Allowance, dated Sep. 22, 2017, received in Japanese Patent Application No. 2016-233449, which corresponds with U.S. Appl. No. 14/866,987, 5 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Sep. 1, 2017, received in U.S. Appl. No. 14/870,754, 22 pages.
Notice of Allowance, dated Oct. 31, 2017, received in Danish Patent Application No. 201500596, which corresponds with U.S. Appl. No. 14/870,882, 2 pages.
Office Action, dated Sep. 1, 2017, received in U.S. Appl. No. 14/870,988, 14 pages.
Office Action, dated Oct. 16, 2017, received in Australian Patent Application No. 2016203040, which corresponds with U.S. Appl. No. 14/871,227, 5 pages.
Office Action, dated Aug. 4, 2017, received in Japanese Patent Application No. 2016-533201, which corresponds with U.S. Appl. No. 14/871,227, 6 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Apr. 20, 2017, received in Chinese Patent Application No. 201621044346.2, which corresponds with U.S. Appl. No. 14/871,462, 3 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Final Office Action, dated Aug. 18, 2017, received in U.S. Appl. No. 14/869,873, 20 pages.
Final Office Action, dated Jun. 2, 2017, received in U.S. Appl. No. 15/081,771, 17 pages.
Office Action, dated Aug. 29, 2017, received in Korean Patent Application No. 2017-7014536, which corresponds with U.S. Appl. No. 15/081,771, 5 pages.
Notice of Allowance, dated Oct. 20, 2017, received in U.S. Appl. No. 15/136,782, 9 pages.
Office Action, dated May 23, 2017, received in Danish Patent Application No. 201770190, which corresponds with U.S. Appl. No. 15/136,782, 7 pages.
Notice of Allowance, dated Jul. 6, 2017, received in U.S. Appl. No. 15/231,745, 18 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Office Action, dated Oct. 16, 2017, received in Danish Patent Application No. 201770710, 10 pages.
Office Action, dated Aug. 30, 2017, received in U.S. Appl. No. 15/655,749, 22 pages.
Office Action, dated Oct. 31, 2017, received in U.S. Appl. No. 15/723,069, 7 pages.
Search Report, dated Apr. 13, 2017, received in Dutch Patent Application No. 2016452, which corresponds with U.S. Appl. No. 14/864,737, 22 pages.

(56) References Cited

OTHER PUBLICATIONS

Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Extended European Search Report, dated Oct. 17, 2017, received in European Patent Application No. 17184437.6, Which corresponds with U.S. Appl. No. 14/868,078, 8 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Oct. 10, 2017, received in European Patent Application No. 17188507.2, which corresponds with U.S. Appl. No. 14/866,361, 9 pages.
Extended European Search Report, dated Jun. 22, 2017, received in European Patent Application No. 16189421.7, which corresponds with U.S. Appl. No. 14/866,987, 7 pages.
Extended European Search Report, dated Sep. 11, 2017, received in European Patent Application No. 17163309.2, which corresponds with U.S. Appl. No. 14/866,987, 8 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Alzona, "Full Screen Maximization with RightZoom," http://www.brighhub.com/computing/mac-platform/articles/31024.aspx>, Mar. 31, 2009, 6 pages.
Apple Inc., "iPhone User Guide for iPhone and iPhone 3G," http://manuals.info.apple.com/en_US/iPhone_User_Guide.pdf, Jul. 11, 2008, 154 pages.
Ask.MetaFilter, "Enable Screen Resize?" ask. Metafilter.com, Jan. 29, 2006, http://ask.metafilter.com/31720/Enable-screen-resize, 4 pages.
Awduche et al., "Synchronized Broadcast in Cellular Networks," 2nd Telecommunications R&D Conference in Massachusetts, Mar. 1996, 12 pages.
Azundris, "A Fire in the Sky," http://web.archive.org/web/20140722062639/http://blog.azundrix.com/archives/168-A-fire-in-the-sky.html, Jul. 22, 2014, 8 pages.
Bautista, "Microsoft Mathematics Tutorial 7—The Ink Input", <URL:http://mathandmultimedia.com/2012/05/23/microsoft-math-tutorial-7-ink>, May 23, 2012, 3 pages.
Cohen, Cinemagraphs are Animated Gifs for Adults, http:www.tubefilter.com//2011/07/10/cinemagraph/, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
Cvil.ly—a design blog, Interesting Touch Interactions on Windows 8, http://cvil.ly/2011/06/04/interesting-touch-interactions-on-windows-8/, Jun. 4, 2011, 3 pages.

Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Deeter, "DigiStamp Signs Strategic Partnership with European Trust Center EuroSignCard to Safeguard Monetary Transactions in Financial Sector," http://proquest.umi.com/, Mar. 14, 2001, 2 pages.
Dilger, "Inside Apple's iPad: Multitasking," Appleinsider.com, <http://www.appleinsider.com/articles/10/02/18/inside_apples_ipad_multitasking.html> , Feb. 17, 2010, 3 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Fahey, "The iPad Blows Up iPhone Apps Read Good," Kotaku http://kotaku.com/5458316/the-ipad-blows-up-iphone-apps-rel-good, Jan. 27, 2010, 3 pages.
Fehily, "Visual QuickStart Guide: Microsoft Windows 7," Peachpit Press, 9 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
Gorman, "Hands-On With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.
Harris, "Windows 8 Consumer Preview: Product Demo," https://www.youtube.com/watch?feature=[;auer-embedded&v=jDYAQmQ-phX8, Feb. 28, 2012, 3 pages.
Harrison, "Stylus-Based Interface with Full Mouse Emulation", IBM Technical Disclosure Bulletin, vol. 34, No. 10B, Mar. 1, 1992, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web.archive.org/web/20101228223033/http://www.comparecellular.com, Nov. 2, 2007, 154 pages.
IBM et al., "Pressure-Sensitive Icons", IBM, US, Jun. 1, 1990, 3 pages.
iCIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 2010, 4 pages.
Jade et al., "Apple's iPhone 4.0 Software to Deliver Multitasking Support," AppleSider.com, Mar. 11, 2010, 3 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
Nikon, "Scene Recognition System and Advanced SRS," http://www/nikonusa.com/en/Learn-And-Explore/Article/ftlzi4rr/Scene-Recognition-System-html, downloaded on May 20, 2016, 2 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.

(56) References Cited

OTHER PUBLICATIONS

MacRumors, "Window, Fit to Screen?," http://forums.macrumors.com/showthread.php?t=439783>, Feb. 22, 2008, 5 pages.
McRitchie, "Internet Explorer Right-Click Menus," http://web.archive.org/web-201405020/http:/dmcritchie.mvps.org/ie/rightie6.htm, May 2, 2014, 10 pages.
MetaFilter Network Inc., "Enable Screen Resize?", http://ask.metafilter.com/31720/Enable-screen-resize>, Jan. 29, 2006, 4 pages.
Mick, "iPhone OS 4.0 Will Bring True Multitasking This Summer", Daily Tech, http:///www.dailytech.com/report+iphone+os+40+will+bring+true+multitasking+this+summer/article 17878.htm>, Mar. 11, 2010, 3 pages.
Minsky, "Computational Haptics The *Sandpaper* System for Synthesizing Texture for a Force-Feedback Display," Massachusetts Institute of Technology, Jun. 1978, 217 pages.
Moth, "Share Code—Write Code Once for Both Mobile and Desktop Apps," MSDN Magazine, Jul. 2007, http://msdn.microsoft.com/en-us/magazine/cc163387.aspx, 8 pages.
Newman, "Sprint's HTC EVO 4G: 5 Killer Features," pcworld, http://www.pcworld.com/article/192286/sprints_htc_evo_4g_5_killer_features.html, Mar. 24, 2010, 3 pages.
Nickinson, "Review: The New HTC Sense Interface on Android Phones," Android Central, Feb. 22, 2010, http://www.androidcentral.com/review-new-htc-sense-android-phone, 10 pages.
Nilsson, "Design Guidelines for Mobile Applications," SINTEF ICT, Jun. 2008, 73 pages.
Nilsson et al., "Design Patterns for User Interface for Mobile Applications," Advances in Engineering Software, Elsevier Science, Oxford, GB vol. 40, No. 12, Dec. 1, 2009, 11 pages.
O'Hara, et al., "Pressure-Sensitive Icons", ip.com Journal, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Reiger, "Effective Design for Multiple Screen Sizes," mobiForge, http://mobiforge.com/designing/story/effective-design-multiple-screen-sizes, Jan. 2009, 12 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSenseII: Bi-directional Touch and Pressure Sensing Interactions with Tactile Feedback", Conference on Human Factors in Computing Systems Archive, ACM, Apr. 22, 2006, 6 pages.
Robertson et al., "The Task Gallery: A 3D Window Manager," Redmond, WA, Sep. 12, 1999, 8 pages.
Savov, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.
Seffah et al., Multi-devices "Multiple User Interfaces: Development Models and Research Opportunities," The Journal of Systems Software, www.sciencedirect.com, Dec. 25, 2003, 14 pages.
Siracusa, "Antacid Tablet," http://arstechnica.com/staff/2010/01/antacid-tablet/>, Jan. 1, 2010, 3 pages.

Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011, 10 pages.
Sony, "Intelligent Scene Recognition," https://www.sony-asia.com/article/252999/section/product/product/dsc-t77, downloaded on May 20, 2016, 5 pages.
Sony, "Sony Xperia Z1", Wikipedia, the free encyclopedia, https://en.wikipedia.org/wiki/Sony_Xperia_Z1, Sep. 2013, 10 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, 2 pages.
Wikipedia, "Mobile Ad Hoc Network," Wikipedia, the free encyclopedia, http://en.wikipedia.org/wiki/Mobile_ad_hoc_network, May 20, 2016, 4 pages.
Windows, "Stupid Geek Tricks: Tile or Cascade Multiple Windows in Windows 7," How to Geek, Feb. 18, 2010, 3 pages.
YouTube, "Blackberry Playbook bezel interation," https://www.youtube.com/watch?v=YGkzFqnOwXI, Jan. 10, 2011, 2 pages.
OfficeAction.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.

(56) References Cited

OTHER PUBLICATIONS

Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Jul. 9, 2015, received in Australian Patent Application No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Aug. 10, 2015, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jan. 7, 2016, received in European Patent Application No. 13724107.1, which corresponds with U.S. Appl. No. 14/052,515, 11 pages.
Office Action, dated May 16, 2016, received in Australian Patent Application No. 2016100246, which corresponds with U.S. Appl. No. 14/864,737, 6 pages.
Office Action, dated Apr. 5, 2016, received in Danish Patent Application No. 201500577, which corresponds with U.S. Appl. No. 14/864,737, 7 pages.
Office Action, dated Mar. 18, 2016, received in Danish Patent Application No. 201500575, which corresponds with U.S. Appl. No. 14/866,981, 9 pages.
Office Action, dated Mar. 9, 2016, received in Danish Patent Application No. 201500574, which corresponds with U.S. Appl. No. 14/866,159, 11 pages.
Certificate of Grant, dated Mar. 24, 2016, received in Australian Patnet Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,989, 10 pages.
Notice of Allowance, dated Jun. 8, 2016, received in Danish Patent Application No. 201500576, which corresponds with U.S. Appl. No. 14/866,989, 2 pages.
Office Action, dated Feb. 3, 2016, received in Danish Patent Application No. 201500592, which corresponds with U.S. Appl. No. 14/869,899, 9 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Office Action, dated Jan. 25, 2016, received in U.S. Appl. No. 14/864,580, 29 pages.
Notice of Allowance, dated May 17, 2016, received in U.S. Appl. No. 14/152,971, 9 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Apr. 6, 2016, received in Danish Patent Application No. 201500596, which corresponds with U.S. Appl. No. 14/870,882, 7 pages.

(56) References Cited

OTHER PUBLICATIONS

Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
Office Action, dated Mar. 18, 2016, received in Danish Patent Application No. 201500581, which corresponds with U.S. Appl. No. 14/867,990, 9 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, which corresponds with U.S. Appl. No. 14/608,942, 7 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
Invitation to Pay Additional Fees dated Apr. 17, 2014, received in International Application No. PCT/US2013/069484, which corresponds with U.S. Appl. No. 14/608,965, 7 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
Invitation to Pay Additional Fees dated Sep. 25, 2013, received in International Application No. PCT/US2013/040098, which corresponds to U.S. Appl. No. 14/536,247, 8 pages.

(56) References Cited

OTHER PUBLICATIONS

International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/US2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/US2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/US2013/040108, which corresponds to U.S. Appl. No. 14/536,291, 25 pages.
Invitation to Pay Additional Fees dated Apr. 1, 2014, received in International Application No. PCT/US2013/069486, which corresponds with U.S. Appl. No. 14/608,985, 7 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.

Kiener, "Force Touch on iPhone", https://www.youtube.com/watch?v=CEMmnsU5fC8, Aug. 4, 2015, 4 pages.
Kost, "LR3-Deselect All Images But One", Julieanne Kost's Blog, blogs.adobe.com/jkost/2011/12/1r3-deselect-all-images-but-one.html, Dec. 22, 2011, 1 page.
Microsoft, "Lumia—How to Personalize Your Start Screen", https://www.youtube.com/watch?v=6GI5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Phonebuff, "How to Pair Bluetooth on the iPhone", https://www.youtube.com/watch?v=LudNwEar9A8, Feb. 8, 2012, 3 pages.
Office Action, dated Mar. 15, 2017, received in U.S. Appl. No. 14/535,671, 13 pages.
Notice of Allowance, dated Dec. 20, 2016, received in Australian Patent Application No. 2013368440, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Office Action, dated May 4, 2017, received in Chinese Patent Application No. 201380068414.1, which corresponds with U.S. Appl. No. 14/608,926, 5 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Notice of Allowance, dated May 12, 2017, received in U.S. Appl. No. 14/608,942, 10 pages.

(56) References Cited

OTHER PUBLICATIONS

Office Action, dated Mar. 29, 2017, received in Australian patent Application No. 2016201303, which corresponds with U.S. Appl. No. 14/608,942, 3 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Office Action, dated Mar. 3, 2017, received in Japanese Patent Application No. 2016-125839, which corresponds with U.S. Appl. No. 14/536,267, 6 pages.
Office Action, dated Jan. 5, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 10-2015-7019984, which corresponds with U.S. Appl. No. 14/608,985, 8 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Feb. 10, 2017, received in U.S. Appl. No. 14/866,981, 5 pages.
Patent, dated Nov. 2, 2016, received in Australian Patent Application No. 2016100254, which corresponds with U.S. Appl. No. 14/866,981, 1 page.
Office Action, dated Dec. 5, 2016, received in Danish Patent Application No. 201500575, which corresponds with U.S. Appl. No. 14/866,981, 3 pages.
Office Action, dated Mar. 14, 2017, received in Danish Patent Application No. 201500574, which corresponds with U.S. Appl. No. 14/866,159, 5 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Notice of Allowance, dated Apr. 27, 2017, received in U.S. Appl. No. 16/866,489, 27 pages.
Notice of Allowance, dated Feb. 28, 2017, received in U.S. Appl. No. 14/869,899, 9 pages.
Office Action, dated Nov. 22, 2016, received in Danish Patent Application No. 201670594, which corresponds with U.S. Appl. No. 14/869,899, 9 pages.
Office Action, dated Apr. 13, 2017, received in U.S. Appl. No. 14/866,992, 34 pages.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.
Office Action, dated May 2, 2017, received in U.S. Appl. No. 14/856,517, 34 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Notice of Allowance, dated Nov. 8, 2016, received in Chinese Patent Application No. 201620470247.4, which corresponds with U.S. Appl. No. 14/864,580, 3 pages.
Office Action, dated May 5, 2017, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Office Action, dated May 4, 2017, received in Danish Patent Application No. 201500585, which corresponds with U.S. Appl. No. 14/864,627, 4 pages.
Certificate of Examination, dated Dec. 8, 2016, received in Australian Patent Application No. 2016100292, which corresponds with U.S. Appl. No. 14/866,361, 1 page.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.

(56) References Cited

OTHER PUBLICATIONS

Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Office Action, dated Oct. 31, 2016, received in Australian Patent Application No. 2016101438, which corresponds with U.S. Appl. No. 14/871,236, 6 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Mar. 13, 2017, received in Japanese Patent Application No. 2016-183289, which corresponds with U.S. Appl. No. 14/871,462, 5 pages.
Office Action, dated May 11, 2017, received in U.S. Appl. No. 14/867,823, 42 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Oct. 25, 2016, received in Chinese Patent Application No. 201620176221.9, which corresponds with U.S. Appl. No. 14/867,990, 7 pages.
Office Action, dated May 3, 2017, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Final Office Action, dated May 1, 2017, received in U.S. Appl. No. 15/136,782, 18 pages.
Office Action, dated Jan. 20, 2017, received in U.S. Appl. No. 15/231,745, 21 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.

Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
Office Action, dated Nov. 30, 2017, received in U.S. Appl. No. 14/535,671, 21 pages.
Office Action, dated Nov. 6, 2017, received in Chinese Patent Application No. 201380068493.6, which corresponds with U.S. Appl. No. 14/608,895, 5 pages.
Notice of Allowance, dated Nov. 30, 2017, received in U.S. Appl. No. 14/536,367, 9 pages.
Certificate of Grant, dated Nov. 10, 2017, received in Hong Kong Patent Application No. 15107535,0, which corresponds with U.S. Appl. No. 14/536,426, 2 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Notice of Allowance, dated Nov. 17, 2017, received in Japanese Patent Application No. 2016-125839, which corresponds with U.S. Appl. No. 14/536,267, 5 pages.
Notice of Allowance, dated Dec. 1, 2017, received in U.S. Appl. No. 14/536,291, 19 pages.
Office Action, dated Nov. 24, 2017, received in European Patent Application No. 16727900.9, which corresponds with U.S. Appl. No. 14/866,511, 5 pages.
Final Office Action dated Nov. 15, 2017, received in U.S. Appl. No. 14/856,519, 31 pages.
Office Action, dated Nov. 30, 2017, received in U.S. Appl. No. 14/857,636, 19 pages.
Office Action, dated Dec. 1, 2017, received in U.S. Appl. No. 14/857,663, 15 pages.
Patent, dated Nov. 6, 2017, received in Danish Patent Application No. 201670463, which corresponds with U.S. Appl. No. 14/866,987, 6 pages.

(56) References Cited

OTHER PUBLICATIONS

Patent, dated Oct. 27, 2017, received in Japanese Patent Application No. 2016-233449, which corresponds with U.S. Appl. No. 14/866,987, 3 pages.
Office Action, dated Nov. 29, 2017, received in U.S. Appl. No. 14/866,989, 31 pages.
Office Action, dated Nov. 14, 2017, received in U.S. Appl. No. 14/870,882, 25 pages.
Office Action, dated Nov. 22, 2017, received in U.S. Appl. No. 14/871,227, 24 pages.
Office Action, dated Nov. 13, 2017, received in Japanese Patent Application No. 2016-183289, which corresponds with U.S. Appl. No. 14/871,462, 5 pages.
Final Office Action, dated Nov. 29, 2017, received in U.S. Appl. No. 14/867,823, 47 pages.
Notice of Allowance, dated Dec. 4, 2017, received in U.S. Appl. No. 15/081,771, 10 pages.
Patent, dated Oct. 30, 2017, received in Danish Patent Application No. 201670593, which corresponds with U.S. Appl. No. 15/231,745, 3 pages.
Extended European Search Report, dated Nov. 24, 2017, received in European Patent Application No. 17186744.3, which corresponds with U.S. Appl. No. 14/536,291, 10 pages.
MacKenzie et al., "The Tactile Touchpad", Chi '97 Extended Abstracts on Human Factors in Computing Systems Looking to the Future, Chi '97, Mar. 22, 1997, 5 pages.
YouTube, "Android Lollipop Lock-Screen Notification Tips", https://www.youtube.com/watch?v=LZTxHBOwzIU, Nov. 13, 2014, 3 pages.
YouTube, "HTC One Favorite Camera Features", http://www.youtube.com/watch?v=sUYHfcjl4RU, Apr. 28, 2013, 3 pages.
Final Office Action, dated Feb. 22, 2018, received in U.S. Appl. No. 14/608,895, 20 pages.
Final Office Action, dated Feb. 26, 2018, received in U.S. Appl. No. 14/536,235, 13 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Feb. 12, 2018, received in U.S. Appl. No. 14/536,464, 33 pages.
Notice of Acceptance, dated Dec. 20, 2017, received in Australian Patent Application No. 2016201451, which corresponds with U.S. Appl. No. 14/608,926, 3 pages.
Notice of Allowance, dated Feb. 8, 2018, received in Chinese Patent Application No. 201380068414.1, which corresponds with U.S. Appl. No. 14/608,926, 2 pages.
Oral Summons, dated Feb. 13, 2017, received in European Patent Application No. 13795392.3, which corresponds with U.S. Appl. No. 14/608,926, 11 pages.
Notice of Allowance, dated Dec. 29, 2017, received in Korean Patent Application No. 2017-7018250, which corresponds with U.S. Appl. No. 14/608,926, 3 pages.
Office Action, dated Feb. 2, 2018, received in Chinese Patent Application No. 201380035893.7, which corresponds with U.S. Appl. No. 14/536,141, 5 pages.
Notice of Allowance, dated Feb. 28, 2018, received in U.S. Appl. No. 14/536,166, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Notice of Acceptance, dated Feb. 27, 2018, received in Australian Patent Application No. 2016204411, which corresponds with U.S. Appl. No. 14/536,267, 3 pages.
Notice of Allowance, dated Jan. 29, 2018, received in Chinese Patent Application No. 201380035968.1, which corresponds with U.S. Appl. No. 14/536,267, 3 pages.
Office Action, dated Jan. 25, 2018, received in European Patent Application No. 13724106.3, which corresponds with U.S. Appl. No. 14/536,267, 5 pages.
Patent, dated Dec. 1, 2017, received in Korean Patent Application No. 2016-7029533, which corresponds with U.S. Appl. No. 14/536,267, 2 pages.
Patent, dated Dec. 8, 2017, received in Chinese Patent Application No. 201380068399.0, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Office Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Office Action, dated Jan. 10, 2018, received in Danish Patent Application No. 201500574, which corresponds with U.S. Appl. No. 14/866,159, 2 pages.
Certificate of Grant, dated Jan. 3, 2018, received in Australian Patent Application No. 2016229421, which corresponds with U.S. Appl. No. 14/868,078, 1 page.
Office Action, dated Jan. 29, 2018, received in Danish Patent Application No. 201500592, which corresponds with U.S. Appl. No. 14/869,899, 2 pages.
Office Action, dated Dec. 14, 2017, received in Danish Patent Application No. 201670594, which corresponds with U.S. Appl. No. 14/869,899, 3 pages.
Office Action, dated Jan. 29, 2018, received in U.S. Appl. No. 14/866,992, 44 pages.
Office Action, dated Jan. 19, 2018, received in Australian Patent Application No. 201761478, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 Pages.
Notice of Allowance, dated Jan. 31, 2018, received in U.S. Appl. No. 14/856,519, 9 pages.
Final Office Action, dated Nov. 16, 2017, received in U.S. Appl. No. 14/856,520, 41 pages.
Notice of Allowance, dated Feb. 9, 2018, received in U.S. Appl. No. 14/856,522, 9 pages.
Office Action, dated Jan. 17, 2018, received in Australian Patent Application No. 2017202816, which corresponds with U.S. Appl. No. 14/857,636, 3 pages.
Notice of Allowance, dated Feb. 12, 2018, received in U.S. Appl. No. 14/857,700, 13 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Office Action, dated Jan. 22, 2018, received in U.S. Appl. No. 14/866,987, 22 pages.
Office Action, dated Feb. 26, 2018, received in Australian Patent Application No. 2017201079, which corresponds with U.S. Appl. No. 14/866,989, 6 pages.
Notice of Allowance, dated Feb. 5, 2018, received in Japanese Patent Application No. 2016-233450, which corresponds with U.S. Appl. No. 14/866,989, 5 pages.

(56) References Cited

OTHER PUBLICATIONS

Office Action, dated Jan. 29, 2018, received in Danish Patent Application No. 201500595, which corresponds with U.S. Appl. No. 14/871,236, 2 pages.
Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Patent, dated Oct. 30, 2017, Danish Patent Application No. 201500601, which corresponds with U.S. Appl. No. 14/871,336, 5 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,261, 26 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Feb. 19, 2018, received in Danish Patent Application No. 201500581, which corresponds with U.S. Appl. No. 14/867,990, 4 pages.
Office Action, dated Dec. 12, 2017, received in U.S. Appl. No. 15/009,668, 32 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Jan. 8, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Jan. 10, 2018, received in Danish Patent Application No. 201670590, which corresponds with U.S. Appl. No. 15/231,745, 2 pages.
Office Action, dated Jan. 30, 2018, received in Danish Patent Application No. 201670592, which corresponds with U.S. Appl. No. 15/231,745, 2 pages.
Office Action, dated Feb. 7, 2018, received in Danish Patent Application No. 201770709, 2 pages.
Notice of Allowance, dated Dec. 21, 2017, received in U.S. Appl. No. 15/723,069, 7 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Easton-Ellett, "Three Free Cydia Utilies to Remove iOS Notification Badges", http://www.ijailbreak.com/cydia/three-free-cydia-utilies-to-remove-ios-notification-badges, Apr. 14, 2012, 2 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mahdi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Office Action, dated Mar. 9, 2018, received in European Patent Application No. 13795391.5, which corresponds with U.S. Appl. No. 14/536,426, 4 pages.
Office Action, dated May 8, 2018, received in Australian Patent Application No. 2016216580, which corresponds with U.S. Appl. No. 14/536,426, 5 pages.
Notice of Allowance, dated May 10, 2018, received in Chinese Patent Application No. 201380035982.1, which corresponds with U.S. Appl. No. 14/536,426, 2 pages.
Intention to Grant, dated Mar. 9, 2018, received in European Patent Application No. 15183980.0, which corresponds with U.S. Appl. No. 14/536,426, 5 pages.
Final Office Action, dated May 3, 2018, received in U.S. Appl. No. 14/536,644, 28 pages.
Certificate of Grant, dated May 3, 2018, received n Australian Patent Application No. 2016201451, which corresponds with U.S. Appl. No. 14/608,926, 1 page.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Apr. 4, 2018, received in Chinese Patent Application No. 201380035977.0, which corresponds with U.S. Appl. No. 14/536,203, 3 pages.
Patent, dated Feb. 16, 2018, received in Japanese Patent Application No. 2016173113, which corresponds with U.S. Appl. No. 14/536,203, 3 pages.
Oral Proceedings, dated Mar. 7, 2018, received in European Office Action No. 13798465.4, which corresponds with U.S. Appl. No. 14/608,965, 5 pages.
Patent, dated Apr. 20, 2018, received in Chinese Patent Application No. 201380035968.1, which corresponds with U.S. Appl. No. 14/536,267, 4 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Notice of Allowance, dated Mar. 21, 2018, received in Danish Patent Application No. 201500574, which corresponds with U.S. Appl. No. 14/866,159, 2 pages.

(56) References Cited

OTHER PUBLICATIONS

Office Action, dated Apr. 25, 2018, received in European Patent Application No. 16708916.8, which corresponds with U.S. Appl. No. 14/868,078, 6 pages.
Notice of Allowance, dated Apr. 24, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Office Action, dated Mar. 13, 2018, received in U.S. Appl. No. 15/009,688, 10 pages.
Notice of Allowance, dated May 2, 2018, received in U.S. Appl. No. 14/856,519, 10 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Notice of Allowance, dated Mar. 16, 2018, received in Danish Patent Application No. 201500579, which corresponds with U.S. Appl. No. 14/866,361, 2 pages.
Office Action, dated May 7, 2018, received in European Patent Application No. 16189421.7, which corresponds with U.S. Appl. No. 14/866,987, 5 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Patent, dated Mar. 9, 2018, received in Japanese Patent Application No. 2016-233450, which corresponds with U.S. Appl. No. 14/866,989, 4 pages.
Notice of Allowance, dated Apr. 26, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.
Final Office Action, dated Apr. 20, 2018, received in U.S. Appl. No. 14/870,882, 7 pages.
Final Office Action, dated Mar. 15, 2018, received in U.S. Appl. No. 14/871,336, 23 pages.
Office Action, dated Apr. 2, 2018, received in Japanese Patent Application No. 2018-020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Notice of Allowance, dated Mar. 30, 3018, received in U.S. Appl. No. 14/867,990, 5 pages.
Office Action, dated Apr. 19, 2018, received in U.S. Appl. No. 14/869,703, 19 pages.
Office Action, dated May 4, 2018, received in Australian Patent Application No. 2018202855, which corresponds with U.S. Appl. No. 15/136,782, 3 pages.
Notice of Allowance, dated Mar. 19, 2018, received in Danish Patent Application No. 201770190, which corresponds with U.S. Appl. No. 15/136,782, 2 pages.
Office Action, dated Apr. 11, 2018, received in Danish Patent Application No. 201670591, which corresponds with U.S. Appl. No. 15/231,745, 3 pages.
Notice of Allowance, dated Mar. 27, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.
Office Action, dated Apr. 23, 2018, received in U.S. Appl. No. 15/499,691, 29 pages.
Final Office Action, dated May 10, 2018, received in U.S. Appl. No. 15/655,749, 19 pages.
Extended European Search Report, dated Mar. 2, 2018, received in European Patent Application No. 17206374.5, which corresponds with U.S. Appl. No. 15/272,343, 11 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", hrrp://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Notice of Allowance, dated May 17, 2018, received in Australian Patent Application No. 2016216580, which corresponds with U.S. Appl. No. 14/536,426, 3 pages.
Patent, dated May 4, 2018, received in Chinese Patent Application No. 201380068414.1, which corresponds with U.S. Appl. No. 14/608,926, 4 pages.
Patent, dated Apr. 27, 2018, received in Japanese Patent Application No. 2017-024234 , which corresponds with U.S. Appl. No. 14/608,926, 3 pages.
Grant Certificate, dated Apr. 25, 2018, received in European Patent Application No. 16710871.1, which corresponds with U.S. Appl. No. 14/864,737, 2 pages.
Patent, dated May 22, 2018, received in Danish Patent Application No. 201500574, which corresponds with U.S. Appl. No. 14/866,159, 2 pages.
Office Action, dated May 24, 2018, received in European Patent Application No. 16727900.9, which corresponds with U.S. Appl. No. 14/866,511, 7 pages.
Patent, dated May 28, 2018, received in Danish Patent Application No. 201500592, which corresponds with U.S. Appl. No. 14/869,899, 2 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018062161, which corresponds with U.S. Appl. No. 15/136,782, 5 pages.
Patent, dated May 28, 2018, received in Danish Patent Application No. 201670590, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Extended European Search Report, dated May 30, 2018, received in International Patent Application No. 18155939.4, which corresponds with U.S. Appl. No. 15/272,327, 8 pages.
Notice of Allowance, dated May 16, 2018, received in U.S. Appl. No. 14/536,367, 5 pages.

(56) References Cited

OTHER PUBLICATIONS

Final Office Action, dated Jun. 6, 2018, received in U.S. Appl. No. 14/608,926, 19 pages.
Notice of Allowance, dated Jun. 1, 2018, received in U.S. Appl. No. 14/536,267, 5 pages.
Notice of Allowance, dated Mar. 20, 2018, received in U.S. Appl. No. 14/536,291, 5 pages.
Notice of Allowance, dated May 24, 2018, received in U.S. Appl. No. 14/868,078, 6 pages.
Notice of Allowance, dated Jun. 11, 2018, received in U.S. Appl. No. 14/871,227, 11 pages.
Notice of Allowance, dated May 31, 2018, received in U.S. Appl. No. 14/869,855, 10 pages.
Final Office Action, dated May 23, 2018, received in U.S. Appl. No. 14/869,873, 18 pages.

* cited by examiner

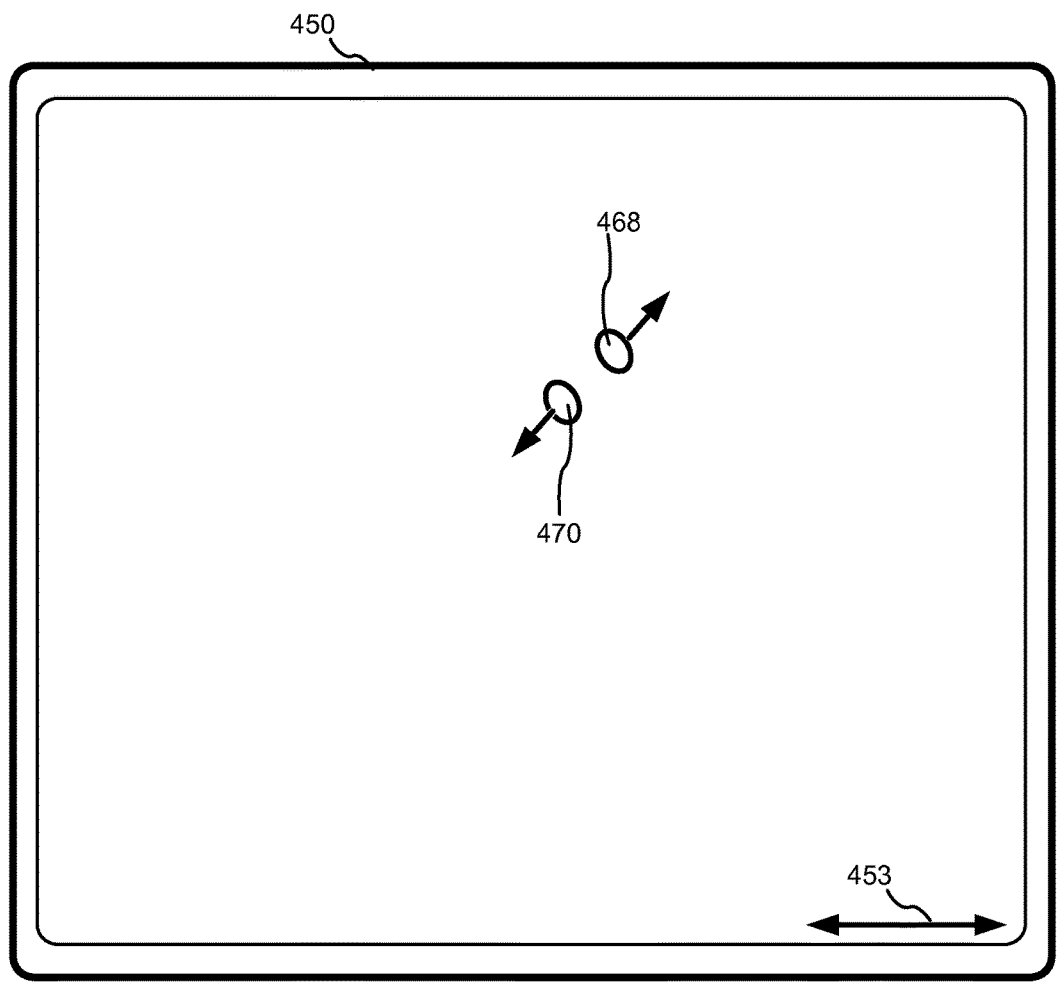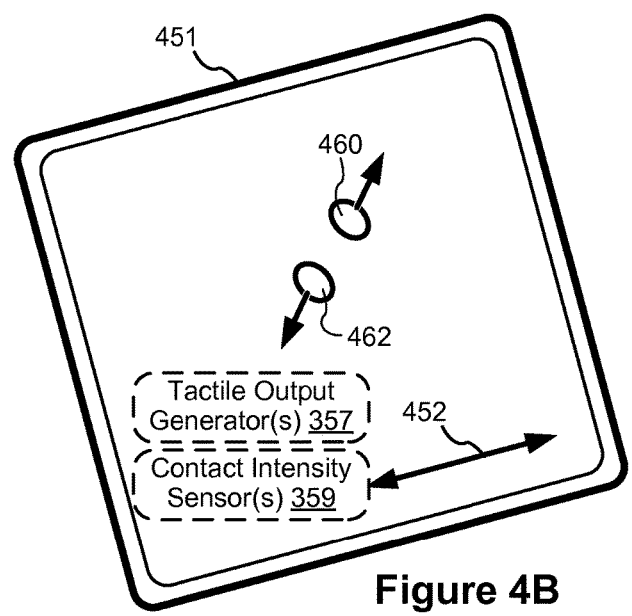
Figure 4B

700

702
While presenting media content at a first non-zero playback speed, detect a press input by a first contact on the touch-sensitive surface that corresponds to a focus selector at a first location of a first media control on the display

704
In response to detecting the press input:
　　Determine whether an intensity of the first contact is above a first intensity threshold;
　　in accordance with a determination that the intensity of the first contact is above the first intensity threshold, present the media content at a second playback speed, wherein the second playback speed is faster than the first non-zero playback speed; and,
　　in accordance with a determination that the intensity of the first contact is below the first intensity threshold, maintain presentation of the media content at the first non-zero playback speed

706
The first non-zero playback speed is a normal playback speed

708
The first non-zero playback speed is a fast-forward playback speed that is greater than or equal to two times a normal playback speed

710
The first non-zero playback speed is a rewind playback speed whose magnitude is greater than or equal to two times a normal playback speed

712
The first intensity threshold corresponds to a predetermined minimum intensity value

Figure 7A (E)
↓

---
734
While presenting the media content at the second playback speed, detect a subsequent press input by a second contact distinct from the first contact on the touch-sensitive surface that corresponds to the focus selector at the first location of the first media control on the display; and
    While detecting the subsequent press input:
        Determine whether an intensity of the second contact has not crossed above a second intensity threshold that is above the first intensity threshold; and,
        Subsequent to a determination that the intensity of the second contact has not crossed above the second intensity threshold:
            Detect that the intensity of the second contact has crossed below the first intensity threshold; and,
            In response to detecting that the intensity of the second contact has crossed below the first intensity threshold, forego provision of a tactile output that corresponds to the first intensity threshold ---
736
While presenting the media content at the second playback speed, and while continuing to detect the first contact on the touch-sensitive surface, detect that the intensity of the first contact is below the first intensity threshold; and,
    In response to detecting that the intensity of the first contact is below the first intensity threshold, present the media content at a fourth playback speed ---
738
The fourth playback speed is the second playback speed ---
740
The fourth playback speed is the first non-zero playback speed ---
742
The fourth playback speed is a normal playback speed

744
While presenting a still image that corresponds to the media content, detect a subsequent press input by a second contact distinct from the first contact on the touch-sensitive surface that corresponds to the focus selector at the first location of the first media control on the display; and,
  In response to detecting the subsequent press input:
    Determine whether an intensity of the second contact is above the first intensity threshold;
    In accordance with a determination that the intensity of the second contact is above the first intensity threshold, present the media content at the second playback speed; and,
    In accordance with a determination that the intensity of the second contact is below the first intensity threshold, increase the playback speed of the media content from the still image up to the second playback speed according to the intensity of the second contact

746
While presenting the media content at a normal playback speed, detect a subsequent press input by a second contact distinct from the first contact on the touch-sensitive surface that corresponds to the focus selector at a second location of a second media control on the display, wherein the second playback control is distinct from the first playback control;
  Determine whether the intensity of the second contact is above the first intensity threshold;
  In accordance with a determination that the intensity of the second contact is above the first intensity threshold, present the media content at a first fractional playback speed, wherein the first fractional playback speed is faster than the normal playback speed and less than two times the normal playback speed; and,
  In accordance with a determination that the intensity of the second contact is below the first intensity threshold, maintain presentation of the media content at the normal playback speed

802
While presenting media content at a first speed, detect a press input by a first contact on the touch-sensitive surface that corresponds to a focus selector at a first location of a first media control on the display

---

804
In response to detecting the press input by the first contact:
  Determine whether a first intensity of the first contact has satisfied a first intensity threshold;
  Subsequent to determining whether the first intensity of the first contact has satisfied the first intensity threshold, determine whether the first contact continues to satisfy a second intensity threshold during a predefined time interval;
  In accordance with determining that the first intensity of the first contact has satisfied the first intensity threshold and determining that the first contact continues to satisfy the second intensity threshold during the predefined time interval, present the media content at a first fast-forward speed that is higher than the first speed as long as the first contact satisfies the second intensity threshold; and,
  In accordance with determining that the intensity of the first contact has satisfied the first intensity threshold and determining that the first contact does not continue to satisfy the second intensity threshold during the predefined time interval, present the media content at the first fast-forward speed

---

806
The first intensity threshold is higher than the second intensity threshold

---

808
While presenting the media content at the first fast-forward speed in accordance with determining that the first intensity of the first contact has satisfied the first intensity threshold and determining that the first contact continues to satisfy the second intensity threshold during the predefined time interval, detect a second intensity of the first contact that does not satisfy the second intensity threshold subsequent to the predefined time interval; and,
  In response to detecting the second intensity of the first contact that does not satisfy the second intensity threshold subsequent to the predefined time interval, cease to present the media content at the first fast-forward speed

Figure 8A

---

810
While presenting the media content at the first fast-forward speed in accordance with determining that the first intensity of the first contact has satisfied the first intensity threshold and determining that the first contact does not continue to satisfy the second intensity threshold during the predefined time interval, detect a press input by a second contact on the touch-sensitive surface that corresponds to the focus selector at the first location of the first media control on the display;

Determine whether a first intensity of the second contact has satisfied the first intensity threshold;

Subsequent to determining whether the first intensity of the second contact has satisfied the first intensity threshold, determine whether the second contact satisfies the second intensity threshold; and, In accordance with determining that the first intensity of the second contact has satisfied the first intensity threshold and subsequently determining that the second contact does not satisfy the second intensity threshold, present the media content at a second fast-forward speed that is higher than the first fast-forward speed

---

812
In response to detecting the press input by the second contact, in accordance with determining that the first intensity of the second contact has satisfied the first intensity threshold and subsequently determining that the second contact satisfies the second intensity threshold, present the media content at the first fast-forward speed while the second contact satisfies the second intensity threshold

814
In response to detecting the press input by the second contact, in accordance with determining that the first intensity of the second contact has satisfied the first intensity threshold and subsequently determining that the second contact satisfies the second intensity threshold, visually distinguish the first media control on the display while the second contact satisfies the second intensity threshold 816
While presenting the media content at the first fast-forward speed in accordance with determining that the first intensity of the first contact has satisfied the first intensity threshold and determining that the first contact continues to satisfy the second intensity threshold during the predefined time interval and while continuing to detect the first contact on the touch-sensitive surface, detect a second intensity of the first contact that satisfies a third intensity threshold that is higher than the first intensity threshold; and,
    In response to detecting the second intensity of the first contact, present the media content at the second fast-forward speed that is higher than the first fast-forward speed 818
While presenting the media content at the second fast-forward speed and while continuing to detect the first contact on the touch-sensitive surface, detect a third intensity of the first contact that does not satisfy a fourth intensity threshold; and,
    In response to detecting the third intensity of the first contact, present the media content at the first fast-forward speed

Figure 8C

DEVICES AND METHODS FOR CONTROLLING MEDIA PRESENTATION

RELATED APPLICATION

This application claims priority to U.S. Provisional Patent Application Ser. No. 62/129,941, filed Mar. 8, 2015, entitled "Devices and Methods for Controlling Media Presentation," which is incorporated by reference herein in its entirety.

TECHNICAL FIELD

This relates generally to electronic devices with touch-sensitive surfaces, including but not limited to electronic devices with touch-sensitive surfaces for controlling playback of digital media, including fast scanning through media files.

BACKGROUND

The use of touch-sensitive surfaces as input devices for computers and other electronic computing devices has increased significantly in recent years. Exemplary touch-sensitive surfaces include touchpads and touch-screen displays. Such surfaces are sometimes used to control presentation of video, audio, and/or other media on a display, for example by interacting with virtual play, pause, fast forward, and rewind buttons on the display.

But existing methods and devices for controlling media presentation are cumbersome and inefficient. For example, the inputs required to adjust playback speed may not be clear and intuitive to a user.

SUMMARY

Accordingly, there is a need for electronic devices with faster, more efficient methods and interfaces for controlling media presentation (e.g., controlling the rewind, fast forward, and/or playback speeds of various media). Such methods and interfaces optionally complement or replace conventional methods for controlling media presentation. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and one or more sensors to detect intensity of contacts with the touch-sensitive surface. The method includes: while presenting media content at a first non-zero playback speed, detecting a press input by a first contact on the touch-sensitive surface that corresponds to a focus selector at a first location of a first media control on the display; and, in response to detecting the press input: determining whether an intensity of the first contact is above a first intensity threshold; in accordance with a determination that the intensity of the first contact is above the first intensity threshold, presenting the media content at a second playback speed, wherein the second playback speed is faster than the first non-zero playback speed; and, in accordance with a determination that the intensity of the first contact is below the first intensity threshold, maintaining presentation of the media content at the first non-zero playback speed.

In accordance with some embodiments, a method is performed at an electronic device with a display, a touch-sensitive surface, and one or more sensors to detect intensity of contacts with the touch-sensitive surface. The method includes: while presenting media content at a first speed, detecting a press input by a first contact on the touch-sensitive surface that corresponds to a focus selector at a first location of a first media control on the display; and, in response to detecting the press input by the first contact: determining whether a first intensity of the first contact has satisfied a first intensity threshold; subsequent to determining whether the first intensity of the first contact has satisfied the first intensity threshold, determining whether the first contact continues to satisfy a second intensity threshold during a predefined time interval; in accordance with determining that the first intensity of the first contact has satisfied the first intensity threshold and determining that the first contact continues to satisfy the second intensity threshold during the predefined time interval, presenting the media content at a first fast-forward speed that is higher than the first speed as long as the first contact satisfies the second intensity threshold; and, in accordance with determining that the intensity of the first contact has satisfied the first intensity threshold and determining that the first contact does not continue to satisfy the second intensity threshold during the predefined time interval, presenting the media content at the first fast-forward speed.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: while presenting media content at a first non-zero playback speed, detecting a press input by a first contact on the touch-sensitive surface that corresponds to a focus selector at a first location of a first media control on the display; and, in response to detecting the press input: determining whether an intensity of the first contact is above a first intensity threshold; in accordance with a determination that the intensity of the first contact is above the first intensity threshold, presenting the media content at a second playback speed, wherein the second playback speed is faster than the first non-zero playback speed; and, in accordance with a determination that the intensity of the first contact is below the first intensity threshold, maintaining presentation of the media content at the first non-zero playback speed.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: while presenting media content at a first non-zero playback speed, detect a press input by a first contact on the touch-sensitive surface that corresponds to a focus selector at a first location of a first media control on the display; and, in response to detecting the press input: determine whether an intensity of the first contact is above a first intensity threshold; in accordance with a determination that the intensity of the first contact is above the first intensity threshold, present the media content at a second playback speed, wherein the second playback speed is faster than the first non-zero playback speed; and, in accordance with a determination that the intensity of the first contact is below the first intensity threshold, maintain presentation of the media content at the first non-zero playback speed.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and one or more sensors to detect intensity of contacts with the touch-sensitive surface are provided with faster, more efficient methods and interfaces for controlling media presentation (e.g., for controlling the rewind, fast forward, and/or playback speeds), thereby increasing the effectiveness, efficiency, and user satisfaction with such devices. Such methods and interfaces may complement or replace conventional methods for controlling media presentation.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7H are flow diagrams illustrating a method of controlling media presentation in accordance with some embodiments.

FIGS. 8A-8C are flow diagrams illustrating a method of controlling media presentation in accordance with some embodiments.

DESCRIPTION OF EMBODIMENTS

Figure 1A:
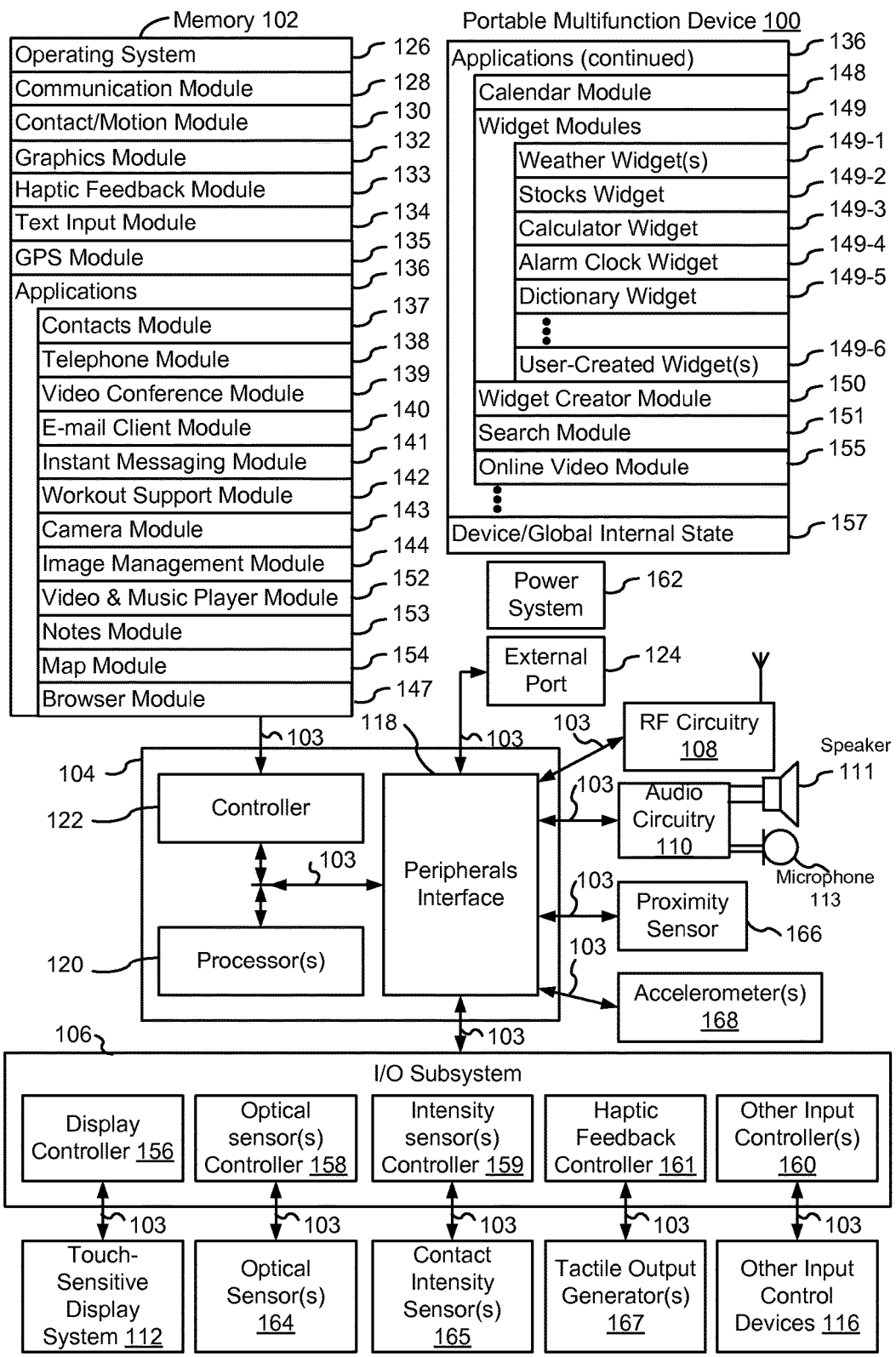
FIG. 1A is a block diagram illustrating a portable multifunction device with a touch-sensitive display in accordance with some embodiments.

Many electronic devices provide a media playback function for presenting media content (e.g., music, video, a collection of images in a slideshow, etc.). A software application that provides the media playback function typically provides respective graphical user interface controls for controlling various aspects of media presentation (e.g., for starting, pausing, stopping, fast forwarding, and/or rewinding the media content). Sometimes, the user may wish to start playing the media content at a speed higher than the normal playback speed (e.g., scanning the media content at 2×, 5×, 10×). Sometimes, while playing the media content at a normal playback speed (e.g., 1×), the user may wish to increase the playback speed to multiple times of the normal playback speed (e.g., scanning at 2×, 5×, 10×, 30×, etc.). Sometimes, while the media content is being scanned at a first speed (e.g., 2×), the user may wish to change that speed to a higher speed (e.g., 5×, 10×, 30×, etc.). Sometimes, the user may wish to increase the speed for just a brief time; while at other times, the user may wish to maintain the higher playback speed once it has been achieved.

Here improved methods are described for controlling media presentation based on an intensity of a press input or a profile of the intensity of the press input on a touch-sensitive surface of the electronic device. Depending on a current playback speed of the media presentation and a relative intensity of a press input to one or more predetermined activation intensity thresholds associated with different playback speeds, the playback speed of the media presentation may be altered. For example, the playback speed may increase or decrease in response to changes in contact intensity of the press input detected on a corresponding user interface control (e.g., a fast forward control or a rewind control). These methods provide more convenient and intuitive ways to control media presentation, thereby reducing the cognitive burden on a user and increasing the effectiveness, efficiency, and user satisfaction with such devices.

Below, FIGS. 1A-1B, 2, and 3 provide a description of exemplary devices. FIGS. 4A-4B and 5A-5F illustrate exemplary user interfaces for controlling media presentation. FIGS. 6A-6K illustrate exemplary control heuristics for controlling media presentation. FIGS. 7A-7H and 8A-8C are flow diagrams of methods of controlling media presentation. The user interfaces in FIGS. 5A-5F and the control heuristics in FIGS. 6A-6K are used to illustrate the processes in FIGS. 7A-7H and 8A-8C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
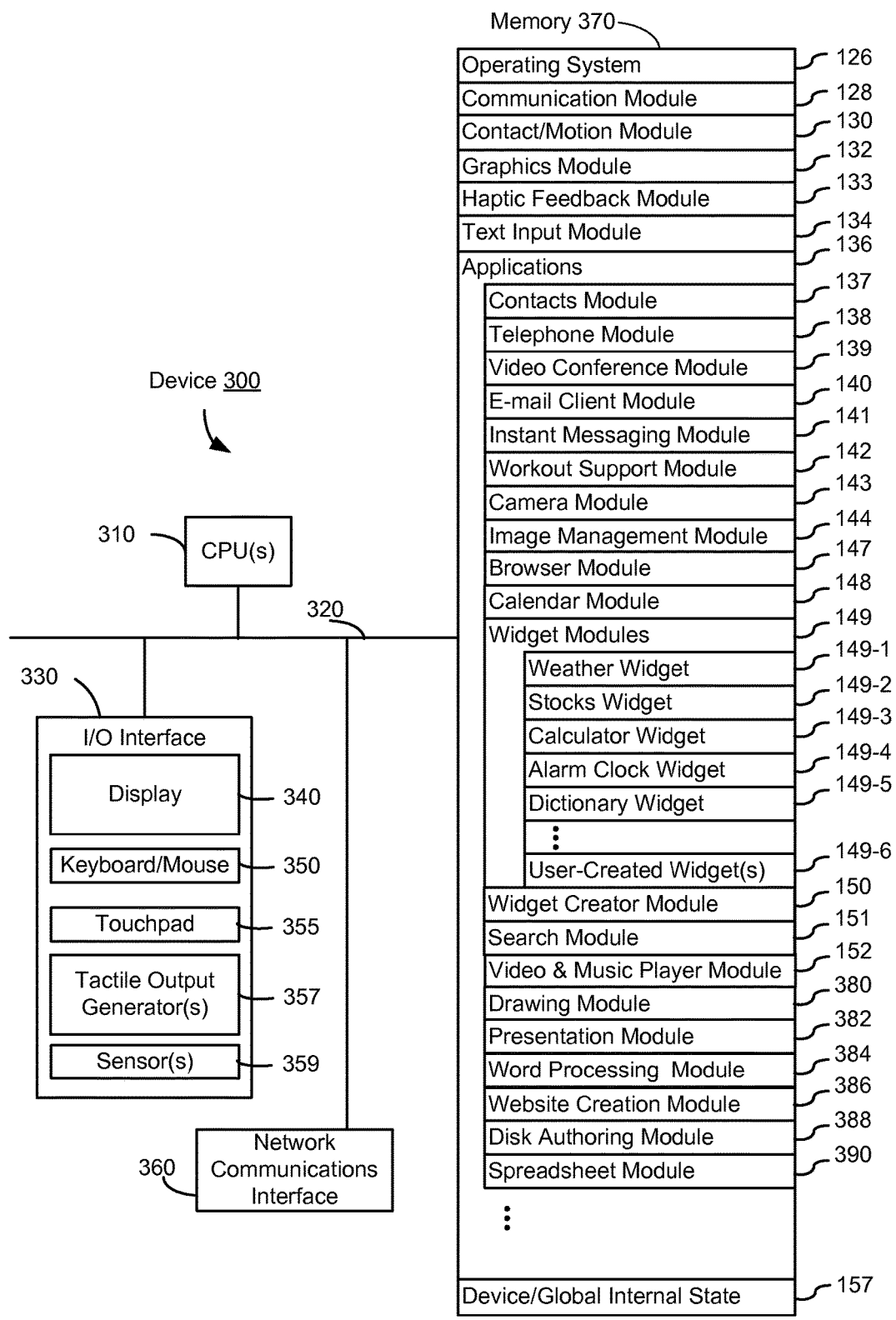
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
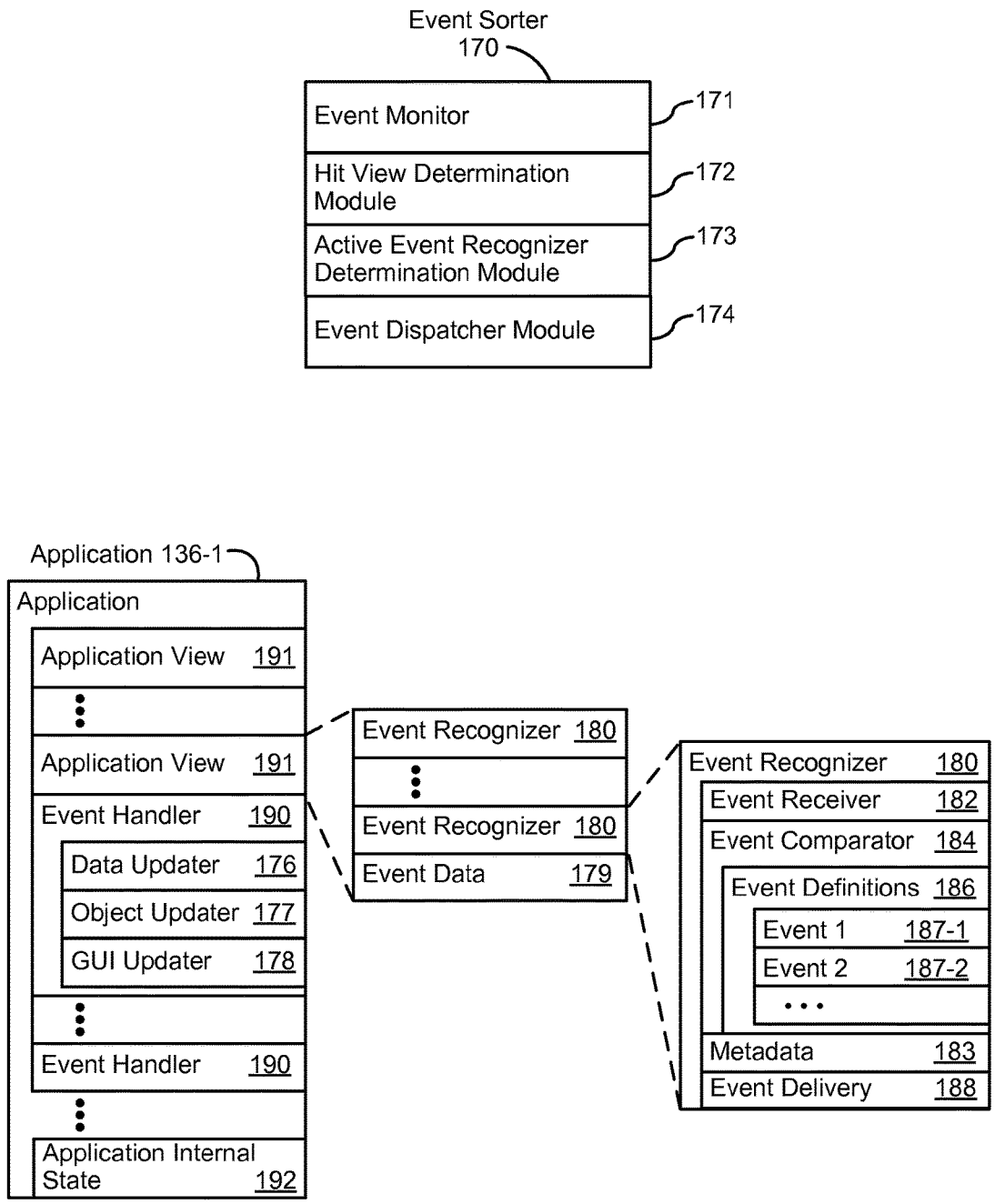
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions;

detected eye movements; biometric inputs; and/or any combination thereof are optionally utilized as inputs corresponding to sub-events which define an event to be recognized.

Figure 2:
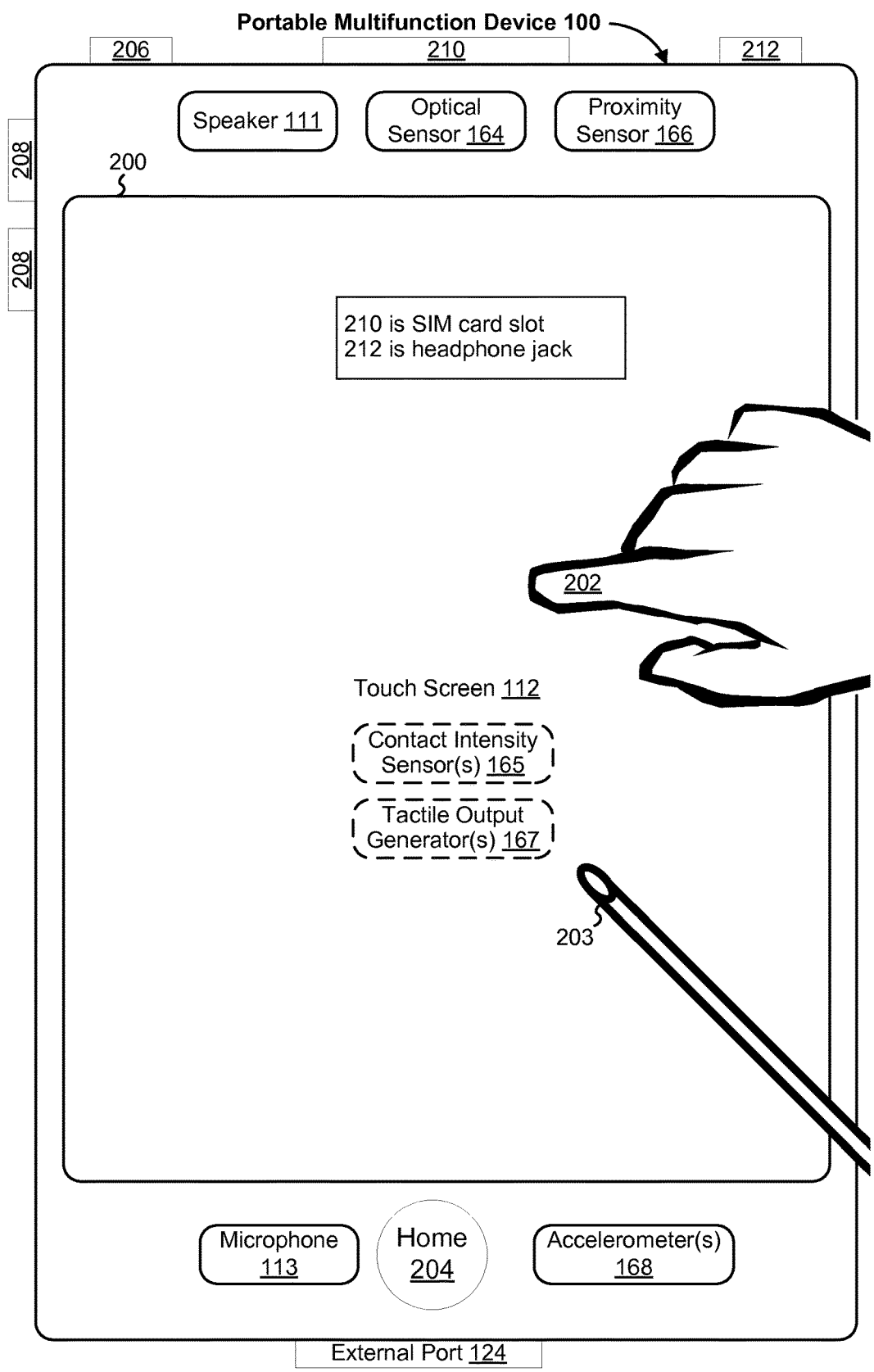
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
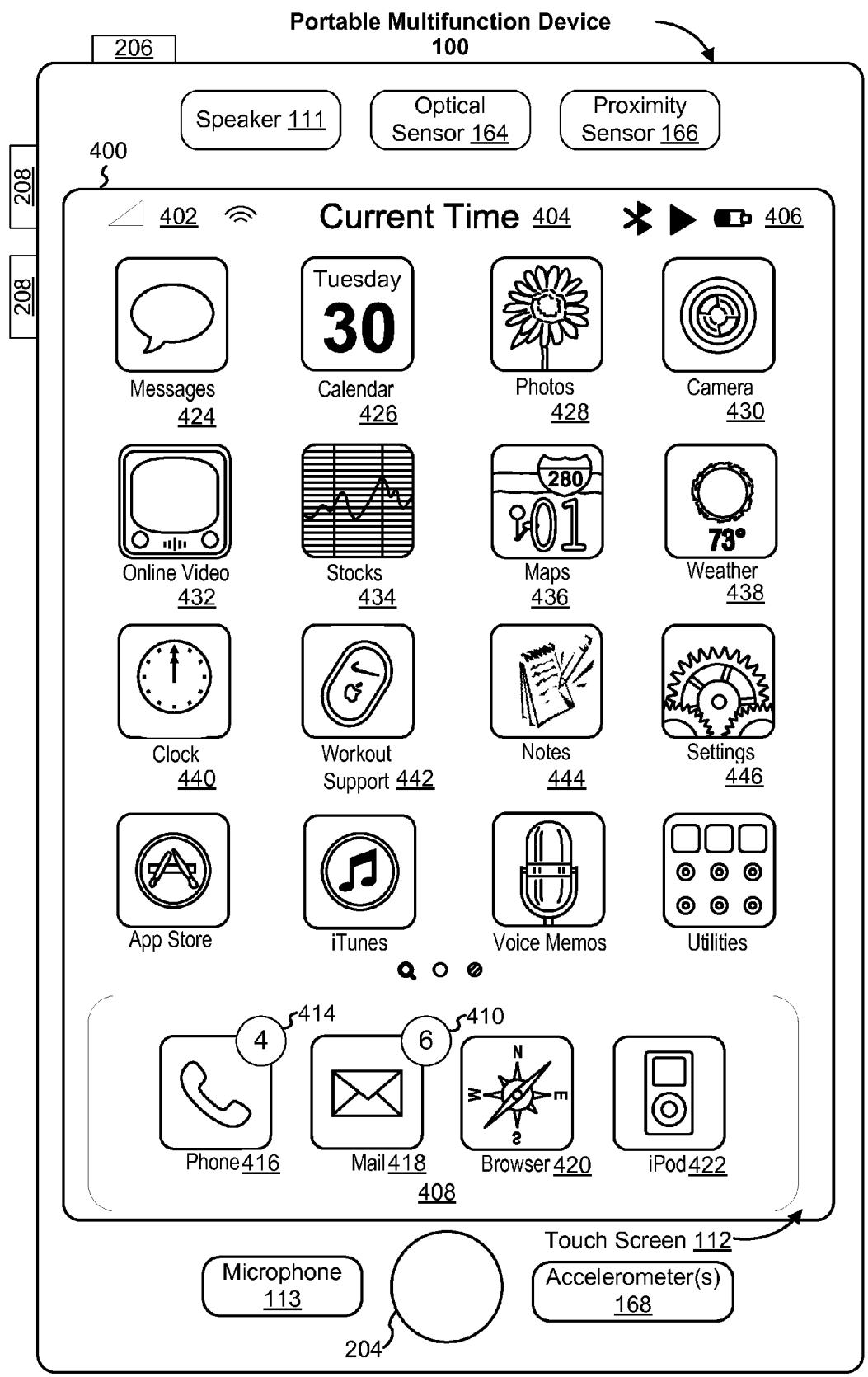
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation intensity thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The control heuristics figures (e.g., FIGS. 6A-6K) described below include various intensity diagrams that show the current intensity of the contact on the touch-sensitive surface relative to one or more intensity thresholds (e.g., a light press activation intensity threshold $I_{LA}$, respective activation intensity threshold $IT_{speedA}$ associated with various playback speeds, a light press release intensity threshold $I_{LR}$ and/or respective release intensity thresholds associated with various playback speeds). In some embodiments, the light press activation intensity threshold corresponds to an intensity at which the device will perform operations typically associated with clicking a button of a physical mouse or a trackpad. In some embodiments, the higher activation intensity thresholds correspond to intensities at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press activation intensity threshold or the higher activation intensity thresholds. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs (e.g., press inputs with intensities reaching above one or more of the higher activation intensity thresholds), the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
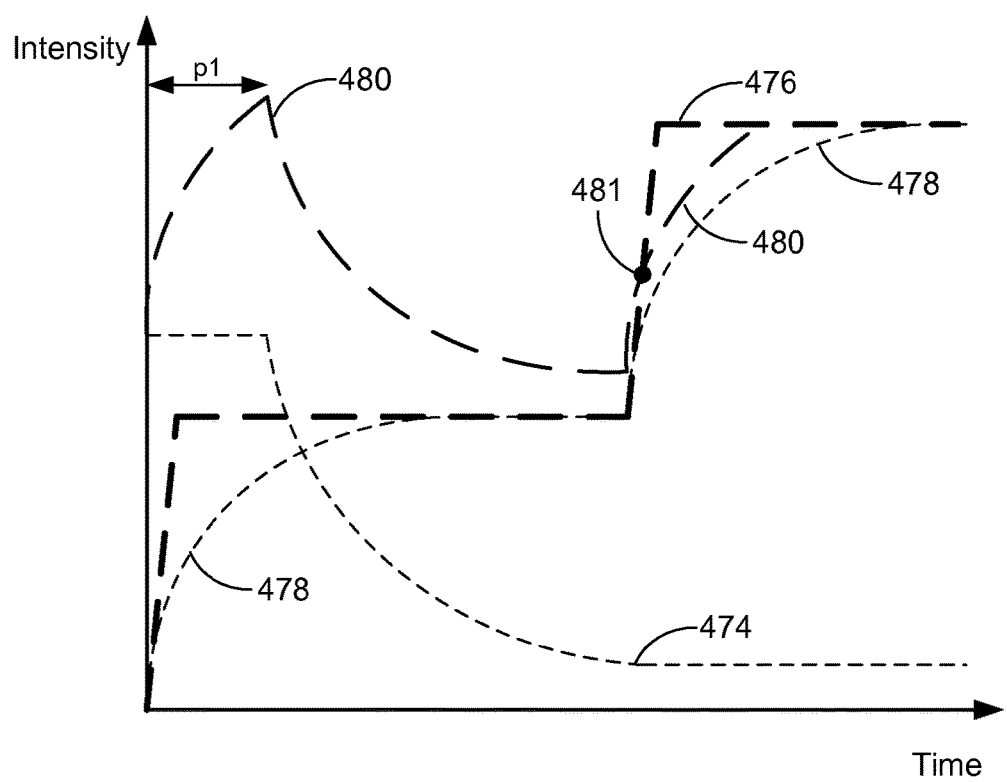
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of a touch input. In some embodiments, when touch input 476 satisfies dynamic intensity threshold 480 (e.g., at point 481 in FIG. 4C), the "deep press" response is triggered.

Figure 4D:
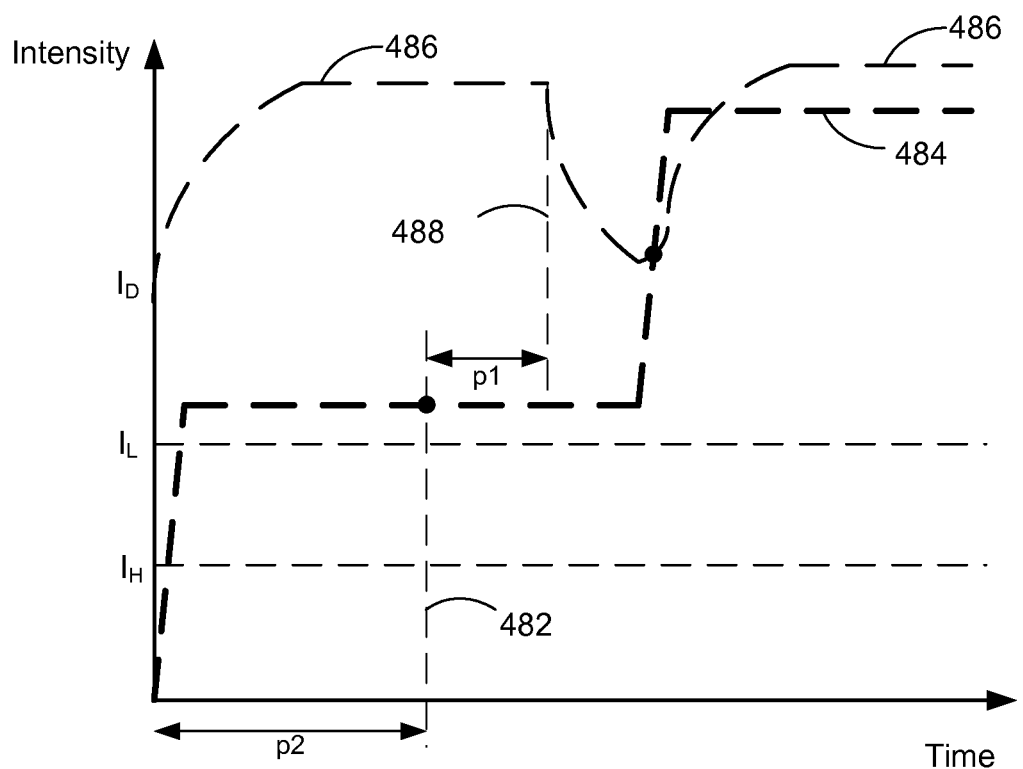

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
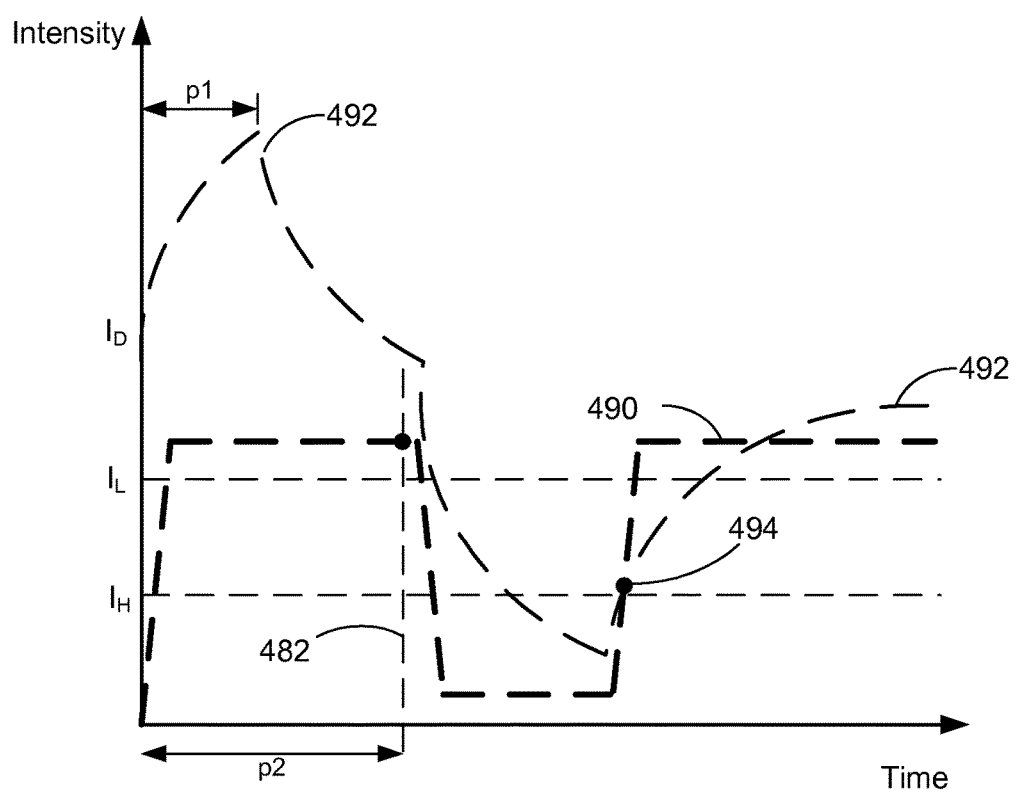

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press activation intensity threshold $IT_{LA}$ to an intensity between the light press activation intensity threshold $IT_{LA}$ and the next higher activation intensity threshold is sometimes referred to as a "light press" input. An increase of characteristic intensity of the contact from an intensity below a higher activation intensity threshold to an intensity above the higher activation intensity threshold is sometimes referred to as a "deep press" input. An increase of characteristic intensity of the contact from an intensity below the contact-detection intensity threshold to an intensity between the contact-detection intensity threshold and the light press activation intensity threshold $IT_{LA}$ is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity is zero. In some embodiments, the contact-detection intensity is greater than zero. In some illustrations a shaded circle or oval is used to represent intensity of a contact on the touch-sensitive surface (e.g., as in shown by contact 512, FIGS. 5C-5E). In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

FIGS. 5A-5F illustrate exemplary user interfaces for controlling media presentation in accordance with some embodiments. FIGS. 6A-6K illustrate exemplary control heuristics for controlling media presentation in accordance with some embodiments. The user interfaces and control heuristics in these figures are used to illustrate the processes described below, including the processes in FIGS. 7A-7H and 8A-8C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 5A:
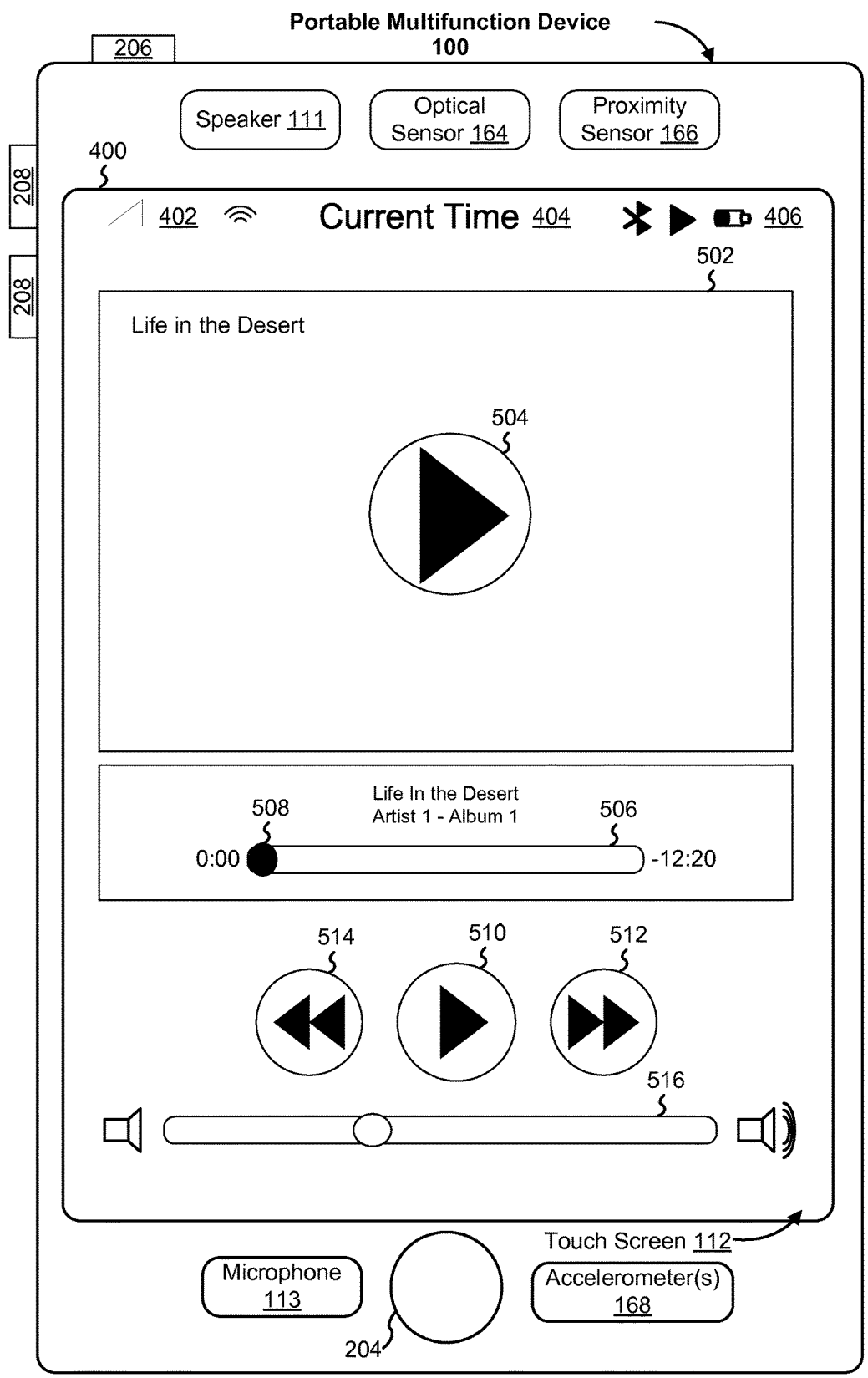
FIGS. 5A-5F illustrate exemplary user interfaces for controlling media presentation in accordance with some embodiments.

FIG. 5A illustrates exemplary user interface 400 of an electronic device (e.g., device 300, FIG. 3, or portable multifunction device 100, FIG. 1A) when a media player application (e.g., video and music player module represented by icon 422, FIG. 4A) is executed on the electronic device. The media player application provides a media playback function to present media content (e.g., a collection of images, animation, video, music, speech, etc.) continuously at a selected playback speed (e.g., 0×, 1×, 2×, 5×, 10×, 20×, 30×, 60×, etc.). Examples of the media player application includes a music player application, a video player application, a presentation application that displays a slideshow, a multi-media editor application, an audio recorder application, a photo editor application that displays photos in a slideshow, and the like. User Interface 400 includes content window 502 and various user interface controls for controlling different aspects of media presentation in the media player application. In some embodiments, content window 502 includes play button 504, and optionally a still image (e.g., an album cover image or representative video frame) or text (e.g., a title of media content) associated with a currently selected media file (e.g., a video clip titled "Life in the Desert").

In some embodiments, user interface 400 further includes scrubber 506 which displays the total duration of the currently selected media content, and indicates (e.g., using indicator 508) the current playback progress of the selected media content. In some embodiments, a user can drag indicator 508 forward or backward along scrubber 506 to quickly jump to different locations in the selected media content.

In some embodiments, user interface 400 further includes a number of playback controls, including play control 510, fast forward control 512, and rewind control 514. Play control 510 is used to start normal playback (e.g., at 1× speed) of the media content. Fast forward control 512 is used to start fast forwarding of the media content, e.g., by playing the media content at a speed higher than the normal playback speed. Rewind control 512 is used start rewinding of the media content, e.g., by playing the media content backward at a speed higher than the normal playback speed. In some embodiments, as described later in the present disclosure, one or more of playback controls 510, 512 and 514 are used to increase the current playback speed to one or more higher levels. The higher playback speed may be momentary and lasts only for a user-specified duration (e.g., while the intensity of the press input meets certain criteria). Alternatively, the higher playback speeds may be maintained until a new input on one of the playback controls is received.

Figure 5B:
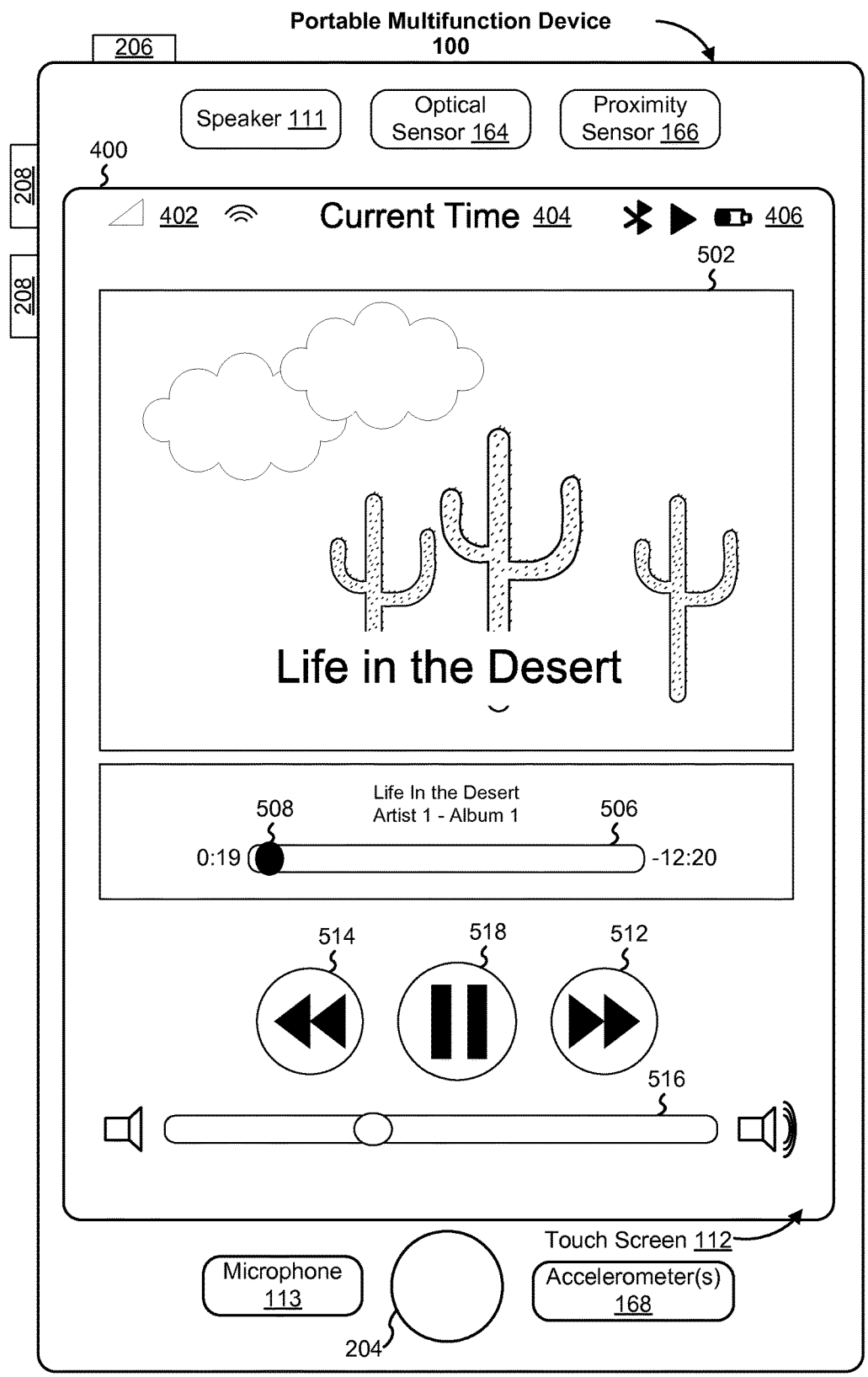

FIG. 5B illustrates that normal playback (e.g., at 1× speed) of the currently selected media content has been started, e.g., in response to a tap or light press input detected on play button 504 or play control 510. While the normal playback of the media content is ongoing, the current progress of the playback is indicated by indicator 508 on scrubber 506. In some embodiments, playback control 510 is replaced with pause control 518. In some embodiments, a stop control (not shown) may be included in user interface 400 for stopping the playback at any speed and return the start position of the selected media content to the beginning of the selected media content. For example, in some embodiments, a stop control may be presented next to playback controls 514, 518, or 512 after the media player has started playing the media content.

Figure 5C:
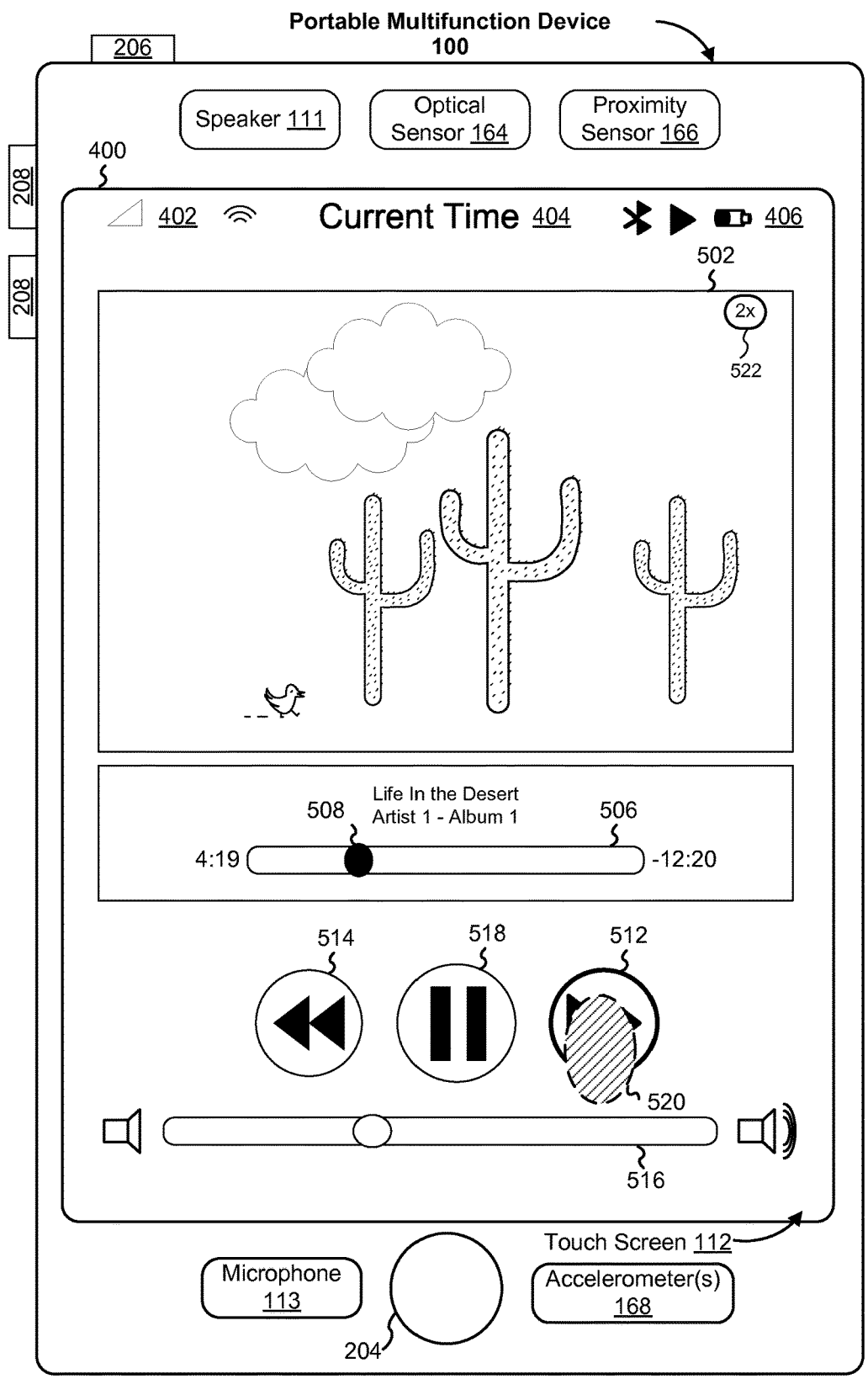

FIG. 5C illustrates that when a press input (e.g., represented by contact 520) is detected on fast forward control 512 while the media content is being presented at a normal playback speed (e.g., 1× speed), and the intensity of the contact reaches above a predetermined activation intensity threshold (e.g., the activation intensity threshold for a light press input $I_{LA}$ or the activation intensity threshold associated with 2× speed), fast forward control 512 is optionally highlighted to indicate the activation of the fast forward function. In some embodiments, upon activation of the fast forward function, the speed by which the selected media content is presented in content window 502 is increased from the normal playback speed (e.g., 1× speed) to a first predetermined higher value (e.g., a first fast forward speed of two times the normal playback speed, or, 2× speed). In some embodiments, a playback speed indicator (e.g., speed indicator 522) is presented in user interface 400 to indicate the current playback speed (e.g., 2×). In some embodiments, tactile feedback (e.g., a tactile feedback that causes a click sensation in the user's finger in contact with fast forward control 512) is provided on touch screen 112 at the activation of the fast forward function.

Figure 5D:
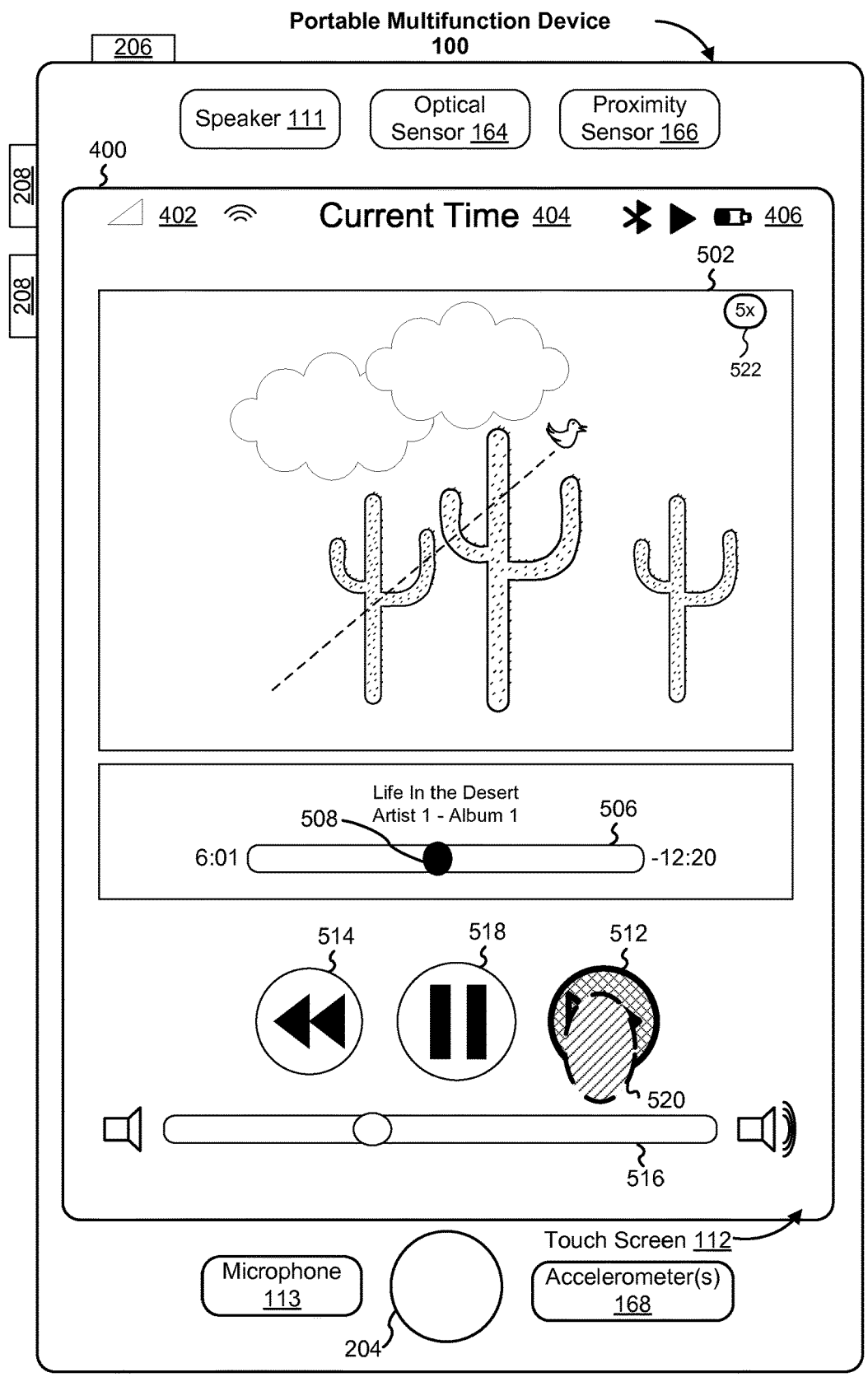

FIG. 5D illustrates that when the intensity of the same press input (e.g., the press input represented by contact 520 in FIG. 5C) increases from the predetermined activation intensity threshold for 2× speed to a value above the next higher activation intensity threshold (e.g., the activation intensity threshold for 5× speed), the speed of the media playback is increased from the first fast forward speed (e.g., 2× speed) to a second, higher fast forward speed (e.g., 5× speed). In some embodiments, the higher fast forward speed (e.g., 5× speed) is indicated by speed indicator 522 in content window 502. In some embodiments, when the contact intensity reaches the second, higher activation intensity threshold (e.g., the activation intensity threshold for 5× speed), fast forward control 512 is highlighted (e.g., in a different manner from the highlighting shown in FIG. 5C) to indicate the activation of the second, higher fast forward speed. In some embodiments, tactile feedback (e.g., a tactile feedback that causes a click sensation in the user's finger in contact with fast forward control 512) is provided on touch screen 112 at the activation of the second, higher fast forward speed (e.g., 5× speed).

Figure 5E:
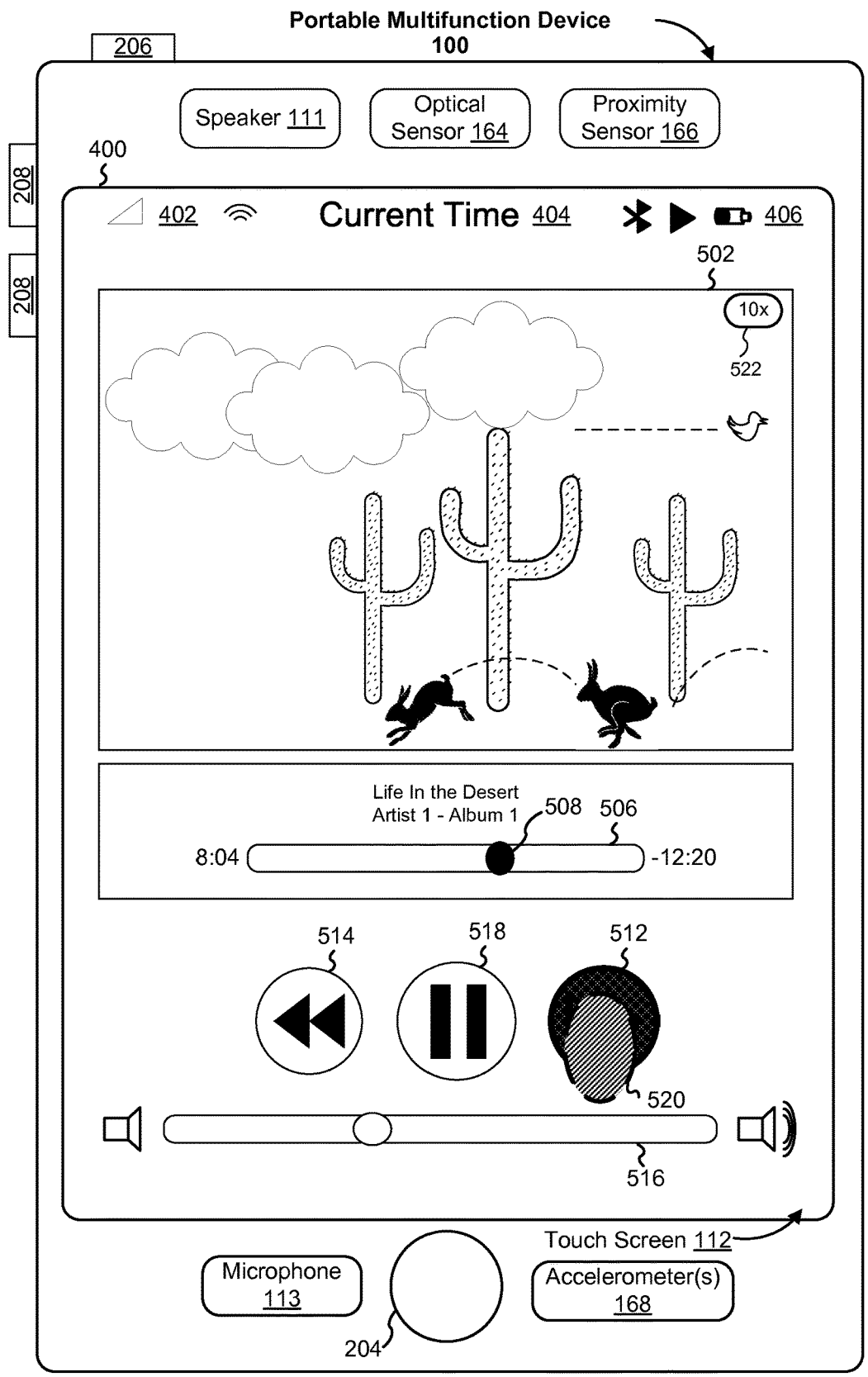

FIG. 5E illustrates that when the intensity of the same press input (e.g., the press input represented by contact 520 in FIGS. 5C and 5D) increases from the predetermined activation intensity threshold for 5× speed to above the next higher activation intensity threshold (e.g., the activation intensity threshold for 10× speed), the speed of the media playback is increased from the second fast forward speed (e.g., 5× speed) to a third, higher fast forward speed (e.g., 10× speed). In some embodiments, the higher fast forward speed (e.g., 10×) is indicated by speed indicator 522 in content window 502. In some embodiments, when the contact intensity reaches the next higher activation intensity threshold (e.g., the activation intensity threshold for 10× speed), fast forward control 512 is highlighted (e.g., in a different manner from the highlighting shown in FIGS. 5C and 5D) to indicate the activation of the higher fast forward speed (e.g., 10× speed). In some embodiments, tactile feedback (e.g., a tactile feedback that causes a click sensation in the user's finger in contact with fast forward control 512) is provided on touch screen 112 at the activation of the higher fast forward speed (e.g., 10× speed).

Figure 5F:
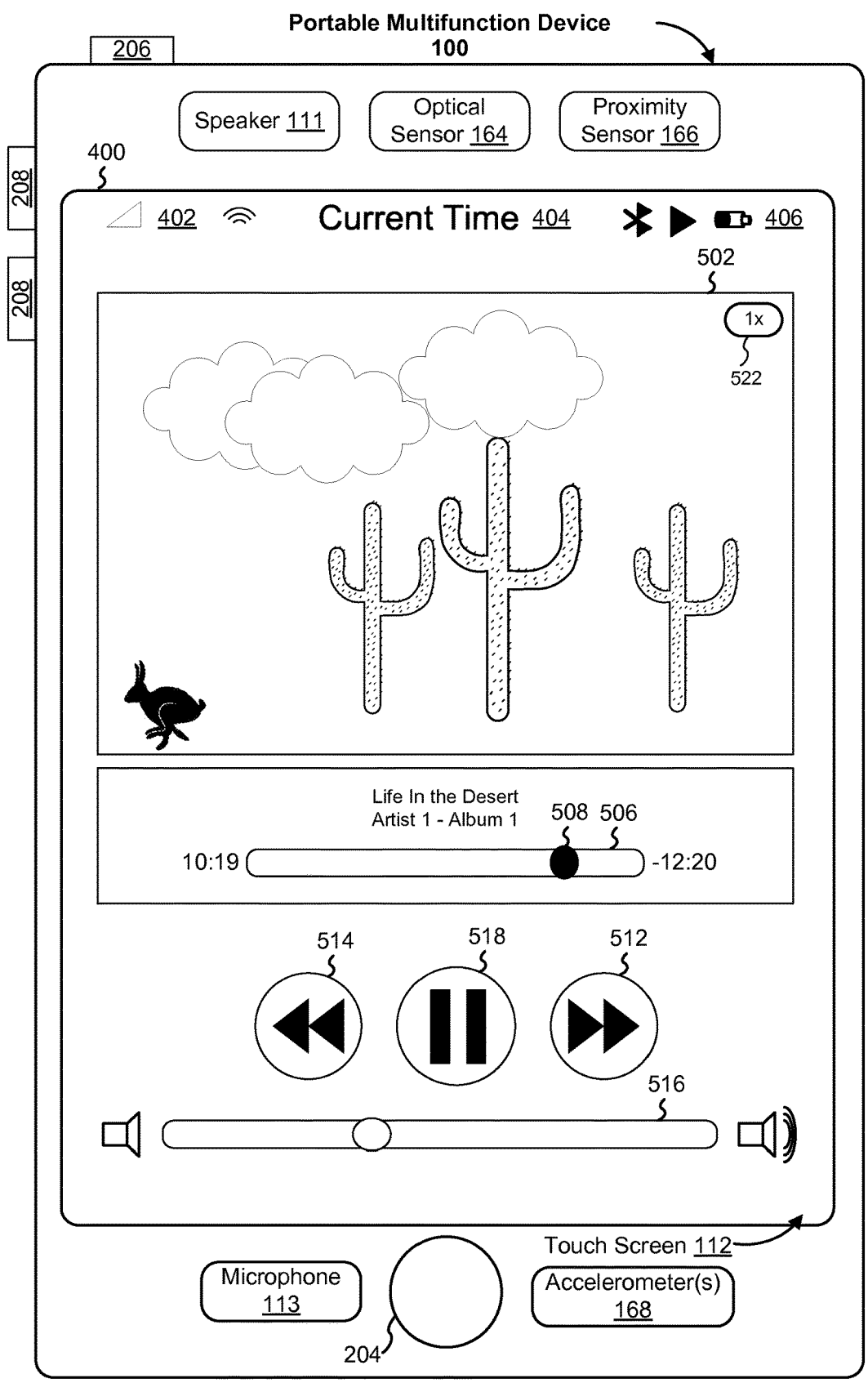

FIG. 5F illustrates that the press input (e.g., the press input represented by contact 520 in FIGS. 5C-5E) has been terminated (e.g., intensity of contact 520 has dropped below a predetermined release intensity threshold for a tap or light press input and/or become undetectable). Upon detection that the termination of press input, the playback speed of the media content is returned back to the normal playback speed (e.g., 1× speed). In some embodiments, when the playback speed is first returned to the normal playback speed, speed indicator 522 displays the playback speed (e.g., 1×). In some embodiments, after the playback speed has remained at the normal playback speed for a predetermined duration (e.g., 3 seconds), speed indicator 522 is optionally removed from content window 502. As shown in FIG. 5F, fast forward control 512 is returned to its normal un-highlighted appearance after the press input has been terminated.

In some embodiments, although not shown in FIGS. 5E and 5F, when the intensity of the press input drops gradually from a level above the activation intensity threshold for 10× speed to a level below the release intensity threshold for 2× speed, the intensity of contact 520 crosses respective release intensity thresholds for fast forward speed 10×, fast forward speed 5×, and fast forward speed 2×, one by one. In some embodiments, as the intensity of the contact crosses the respective release intensity thresholds of each of the fast forward speeds, the playback speed is dropped from a current fast forward speed to the next lower speed. Correspondingly, the highlighting of fast forward control 512 and the speed shown by speed indicator 522 are changed to those shown in FIGS. 5E, 5D, and 5C according to the current playback speed of the media content. In some embodiments, tactile feedback is provided at each instant that the respective release intensity threshold for the current fast forward speed is crossed.

The user interfaces illustrated in FIGS. 5A-5F are merely one example of how playback speed may be changed in response to a press input detected on a playback control. For example, in some embodiments, instead of a sustained press input, multiple press inputs or tap inputs may be used to raise the playback speed to different fast forward levels. In some embodiments, instead of returning the current playback speed to the normal playback speed or zero (0×) after a release intensity threshold for the lowest fast forward speed is crossed, the highest fast forward speed reached by a current press input can be locked in and maintained until a separate speed-restoring input is received (e.g., when a tap input is detected on pause control 518 or fast forward control 512). In some embodiments, whether to lock in a speed depends on the intensity profile of the press input relative to a predetermined lock time threshold (or time delay). In some embodiments, instead of increasing the playback speed in the forward direction in response to a press input detected on fast forward control 512, the rewind speed may be increased in a similar manner in response to a press input detected on rewind control 514.

FIGS. 6A-6K illustrate exemplary control heuristics for controlling media presentation in accordance with some embodiments. The control heuristics illustrated in these figures may be used in the processes described below, including the processes in FIGS. 7A-7H and 8A-8C. The inputs referenced in the description of the control heuristics may be inputs on a touch-screen display (where the touch-sensitive surface and the display are combined), or in some embodiments, inputs on a touch-sensitive surface 451 that is separate from the display 450, as shown in FIG. 4B.

Figures 6A, 6B:
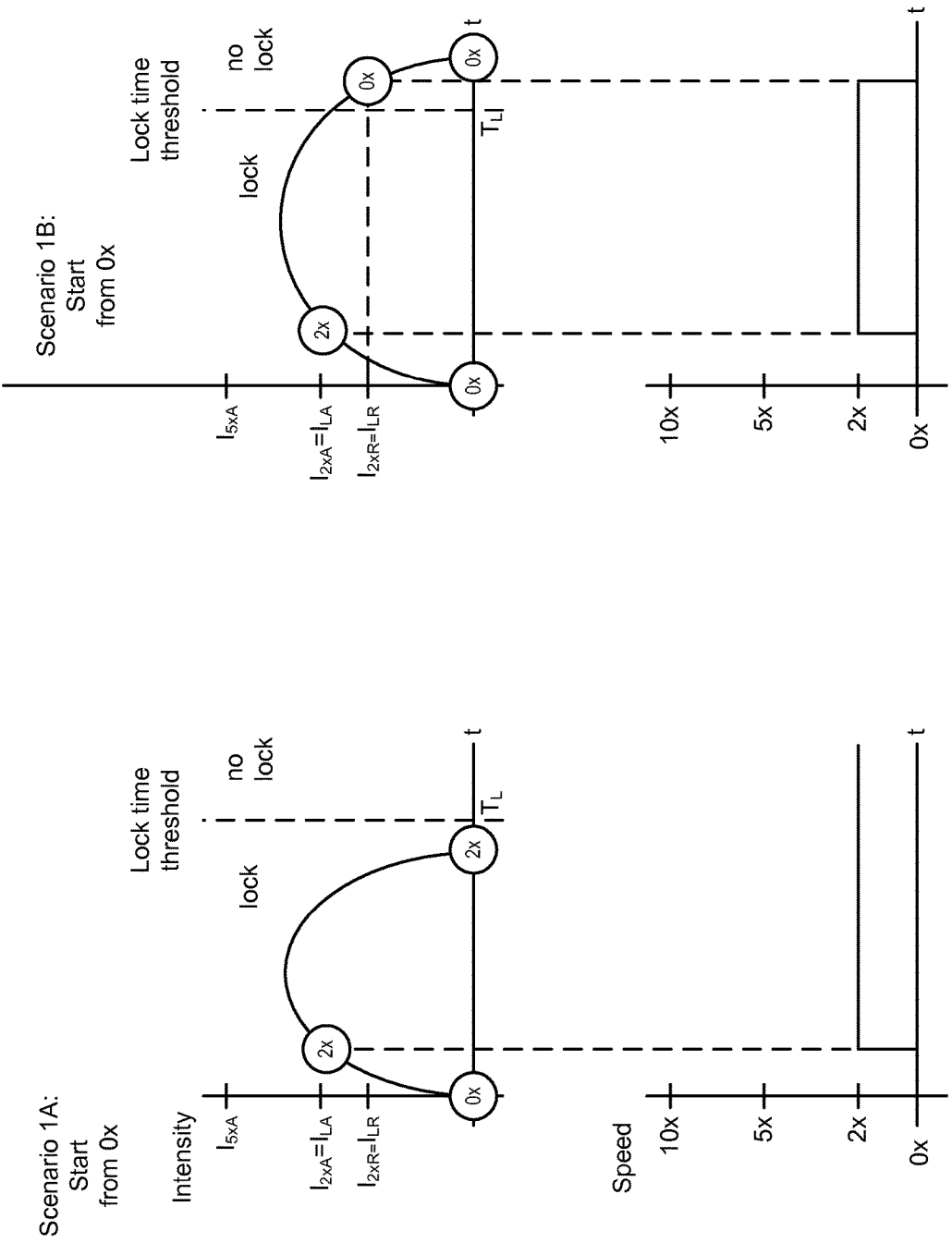
FIGS. 6A-6K illustrate exemplary control heuristics for controlling media presentation in accordance with some embodiments.

FIGS. 6A and 6B illustrate how a lock time threshold $T_L$ is used to determine whether a light press input that triggers activation of a first fast forward speed (e.g., 2×) will cause the fast forward speed to be locked in after the light press input is terminated. In FIGS. 6A and 6B, the initial playback speed at the time that the press input is received is zero (0×). In other words, the media content is in a paused or stopped state when the light press input is first detected (e.g., with a finger-down event triggered by the initial contact of a finger on the touch screen). The lock time threshold $T_L$ may be any suitable length (e.g., 50 ms, 100 ms, 200 ms, 300 ms, 500 ms, 700 ms, or 1000 ms), and is optionally predefined in accordance with user preference or heuristics.

FIG. 6A illustrates an exemplary scenario where the intensity of the press input increases above the activation intensity threshold $I_{2\times A}$ (e.g., $I_{2\times A}$=the activation intensity threshold $I_{LA}$ for a "light press" input) of the first fast forward speed (e.g., 2×), and then falls below the release intensity threshold $I_{2\times R}$ (e.g., $I_{2\times R}$=the release intensity threshold $I_{LR}$ for a "light press" input) of the first fast forward speed (e.g., 2×) before the lock time threshold $T_L$ expires. The intensity of the press input never reaches the activation intensity threshold of the next higher playback speed (e.g., $I_{5\times A}$). As a result, the speed of playback is increased from zero (0×) to the first fast forward speed (e.g., 2×) upon crossing of the activation intensity threshold $I_{2\times A}$ and remains at the first fast forward speed (e.g., 2×) after the intensity of the press input drops below the release intensity threshold $I_{2\times R}$ for the first fast forward speed (e.g., 2×) and the press input is finally terminated (e.g., when the intensity drops below the contact-detection intensity or becomes undetectable).

FIG. 6B illustrates an exemplary scenario where, instead of falling below the release intensity threshold $I_{2\times R}$ before the lock time threshold $T_L$ is reached, the intensity of the press input stayed above the release intensity threshold $I_{2\times R}$ until the lock time threshold $T_L$ has expired. The intensity of the press input then falls below the release intensity threshold $I_{2\times R}$ of the first fast forward speed (e.g., 2×) before the press input is terminated. The intensity of the press input never reached the activation intensity of the next higher playback speed. As a result, the speed of playback is increased from zero (0×) to the first fast forward speed (e.g., 2×) upon crossing of the activation intensity threshold $I_{2\times A}$ and remains at the first fast forward speed (e.g., 2×) until the intensity of the press input drops below the release intensity threshold $I_{2\times R}$ for the first fast forward speed (e.g., 2×). In response to the intensity of the press input dropping below the release intensity threshold $I_{2\times R}$ for the first fast forward speed (e.g., 2×), the playback speed is decreased from the first fast forward speed (e.g., 2×) to zero. The media player is returned from a fast forward state to the paused state. In some embodiments, as the contact intensity falls below the corresponding release intensity threshold for the higher playback speed, the reduction of the playback speed to zero may be gradual (e.g., in accordance with the rate of reduction of the contact intensity).

Although the above description of FIGS. 6A and 6B uses fast forwarding as an example. The same control heuristic can be used for rewinding. For example, in response to a light press input detected on a rewind control (e.g., rewind control 514) while the media player is in a paused or stopped state, the rewind speed is increased from zero to a first rewind speed (e.g., 2×) in the backward direction when the intensity of the press input reaches above the activation intensity threshold associated with the first rewind speed (e.g., 2×). Depending on the intensity profile of the press input relative to the lock time threshold $T_L$, the rewind speed may be locked in at the first rewind speed (e.g., 2×), or returned to zero when the intensity of the press input drops below the release intensity associated with the first rewind speed (e.g., 2×).

In some embodiments, the respective activation intensity threshold and release intensity threshold associated with the first fast forward speed (e.g., 2×) are the same. In some embodiments, the respective activation intensity threshold and release intensity threshold associated with the first fast forward speed (e.g., 2×) are different, with the activation intensity threshold being greater than the release intensity threshold. In some embodiments, the activation intensity threshold and release intensity threshold associated with the first higher speed level (e.g., fast forward speed of 2× and rewind speed of 2×) are the same as the activation intensity threshold and release intensity threshold for a tap input that activates the play button (e.g., play control 510) of the media player.

Figure 6D:
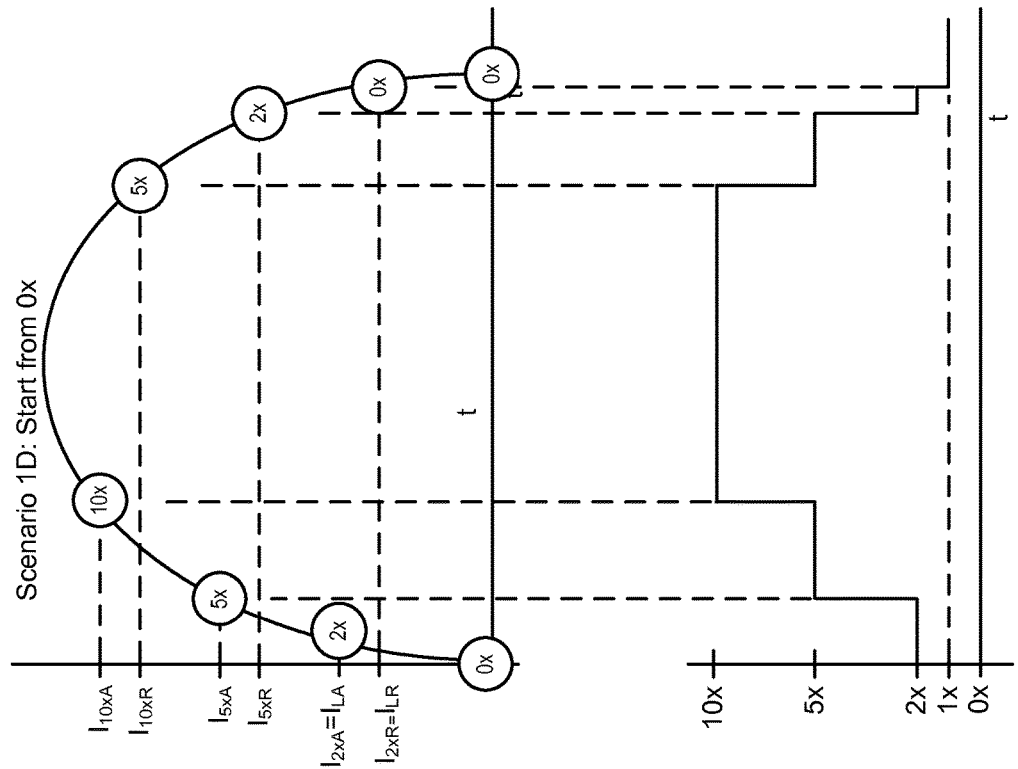
Figure 6C:
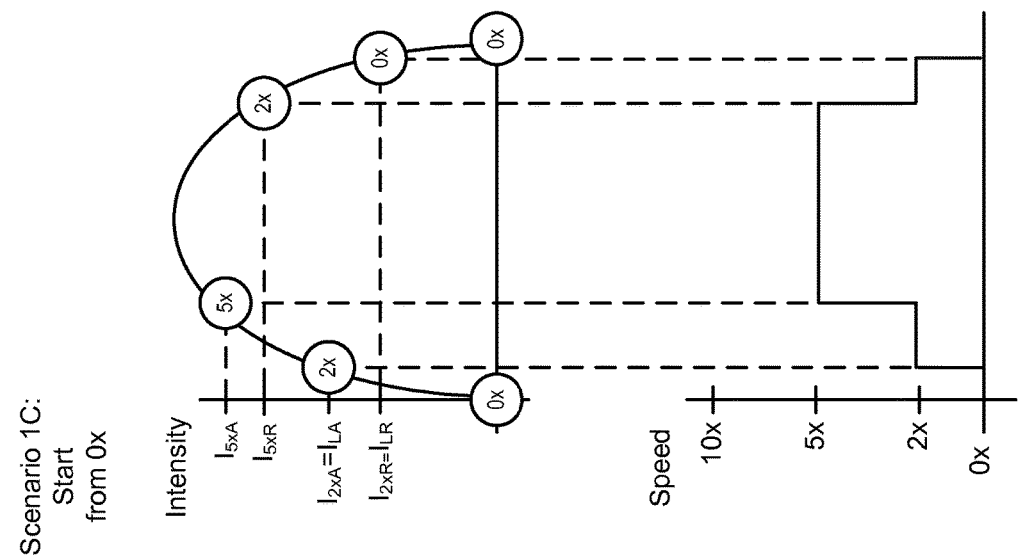

FIG. 6A above illustrates how to lock into a next higher playback speed with a light press input while the media player is in a stopped or paused state. FIGS. 6B-6D illustrate control heuristics in which higher playback speeds (e.g., different levels of fast forward or rewind speeds) are not locked in at the end of the press input (e.g., a press input with an intensity reaching above one or more higher activation intensity thresholds (e.g., the activation intensity thresholds associated with 2×, 5×, and 10× speeds). Instead, the playback speed is gradually stepped up in discrete levels and then stepped down to a predetermined level (e.g., 0×).

FIG. 6C illustrates that, when the media player is at a paused or stopped state (with a playback speed of 0×), a deep press input with an intensity reaching above the respective activation intensity thresholds associated with two consecutive fast forward speeds (e.g., $I_{2\times A}$ associated with fast forward speed 2×, and $I_{5\times A}$ associated with fast forward speed 5×) is detected. In response to the rising intensity of the deep press input, the playback speed is stepped up from zero (0×) to the first fast forward speed (e.g., 2×) upon the intensity crossing the activation intensity threshold (e.g., $I_{2\times A}$) associated with the first fast forward speed (e.g., 2×). Then, as the intensity of the deep press input continues to increase and crosses the activation intensity threshold (e.g., $I_{5\times A}$) associated with the next higher fast forward speed (e.g., 5×), the playback speed is stepped up from the first fast forward speed (e.g., 2×) to the next higher fast forward speed (e.g., 5×). When the intensity of the deep press input then decreases and crosses the release intensity threshold (e.g., $I_{5\times R}$) associated with the highest achieved fast forward speed (e.g., 5×), the playback speed is stepped down from the highest achieved fast forward speed (e.g., 5×) to the next lower fast forward speed (e.g., 2×). When the intensity of the deep press input further decreases and crosses the release intensity threshold (e.g., $I_{2\times R}$=$I_{LR}$) associated with the next lower fast forward speed (e.g., 2×), the media player is returned to the paused state with a playback speed of zero (0×).

FIG. 6D is similar to FIG. 6C, where the media player is in a stopped or paused state when a deep press input is detected. The intensity of the deep press input reaches above the respective activation intensity thresholds associated with three fast forward speeds (e.g., $I_{2\times A}$ associated with fast forward speed 2×, $I_{5×A}$ associated with fast forward speed 5×, and $I_{10×A}$ associated with fast forward speed 10×). In response to the rising intensity of the deep press input, the playback speed is stepped up from zero to the initial fast forward speed of 2× upon the intensity crossing the activation intensity threshold $I_{2×A}$, then from the initial fast forward speed of 2× to the next higher fast forward speed of 5× upon the intensity crossing the activation intensity threshold $I_{5×A}$, and then from the fast forward speed of 5× to the next higher fast forward speed of 10× upon the intensity crossing the activation intensity threshold $I_{10×A}$. When the intensity of the deep press input has peaked and started to decrease, the playback speed is stepped down from the highest achieved fast forward speed of 10× to the next lower fast forward speed of 5× upon the intensity crossing the release intensity threshold $I_{10×R}$ associated with the fast forward speed of 10×. When the intensity of the deep press input decreases further and crosses the release intensity threshold $I_{5×R}$ associated with the fast forward speed of 5×, the playback speed is stepped down from the fast forward speed of 5× to the next lower fast forward speed of 2×. When the intensity of the press input decreases further and crosses the release intensity threshold $I_{2×R}$ (e.g., $I_{2×R}=I_{LR}$) associated with the fast forward speed of 2×, the media player is returned to the paused state with a playback speed of zero.

Although the above description of FIGS. 6C and 6D uses fast forwarding as an example. The same control heuristic can be used for rewinding. For example, in response to a deep press input detected on a rewind control (e.g., rewind control 514) while the media player is in a paused or stopped state, the rewind speed is stepped up from zero to two or more higher rewind speeds (e.g., 2×, 5×, and 10×) in the backward direction when the intensity of the deep press input reaches above the activation intensity threshold associated each of those higher rewind speeds. On the downstroke of the deep press input, the rewind speed is stepped down from the highest achieved rewind speed to each of the lower rewind speeds, and finally to zero, when the intensity of the deep press input reaches below the release intensity threshold associated with each of the previously achieved rewind speeds.

Figures 6E, 6F:
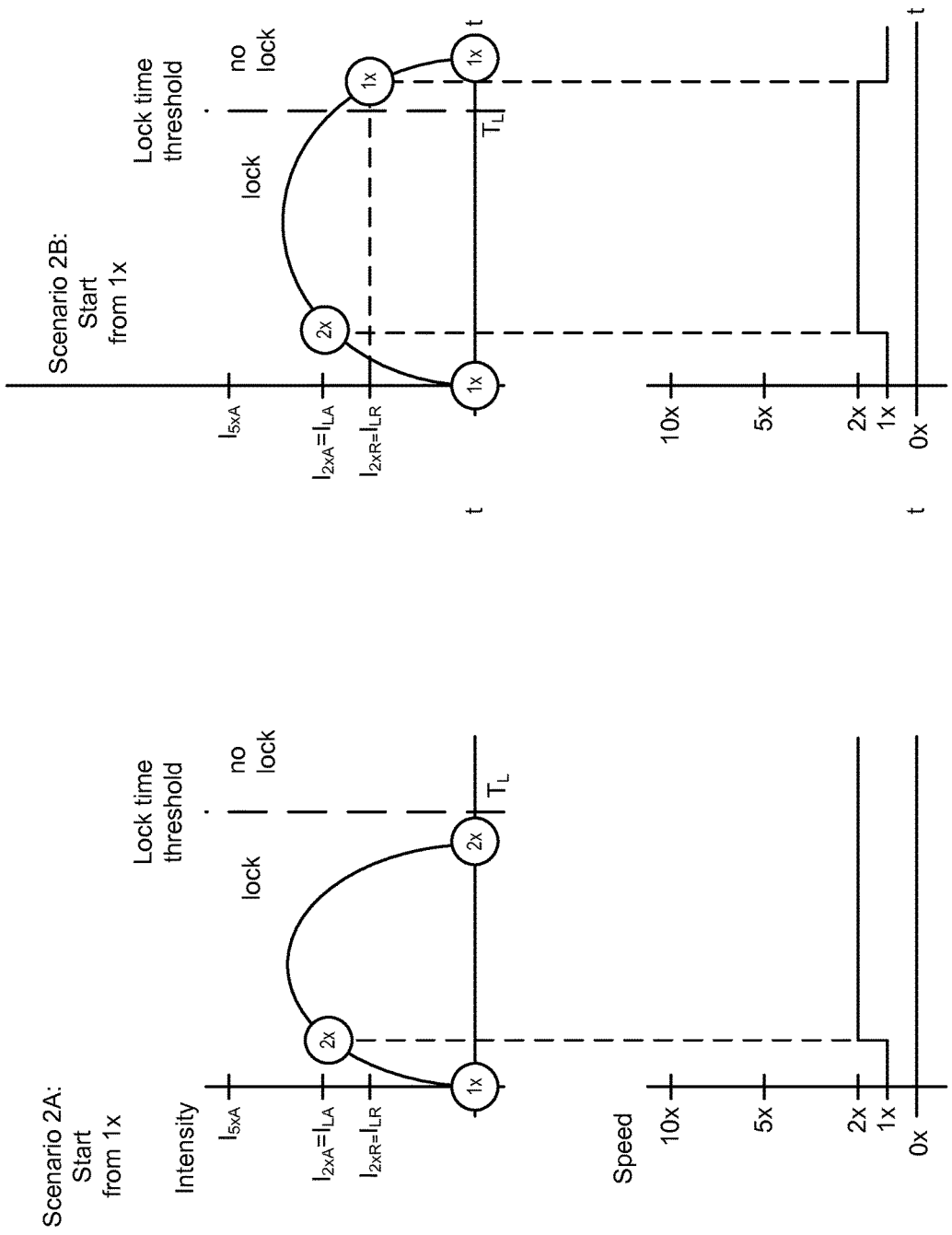

FIGS. 6E and 6F illustrate how a lock time threshold $T_L$ (e.g., the same $T_L$ value or a different $T_L$ value from the $T_L$ value in FIGS. 6A and 6B) is used to determine whether a light press input that triggers activation of a first fast forward speed (e.g., 2×) will cause the fast forward speed to be locked in after the light press input is terminated. In FIGS. 6E and 6F, the initial playback speed at the time that the light press input is received is the normal playback speed (e.g., 1×). In other words, the media content is in a normal playback state when the light press input is first detected (e.g., with a finger-down event triggered by the initial contact of a finger on the touch screen). The lock time threshold $T_L$ may be any suitable length (e.g., 50 ms, 100 ms, 200 ms, 300 ms, 500 ms, 700 ms, or 1000 ms), and is optionally predefined in accordance with user preference or heuristics.

FIG. 6E illustrates an exemplary scenario where the intensity of the deep press input increases above the activation intensity threshold $I_{2×A}$ (e.g., $I_{2×A}$=the activation intensity threshold $I_{LA}^-$ for a "light press" input) of a first fast forward speed (e.g., 2×), and then falls below the release intensity threshold $I_{2×R}$ (e.g., $I_{2×R}$=the activation intensity threshold $I_{LR}^-$ for a "light press" input) of the first fast forward speed (e.g., 2×) before the lock time threshold $T_L$ expires. The intensity of the light press never reaches the next higher activation intensity threshold (e.g., $I_{5×A}$). As a result, the speed of playback is increased from the normal playback speed (e.g., 1×) to the first fast forward speed (e.g., 2×) upon crossing of the activation intensity threshold $I_{2×A}$ and remains at the first fast forward speed (e.g., 2×) after the intensity of the light press input has dropped below the release intensity threshold $I_{2×R}$ for the first fast forward speed (e.g., 2×) and the press input is finally terminated (e.g., when the intensity drops below the contact-detection intensity or becomes undetectable).

FIG. 6F illustrates an exemplary scenario where, instead of falling below the release intensity threshold $I_{2×R}$ before the lock time threshold $T_L$ is reached, the intensity of the light press input stayed above the release intensity threshold $I_{2×R}$ until the lock time threshold $T_L$ has expired. The intensity of the press input then falls below the release intensity threshold $I_{2×R}$ of the first fast forward speed (e.g., 2×) before the press input is terminated. The intensity of the light press input never reached the next higher activation intensity threshold (e.g., $I_{5×A}$). As a result, the speed of playback is increased from the normal playback speed (e.g., 1×) to the first fast forward speed (e.g., 2×) upon crossing of the activation intensity threshold $I_{2×A}$ and remains at the first fast forward speed (e.g., 2×) until the intensity of the light press input drops below the release intensity threshold $I_{2×R}$ for the first fast forward speed (e.g., 2×). When the intensity of the light press input drops below the release intensity threshold $I_{2×R}$ for the first fast forward speed (e.g., 2×), the playback speed is decreased from the first fast forward speed (e.g., 2×) to the normal playback speed (e.g., 1×). The media player is returned from a fast forward state to the normal playback state.

Although the above description of FIGS. 6E and 6F uses fast forwarding as an example. The same control heuristic can be used for rewinding. For example, in response to a light press input detected on a rewind control (e.g., rewind control 514) while the media player is in a normal playback state (e.g., at 1× speed), the media player can change the normal playback speed in the forward direction to a first rewind speed (e.g., 2×) in the backward direction when the intensity of the light press input reaches above the activation intensity threshold associated with the first rewind speed (e.g., 2×). Depending on the intensity profile of the light press input relative to the lock time threshold $T_L$, the rewind speed may be locked in at the first rewind speed (e.g., 2×) in the backward direction, or returned to the normal playback speed (e.g., 1×) in the forward direction when the intensity of the light press input drops below the release intensity associated with the first rewind speed (e.g., 2×).

Figures 6G, 6H:
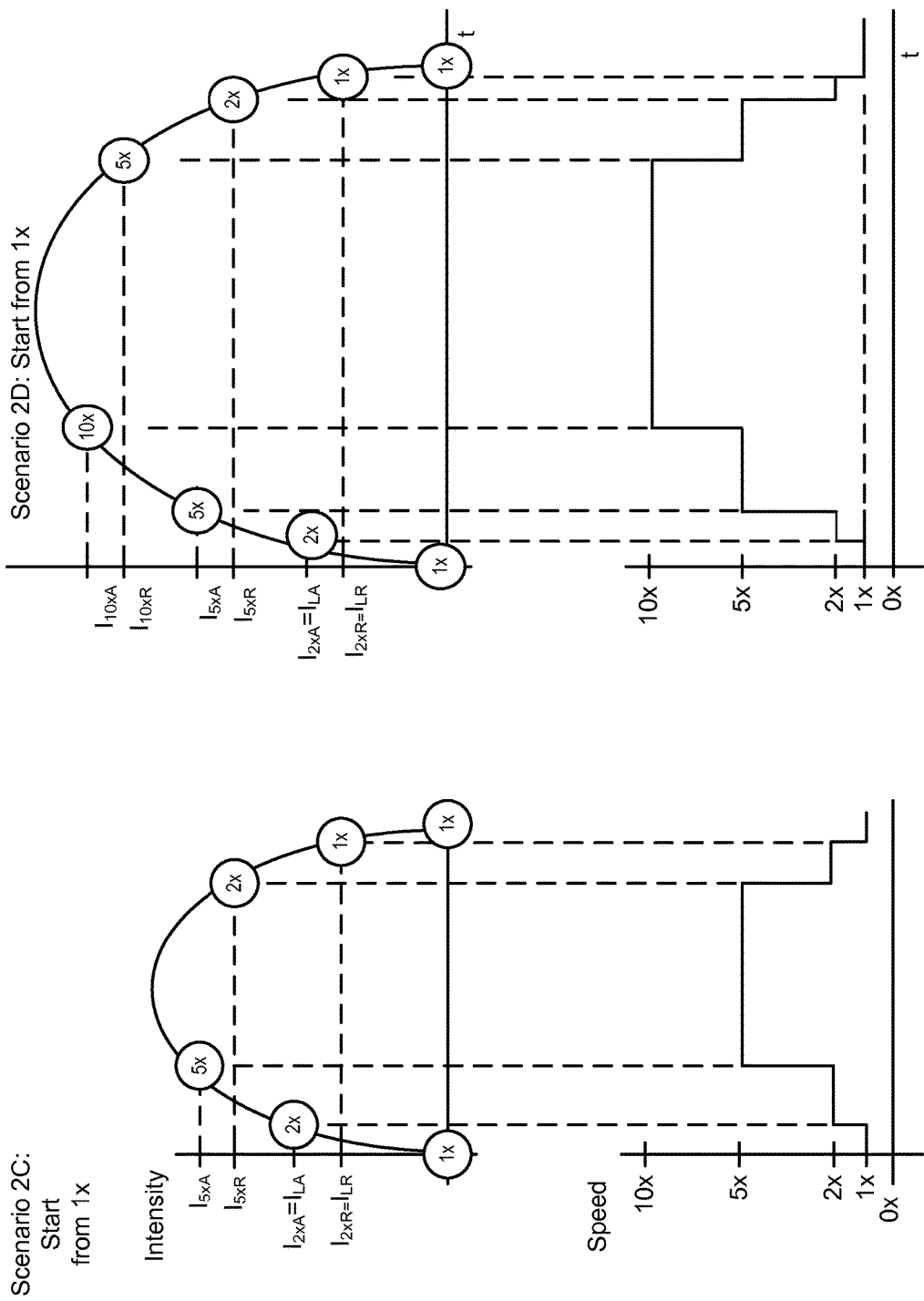

FIG. 6E above illustrates how to lock into a next higher playback speed with a light press input while the media player is in a normal playback state. FIGS. 6F-6H illustrate control heuristics in which higher playback speeds (e.g., different levels of fast forward or rewind speeds) are not locked in at the end of the press input (e.g., a deep press input with an intensity reaching above one or more higher activation intensity thresholds (e.g., the activation intensity thresholds associated with 2×, 5×, and 10× speeds). Instead, the playback speed is gradually stepped up in discrete levels and then stepped down to a predetermined level (e.g., 1×).

FIG. 6G illustrates that, when the media player is already in a normal playback state (e.g., with a playback speed of 1×), a deep press input reaching above the respective activation intensity thresholds associated with two consecutive fast forward speeds (e.g., $I_{2×A}$ associated with fast forward speed 2×, and $I_{5×A}$ associated with fast forward speed 5×) is detected. In response to the rising intensity of the press input, the playback speed is stepped up from the normal playback speed (e.g., 1×) to the first fast forward speed (e.g., 2×) upon the intensity crossing the activation intensity threshold (e.g., $I_{2\times A}$) associated with the first fast forward speed (e.g., 2×). Then, as the intensity of the deep press input continues to increase and crosses the next higher activation intensity threshold (e.g., $I_{5\times A}$) associated with the next higher fast forward speed (e.g., 5×), the playback speed is stepped up from the first fast forward speed (e.g., 2×) to the next higher fast forward speed (e.g., 5×). When the intensity of the deep press input then decreases and crosses the release intensity threshold $I_{5\times R}$ associated with the highest achieved fast forward speed (e.g., 5×), the playback speed is stepped down from the highest achieved fast forward speed (e.g., 5×) to the next lower fast forward speed (e.g., 2×). When the intensity of the deep press input further decreases and crosses the release intensity threshold (e.g., $I_{2\times R}=I_{LR}$) associated with the lowest fast forward speed (e.g., 2×), the media player is returned to the normal playback state with a normal playback speed (e.g., 1×).

FIG. 6H is similar to FIG. 6G, where the media player is already in a normal playback state (e.g., with a playback speed of 1×) when a deep press input is detected. The intensity of the deep press input reaches above the respective activation intensity thresholds associated with three fast forward speeds (e.g., $I_{2\times A}$ associated with fast forward speed 2×, $I_{5\times A}$ associated with fast forward speed 5×, and $I_{10\times A}$ associated with fast forward speed 10×). In response to the rising intensity of the deep press input, the playback speed is stepped up from the normal playback speed (e.g., 1×) to the initial fast forward speed (e.g., 2×) upon the intensity crossing the lowest activation intensity threshold (e.g., $I_{2\times A}$), then from the initial fast forward speed (e.g., 2×) to the next higher fast forward speed (e.g., 5×) upon the intensity crossing the corresponding activation intensity threshold (e.g., $I_{5\times A}$), and then from that higher fast forward speed (e.g., 5×) to the next, even higher fast forward speed (e.g., 10×) upon the intensity crossing the corresponding activation intensity threshold (e.g., $I_{10\times A}$). When the intensity of the deep press input has peaked and started to decrease, the playback speed is stepped down from the highest achieved fast forward speed (e.g., 10×) to the next lower fast forward speed (e.g., 5×) upon the intensity crossing the release intensity threshold (e.g., $I_{10\times R}$) associated with the highest achieved fast forward speed (e.g., 10×). When the intensity of the deep press input decreases further and crosses the release intensity threshold (e.g., $I_{5\times R}$) associated with the fast forward speed of 5×, the playback speed is stepped down from the fast forward speed of 5× to the next lower fast forward speed of 2×. When the intensity of the press input decreases further and crosses the release intensity threshold $I_{2\times R}$ (e.g., $I_{2\times R}=I_{LR}$) associated with the fast forward speed of 2×, the media player is returned to the normal playback state and stays in the normal playback state with a playback speed of 1×. Corresponding user interface changes for the scenario shown in FIG. 6H are illustrated in FIGS. 5A-5F.

Although the above description of FIGS. 6G and 6H uses fast forwarding as an example. The same control heuristic can be used for rewinding. For example, in response to a deep press input detected on a rewind control (e.g., rewind control 514) while the media player is in a normal playback state, the device goes from the normal playback state into the rewind state, and the rewind speed is stepped up from zero to two or more higher rewind speeds (e.g., 2×, 5×, and 10×) in the backward direction when the intensity of the deep press input reaches above the activation intensity threshold associated each of those higher rewind speeds. On the down-stroke of the deep press input, the rewind speed is stepped down from the highest achieved rewind speed to each of the lower rewind speeds, and finally to zero, when the intensity of the deep press input reaches below the release intensity threshold associated with each of the previously achieved rewind speeds. When the rewind speed is back to zero, the device restarts the playback with a normal playback speed in the forward direction.

Figures 6I, 6J, 6K:
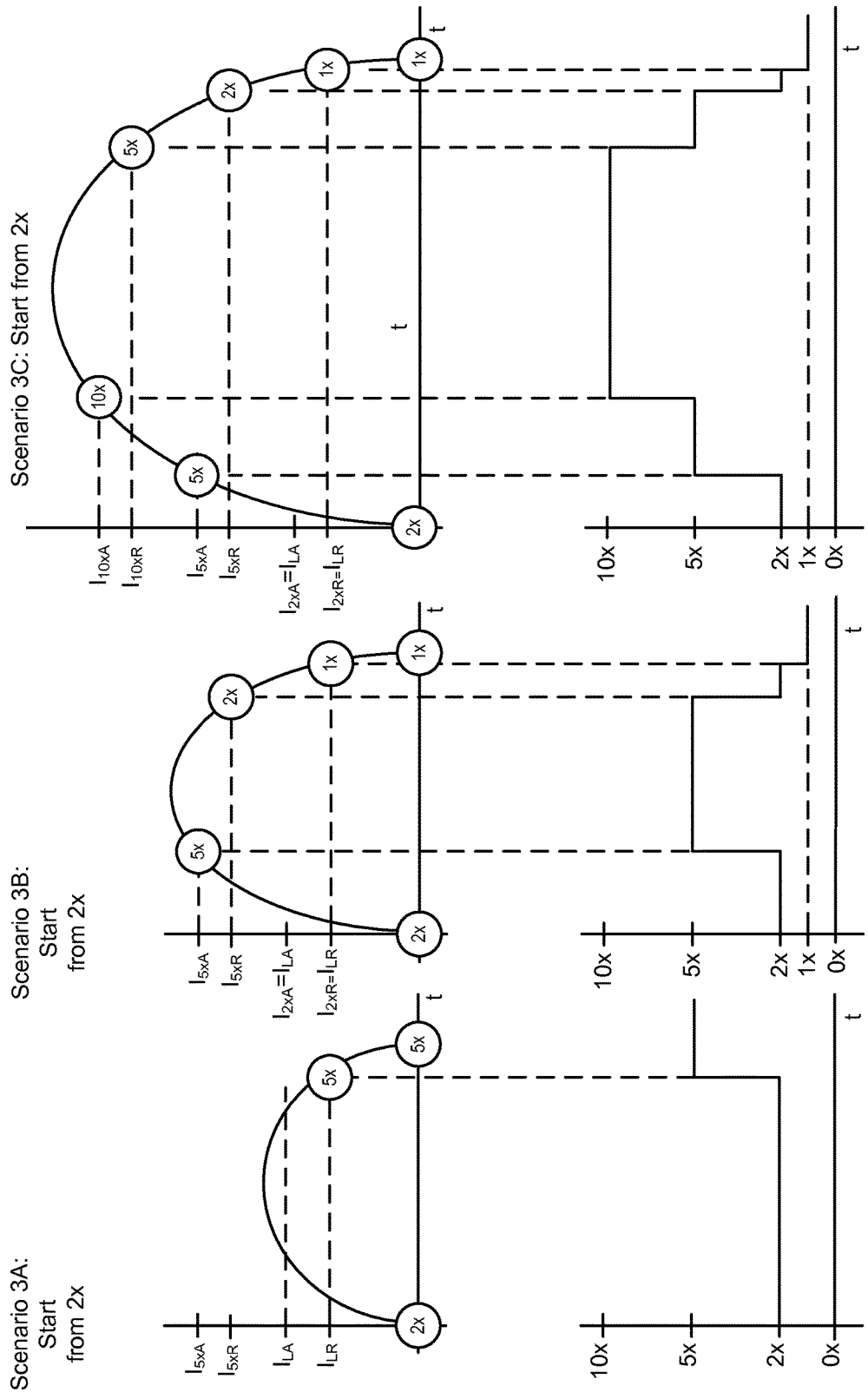
Figure 7B:
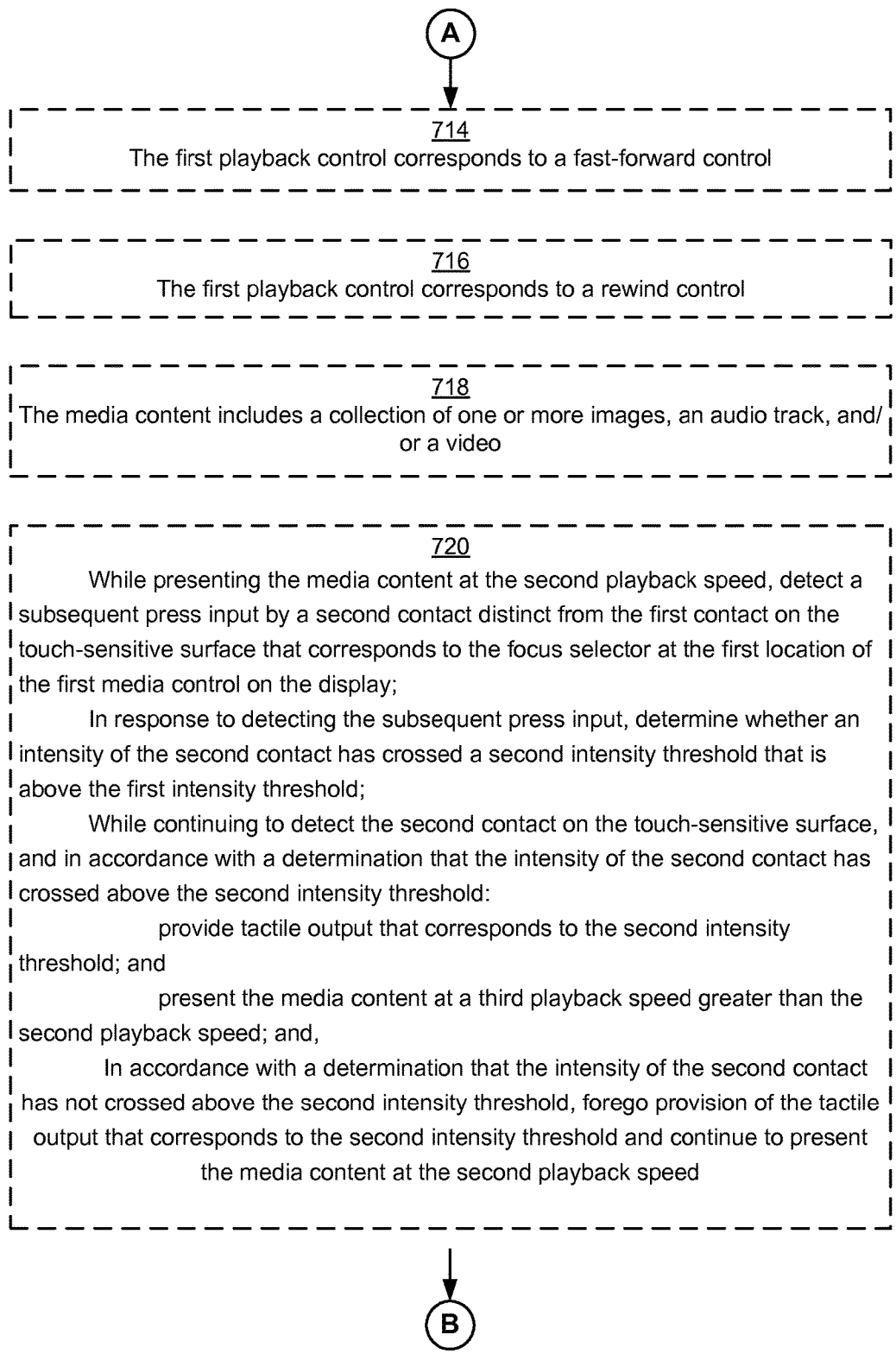
Figure 7C:
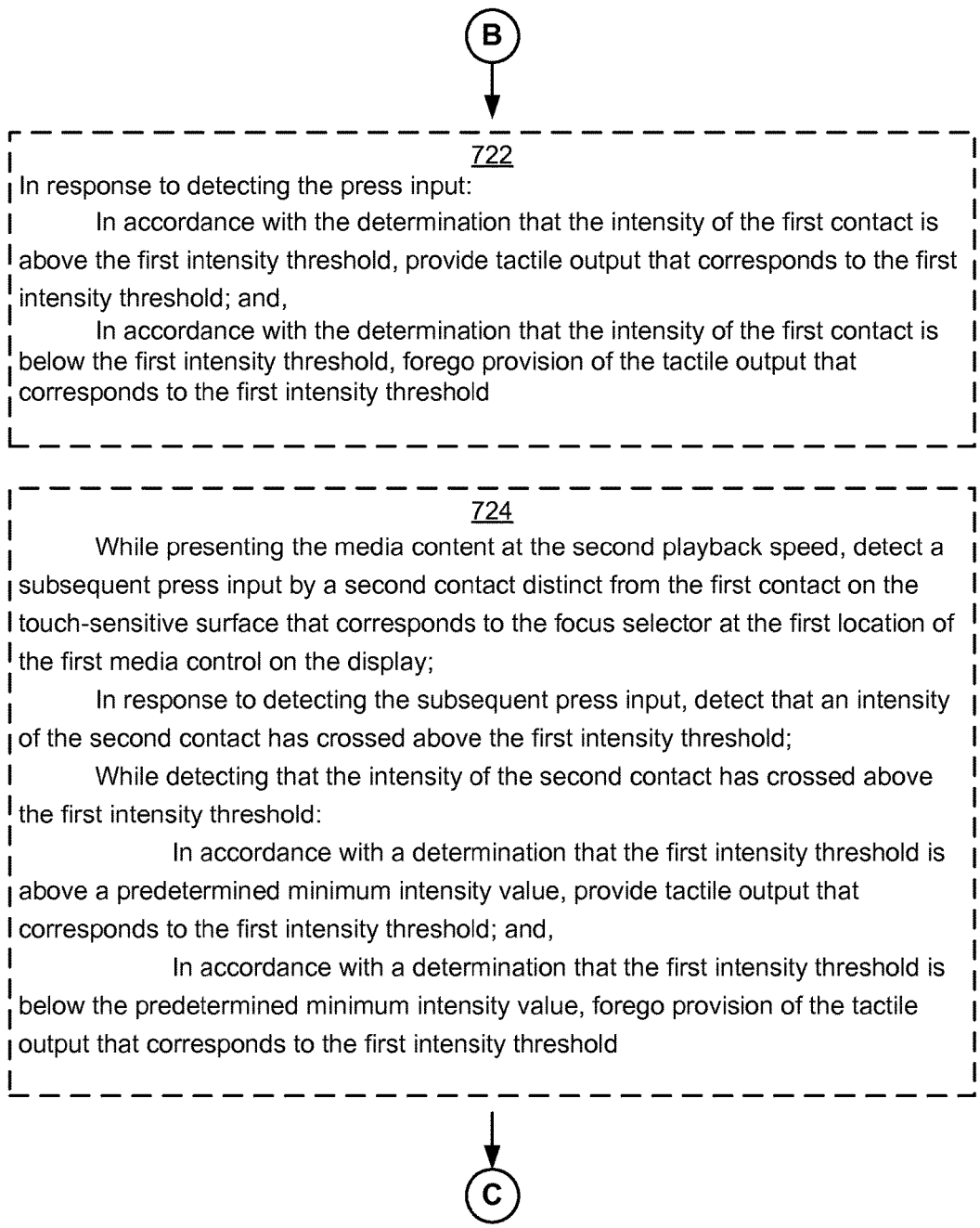
Figure 7D:
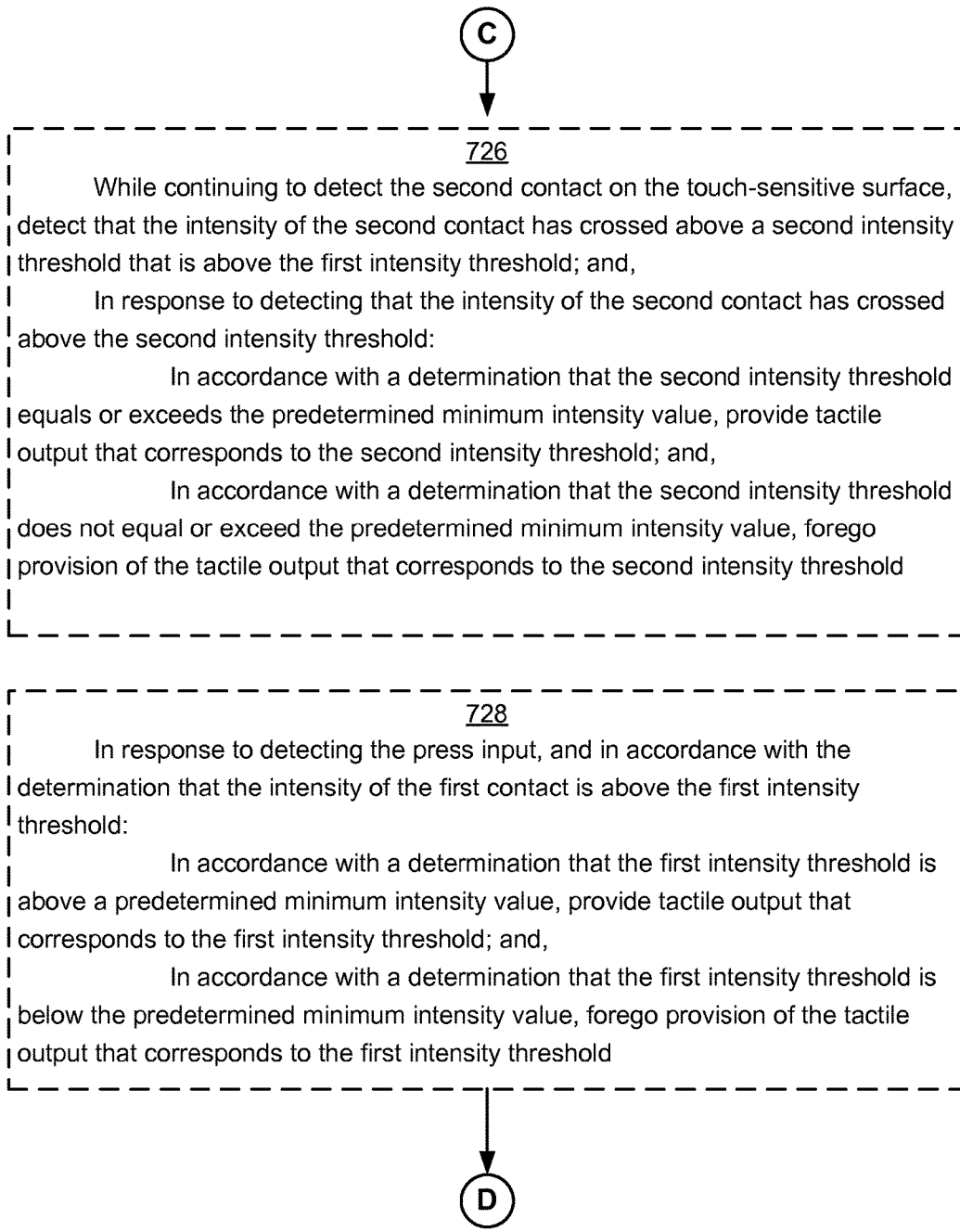
Figure 7E:
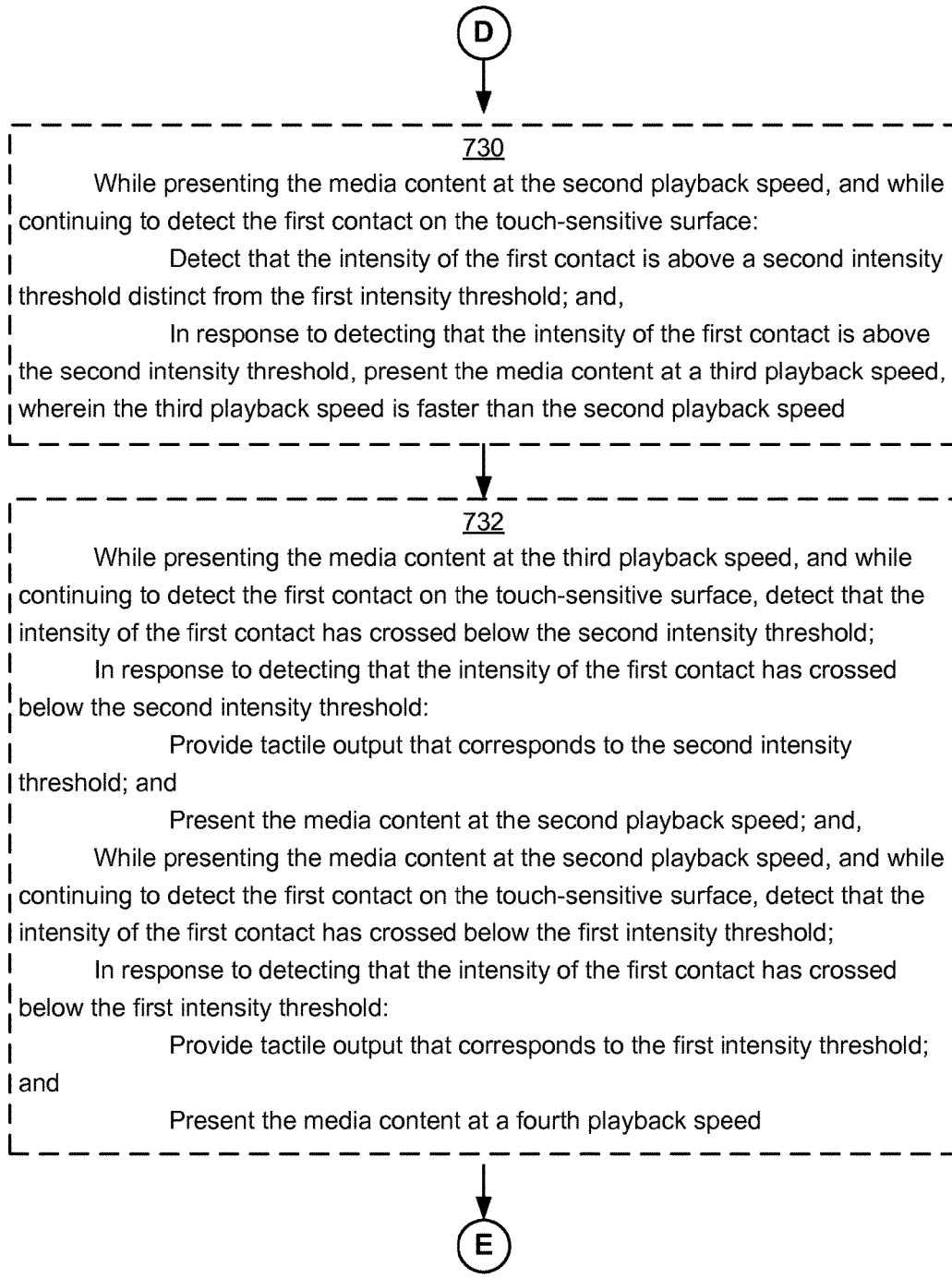
Figure 7H:
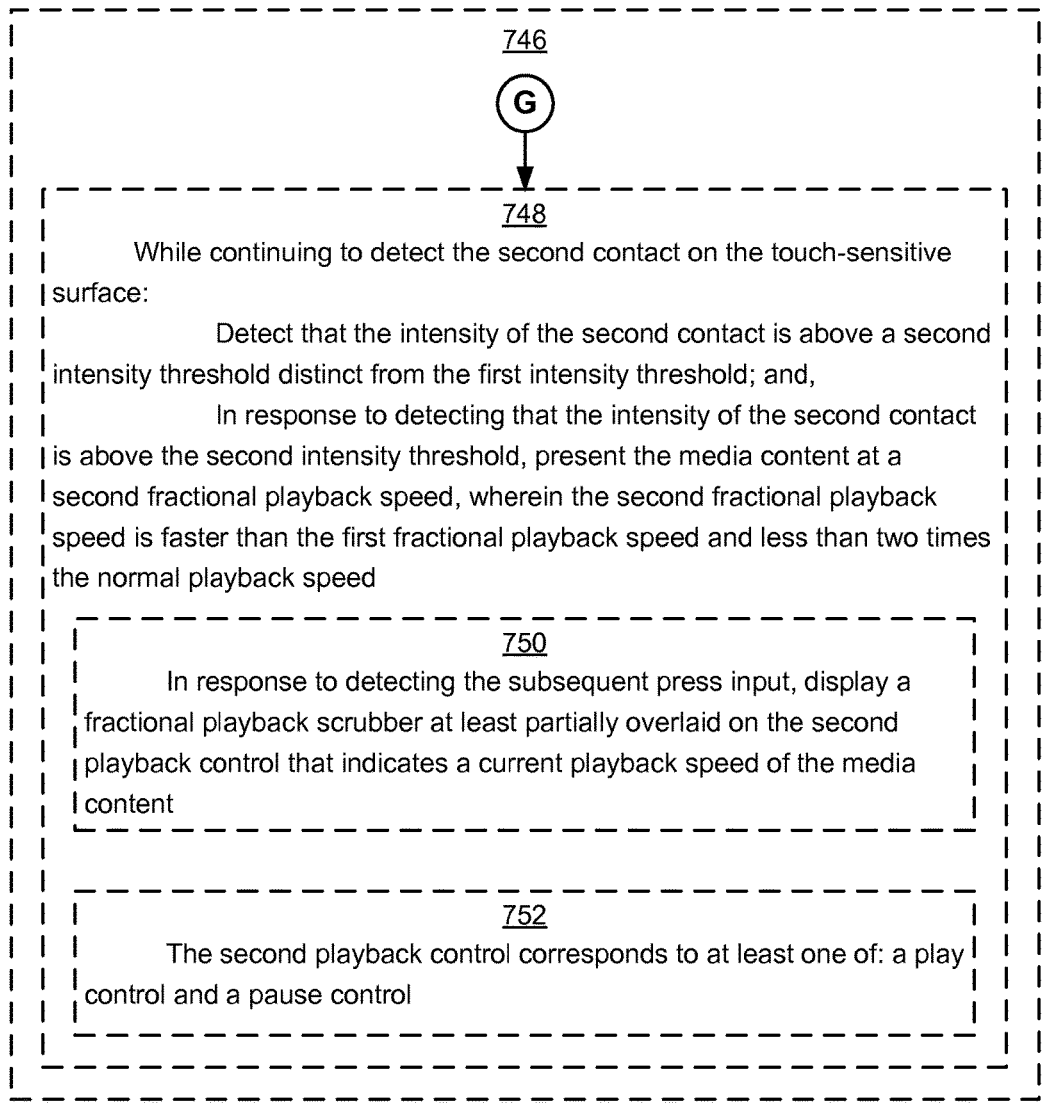

FIGS. 6I-6K illustrate three control heuristics in which the initial playback speed of the media content is greater than the normal playback speed, e.g., at a first fast forward speed of 2×, when a press input is detected.

FIG. 6I illustrates a control heuristic in which the lock time threshold $T_L$ is not used to lock in a higher playback speed (e.g., a fast forward speed of 5×). As shown in FIG. 6I, the initial playback speed at the time that the press input is received is the first fast forward speed (e.g., 2×). In other words, the media content is already being fast forwarded at 2× speed after a previous press input (e.g., the press input described in FIG. 6A or 6E) on the fast forward control has been processed. As shown in FIG. 6I, in some embodiments, instead of triggering the next higher fast forward speed (e.g., 5×) upon detecting the intensity of the press input reaching above the activation intensity threshold (e.g., $I_{5\times A}$) associated with the next higher fast forward speed (e.g., 5×), the playback speed is increased from the current fast forward speed (e.g., 2×) to the next higher fast forward speed (e.g., 5×) when the intensity of the light press input drops below the release intensity threshold $I_{LR}$ of a light press. In other words, instead of triggering the activation of the higher playback speed on the down-stroke (or pushing down) of the light press input, the higher playback speed is triggered on the up-stroke (or lifting up) of the light press input. As shown in FIG. 6I, if the media player is already in a fast forward state, a newly detected tap input on the fast forward control will cause the media player to go into and lock in the next higher fast forward speed (e.g., 5×).

Although the above description of FIG. 6I uses fast forwarding as an example. The same control heuristic can be used for rewinding. For example, when the media player is already in the rewind state with a rewind speed of 2× in the backward direction, in response to a tap input detected on the rewind control (e.g., rewind control 514), the media player changes the rewind speed from 2× to 5× and maintains it at 5× in response to the intensity of the tap input falling below the release intensity threshold $I_{LR}$.

FIG. 6J illustrates that, when the media player is already in an initial fast forward state (with a fast forward speed of 2×), a deep press input reaching above the respective activation intensity threshold associated with the next higher fast forward speed (e.g., $I_{5\times A}$ associated with fast forward speed of 5×) is detected. In response to the rising intensity of the deep press input, the playback speed is stepped up from the initial fast forward speed of 2× to the next higher fast forward speed of 5× upon the intensity crossing the activation intensity threshold $I_{5\times A}$ associated with the next higher fast forward speed of 5×. When the intensity of the deep press input then decreases and crosses the release intensity threshold $I_{5\times R}$ associated with the fast forward speed of 5×, the playback speed is stepped down from the fast forward speed of 5× to the next lower fast forward speed of 2×. When the intensity of the deep press input further decreases and crosses the release intensity threshold $I_{2\times R}$ (e.g., $I_{2\times R}=I_{LR}$) associated with the fast forward speed of 2×, the media player is returned to the normal playback state with a normal playback speed of 1×.

It is worth noting that in FIGS. 6I and 6J, if the media player is already in a fast forward state (e.g., with a playback speed of 2×), a press input may trigger the next higher fast forward speed (e.g., 5×) either on the up-stroke (e.g. lifting up) or the down-stroke (e.g., pushing down) of the press input. Specifically, if the press input is a light press that only crosses the lowest activation intensity threshold (e.g., $I_{LA}$), the next higher fast forward speed (e.g., 5×) is triggered when the intensity of the press input decreases and crosses the release intensity threshold (e.g., $I_{LR}$) corresponding to the lowest activation intensity threshold (e.g., $I_{LA}$). In contrast, if the press input is a deep press that crosses not only the lowest activation intensity threshold (e.g., $I_{LA}$), but also one or more higher activation intensity thresholds (e.g., $I_{5\times A}$, $I_{10\times A}$, etc.), the next higher fast forward speed (e.g., 5×) is triggered when the intensity of the press input increases and crosses the next higher activation intensity threshold (e.g., $I_{5\times A}$).

FIG. 6K illustrates that, when the media player is already in an initial fast forward state (with a fast forward speed of 2×), a deep press input reaching above the respective activation intensity thresholds associated with two higher fast forward speeds (e.g., $I_{5\times A}$ associated with fast forward speed 5× and $I_{10\times A}$ associated with fast forward speed 10×) is detected. In response to the rising intensity of the deep press input, the playback speed is stepped up from the initial fast forward speed of 2× to the next higher fast forward speed of 5× upon the intensity crossing the activation intensity threshold $I_{5\times A}$ associated with the next higher fast forward speed of 5×. Then, in response to further rising of the intensity of the deep press input, the playback speed is stepped up from the fast forward speed of 5× to the next higher fast forward speed of 10× upon the intensity crossing the activation intensity threshold $I_{10\times A}$ associated with the next higher fast forward speed of 10×. When the intensity of the deep press input then decreases and crosses the release intensity threshold $I_{10\times R}$ associated with the fast forward speed of 10×, the playback speed is stepped down from the fast forward speed of 10× to the next lower fast forward speed of 5×. When the intensity of the deep press input decreases further and crosses the release intensity threshold $I_{5\times R}$ associated with the fast forward speed of 5×, the playback speed is stepped down from the fast forward speed of 5× to the next lower fast forward speed of 2×. When the intensity of the press input decreases further and crosses the release intensity threshold $I_{2\times R}$ (e.g., $I_{2\times R}=I_{LR}$) associated with the fast forward speed of 2×, the media player is returned to the normal playback state with a normal playback speed of 1×.

Although only three levels of fast forward speeds are shown in FIGS. 6D, 6H, and 6K, additional higher levels of fast forward speeds (e.g., 20×, 30×, 60×, 100×, 500×, etc.) are possible, each having an increasingly higher activation intensity threshold and corresponding release intensity threshold.

Similarly, although FIGS. 6I-6K shows the initial playback speed to be the lowest fast forward speed, the same heuristics shown in these figures are optionally used in cases where the initial playback speed is higher than the lowest fast forward speed. For example, if the initial playback speed at the time when the press input is detected is 5×, the playback speed can be stepped up to 10× on the up-stroke (or lifting up) of a light press input when the intensity crosses the release intensity threshold $I_{LR}$. If the media player supports additional levels of playback speeds above 10× (e.g., 20×, 50×, 100×, etc.) and if the initial playback speed is 10×, each of these higher playback speeds (e.g., 20×, 50×, 100×) may be achieved one by one with the intensity of a deep press input crossing respective activation intensity thresholds associated with the different higher playback speeds (e.g., 20×, 50×, 100×). In some embodiments, the activation and release intensity thresholds of the higher playback speeds may be adjusted (e.g., lowered) depending on the initial playback speed of the media content.

Although the above description of FIGS. 6I-6K uses fast forwarding as an example. The same control heuristic can be used for rewinding. In response to a light press input detected on the rewind control (e.g., rewind control 514), the media player can step up the rewind speed from an initial value (e.g., 2×) in the backward direction to the next higher rewind speed (e.g., 5×) upon lift up of the light press input. In response to a deep press input detected on the rewind control, the media player can step up the rewind speed from the initial value (e.g., 2×) in the backward direction to one or more higher rewind speeds (e.g., 5×, and/or 10×) in response to the contact intensity crossing the corresponding activation intensity thresholds of the one or more higher rewind speeds. The media player can then step down the rewind speeds one level at a time when the contact intensity of the press input crosses the release intensity threshold of each of the one or more achieved rewind speeds. In the case of rewinding, when the contact intensity of the deep press input crosses the lowest release intensity threshold (e.g., $I_{2\times R}=I_{LR}$) corresponding to the lowest rewind speed (e.g., 2×), the playback speed is optionally changed from the lowest rewind speed (e.g., 2×) in the backward direction to the normal playback speed (e.g., 1×) in the forward direction.

Although FIGS. 6A-6K shows the changes in playback speeds in discrete steps that are integer multiples of the normal playback speed (e.g., 1×), in some embodiments, the change from one level to the next may be implemented as a gradual change that goes through multiple sub-steps (e.g., as factions speeds 1.2, 1.5, 1.7, 1.9, etc.) or a curved slope in a predetermined transition period (e.g., 2 ms). In some embodiments, the mapping of the multiple sub-steps to the intensity values of the contact is triggered when a modification input (e.g., holding down an "option" key) is detected concurrently with detecting the interaction with the media playback control.

In various embodiments, a subset or all of the above control heuristics may be implemented in a particular media player application to control media presentation.

FIGS. 7A-7H illustrate a flow diagram of a method 700 of controlling media presentation in accordance with some embodiments. The method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to control playback speed of a media presentation. The method reduces the cognitive burden on a user when changing media playback speed in software applications, thereby creating a more efficient human-machine interface. For battery-operated electronic devices, enabling a user to control media playback faster and more efficiently conserves power and increases the time between battery charges.

While presenting media content (e.g., a collection of images in a slideshow, an audio track, a video, or the like)

at a first non-zero playback speed, the device detects (702) a press input by a first contact on the touch-sensitive surface that corresponds to a focus selector at a first location of a first media control on the display (e.g., a fast-forward control). For example, the first playback speed is 1× speed (e.g., FIGS. 6E-6H). In another example, the first playback speed is ≥2× where the user previously performed one or more legacy tap/click operations at the first location that corresponds to the first media control to present the media item at the first playback speed (e.g., FIGS. 6I-6K).

In response to detecting the press input: the device determines (704) whether an intensity of the first contact (e.g., a characteristic intensity) is above a first intensity threshold. In some embodiments, the first intensity threshold corresponds to a predetermined minimum playback speed such as 2×, 5×, or 10×. For example, the user must at least press hard enough to get above the 2× threshold before the playback speed is changed based on intensity. In some embodiments, the intensity of the first contact passes through a plurality of intensities that correspond to intensity thresholds for playback speeds below the current playback speed.

In accordance with a determination that the intensity of the first contact is above the first intensity threshold, the device presents the media content at a second playback speed, where the second playback speed is faster than the first non-zero playback speed. In some embodiments, the first intensity threshold is distinct from a detection threshold or an activation intensity threshold, which are lower than the first intensity threshold (e.g., the first intensity threshold is higher than the activation intensity threshold).

In accordance with a determination that the intensity of the first contact is below the first intensity threshold, the device maintains presentation of the media content at the first non-zero playback speed.

In some embodiments, a contact having an intensity above the activation intensity threshold on the touch-sensitive surface at a location that corresponds to another user interface element besides the first media control initiates an operation that corresponds to the another user interface element. For example, a contact having an intensity above the activation intensity threshold on the touch-sensitive surface at a location that corresponds to a play button initiates provision of the media content at a normal playback speed (e.g., 1×).

In some embodiments, the first non-zero playback speed is (706) a normal playback speed (e.g., FIGS. 6E-6H). In some embodiments, the media content is presented at the default speed in which the media content was captured/generated when played in the normal playback speed (i.e., 1×).

In some embodiments, the first non-zero playback speed is (708) a fast-forward playback speed that is greater than or equal to two times a normal playback speed (e.g., FIGS. 6I-6K). In some embodiments, the first non-zero playback speed is (710) a rewind playback speed whose magnitude is greater than or equal to two times a normal playback speed. (e.g., 2×, 5×, etc.).

In some embodiments, the first intensity threshold corresponds (712) to a predetermined minimum intensity value. For example, the user must press at least hard enough to get above the intensity threshold that corresponds to the 2×, 5×, or 10× playback speed before the playback speed is changed based on intensity.

In some embodiments, the first playback control corresponds (714) to a fast-forward control (e.g., 512).

In some embodiments, the first playback control corresponds (716) to a rewind control (e.g., 514).

In some embodiments, the media content includes (718) a collection of one or more images, an audio track, and/or a video.

In some embodiments, while presenting the media content at the second playback speed, the device detects (720) a subsequent press input by a second contact distinct from the first contact (e.g., after the first contact by a first finger ends/lifts off, a second contact by the same first finger is detected as part of a second press input) on the touch-sensitive surface that corresponds to the focus selector at the first location of the first media control on the display. In response to detecting the subsequent press input, the device determines whether an intensity of the second contact has crossed a second intensity threshold that is above the first intensity threshold. In some embodiments, the intensity of the second contact is deemed to have crossed above the second intensity threshold based on a determination that the intensity of the second contact has changed from below the second intensity threshold to above the second intensity threshold. In some embodiments, while detecting the subsequent press input and before detecting the intensity of the second contact increase above the second intensity threshold, the device detects the intensity of the second contact increase above the first intensity threshold without providing tactile output corresponding to crossing the first intensity threshold. While continuing to detect the second contact on the touch-sensitive surface, and in accordance with a determination that the intensity of the second contact has crossed above the second intensity threshold: the device provides tactile output that corresponds to the second intensity threshold, and presents the media content at a third playback speed greater than the second playback speed. In accordance with a determination that the intensity of the second contact has not crossed above the second intensity threshold, the device foregoes provision of the tactile output that corresponds to the second intensity threshold and continues to present the media content at the second playback speed. In some embodiments, detents are provided upon crossing intensity thresholds that are greater than the one that corresponds to the current playback speed (e.g., the second playback speed) but not when crossing the intensity threshold that corresponds to the current playback speed or any lower speeds. In some embodiments, visual feedback is also provided as the intensity thresholds are crossed that are greater than the threshold that corresponds to the current playback speed.

In some embodiments, in response to detecting the press input: the device, in accordance with the determination that the intensity of the first contact is above the first intensity threshold, provides (722) tactile output that corresponds to the first intensity threshold; and in accordance with the determination that the intensity of the first contact is below the first intensity threshold, the device foregoes provision of the tactile output that corresponds to the first intensity threshold. In some embodiments, detents are provided upon crossing intensity thresholds that are greater than the one that corresponds to the current playback speed (e.g., the first non-zero playback speed) but not when crossing the intensity threshold that corresponds to the current playback speed or any lower speeds. In some embodiments, visual feedback is also provided as the intensity thresholds are crossed that are greater than the one that corresponds to the current playback speed.

In some embodiments, while presenting the media content at the second playback speed, the device detects (724) a subsequent press input by a second contact distinct from the first contact (e.g., after the first contact by a first finger ends/lifts off, a second contact by the same first finger is detected as part of a second press input) on the touch-sensitive surface that corresponds to the focus selector at the first location of the first media control on the display. While detecting the subsequent press input, the device detects that an intensity of the second contact has crossed above the first intensity threshold. In response to detecting that the intensity of the second contact has crossed above the first intensity threshold: in accordance with a determination that the first intensity threshold is above a predetermined minimum intensity value (e.g., the predetermined minimum intensity value corresponds to a minimum playback speed for providing tactile output such as 2×, 5×, or 10×), the device provides tactile output that corresponds to the first intensity threshold; and, in accordance with a determination that the first intensity threshold is below the predetermined minimum intensity value, the device foregoes provision of the tactile output that corresponds to the first intensity threshold.

While continuing to detect the second contact on the touch-sensitive surface, the device detects (726) that the intensity of the second contact has crossed above a second intensity threshold that is above the first intensity threshold. In response to detecting that the intensity of the second contact has crossed above the second intensity threshold: in accordance with a determination that the second intensity threshold equals or exceeds the predetermined minimum intensity value, the device provides tactile output that corresponds to the second intensity threshold; and, in accordance with a determination that the second intensity threshold does not equal or exceed the predetermined minimum intensity value, the device foregoes provision of the tactile output that corresponds to the second intensity threshold. For example, detents are provided upon reaching intensity thresholds above and including the predetermined minimum intensity value for a predefined playback speed such as 2×, 5, or 10×. In some embodiments, the predetermined minimum intensity value must be reached before the playback speed is changed based on intensity. In some embodiments, visual feedback is also provided as the intensity increases above the predetermined minimum intensity value.

In some embodiments, in response to detecting the press input, and in accordance with the determination that the intensity of the first contact is above the first intensity threshold: in accordance with a determination that the first intensity threshold is above a predetermined minimum intensity value (e.g., the predetermined minimum intensity value corresponds to a minimum playback speed for providing tactile output such as 2×, 5×, or 10×), the device provides (728) tactile output that corresponds to the first intensity threshold; and, in accordance with a determination that the first intensity threshold is below the predetermined minimum intensity value, the device foregoes provision of the tactile output that corresponds to the first intensity threshold. For example, detents are provided upon reaching intensity thresholds above and including the predetermined minimum intensity value for a predefined playback speed such as 2×, 5×, or 10×. In some embodiments, the predetermined minimum intensity value must be reached before the playback speed is changed based on intensity. In some embodiments, visual feedback is also provided as the intensity increases above the predetermined minimum intensity value.

In some embodiments, while presenting the media content at the second playback speed, and while continuing to detect the first contact on the touch-sensitive surface: the device detects (730) that the intensity of the first contact is above a second intensity threshold distinct from the first intensity threshold. In some embodiments, the second intensity threshold has a pressure or force threshold higher than a pressure or force threshold in the first intensity threshold. In response to detecting that the intensity of the first contact is above the second intensity threshold, the device presents the media content at a third playback speed, where the third playback speed is faster than the second playback speed. In some embodiments, the playback speeds include 0×, 1×, 2×, 5×, 10×, 30×, and 60×. For example, the first playback speed is 1×, the second playback speed is 10×, and the third playback speed is 30×.

In some embodiments, while presenting the media content at the third playback speed, and while continuing to detect the first contact on the touch-sensitive surface, the device detects (732) that the intensity of the first contact has crossed below the second intensity threshold. In response to detecting that the intensity of the first contact has crossed below the second intensity threshold: the device provides tactile output that corresponds to the second intensity threshold and presents the media content at the second playback speed. In some embodiments, the intensity of the first contact is deemed to have crossed below the second intensity threshold based on a determination that the intensity of the first contact has changed from being above the second intensity threshold to being below the second intensity threshold. While presenting the media content at the second playback speed, and while continuing to detect the first contact on the touch-sensitive surface, the device detects that the intensity of the first contact has crossed below the first intensity threshold. In response to detecting that the intensity of the first contact has crossed below the first intensity threshold: the device provides tactile output that corresponds to the first intensity threshold and presents the media content at a fourth playback speed. For example, the playback speed is reduced and detents are provided as the intensity crosses below each intensity threshold.

In some embodiments, while presenting the media content at the second playback speed, the device detects (734) a subsequent press input by a second contact distinct from the first contact (e.g., after the first contact by a first finger ends/lifts off, a second contact by the same first finger is detected as part of a second press input) on the touch-sensitive surface that corresponds to the focus selector at the first location of the first media control on the display. While detecting the subsequent press input: the device determines whether an intensity of the second contact has not crossed above a second intensity threshold that is above the first intensity threshold; and, subsequent to a determination that the intensity of the second contact has not crossed above the second intensity threshold: the device detects that the intensity of the second contact has crossed below the first intensity threshold; and, in response to detecting that the intensity of the second contact has crossed below the first intensity threshold, the device foregoes provision of a tactile output that corresponds to the first intensity threshold.

In some embodiments, while presenting the media content at the second playback speed, and while continuing to detect the first contact on the touch-sensitive surface, the device detects (736) that the intensity of the first contact is below the first intensity threshold. In one example, lift-off of the first contact is detected. In another example, the intensity of the first contact falls below first intensity threshold but lift-off is not detected. In response to detecting that the intensity of the first contact is below the first intensity threshold, the device presents the media content at a fourth playback speed.

In some embodiments, the fourth playback speed is (738) the second playback speed. For example, provision of the media content at the second playback speed is maintained. In some embodiments, actuation of a modifier key is required to lock in a higher playback speed.

In some embodiments, the fourth playback speed is (740) the first non-zero playback speed. For example, the playback speed is reduced from the second playback speed. In some embodiments, the playback speed tracks the intensity of the contact, so that as the intensity of the contact decreases from an intensity above the first intensity threshold to an intensity below the first intensity threshold, the playback speed is adjusted through a plurality of levels that are mapped to different contact intensities.

In some embodiments, the fourth playback speed is (742) a normal playback speed. In some embodiments, the media content is presented at the default speed in which that the media content was captured/generated when played in the normal playback speed (i.e., 1×). In some embodiments, in the fourth playback speed (e.g., 0×), a still image that corresponds to the media content is presented. For example, in the 0× playback speed, the media content is paused.

In some embodiments, while presenting a still image that corresponds to the media content, (i.e., 0× playback speed), the device detects (744) a subsequent press input by a second contact distinct from the first contact (e.g., after the first contact by a first finger ends/lifts off, a second contact by the same first finger is detected as part of a second press input) on the touch-sensitive surface that corresponds to the focus selector at the first location of the first media control on the display. In some embodiments, the media content is paused when played in the 0× playback speed. In some embodiments, provision of the media content is paused in response to a user activation (e.g., using a touch input) of a pause button in the user interface. In response to detecting the subsequent press input: the device determines whether an intensity of the second contact (e.g., a characteristic intensity) is above the first intensity threshold. In accordance with a determination that the intensity of the second contact (e.g., characteristic intensity) is above the first intensity threshold, the device presents the media content at the second playback speed. In accordance with a determination that the intensity of the second contact is below the first intensity threshold, the device increases the playback speed of the media content from the still image up to the second playback speed according to the intensity of the second contact. For example, the fast-forward control operates like a gas pedal whereby the playback speed increases from 0× to 2× before the intensity of the second contact crosses the first intensity threshold. Alternatively, in some embodiments, the electronic device maintains presentation of the still image corresponding to the media content until the intensity of the second contact crosses the first intensity threshold (e.g., a jump from 0× to 2×).

In some embodiments, while presenting the media content at a normal playback speed (e.g., 1×), the device detects (746) a subsequent press input by a second contact distinct from the first contact (e.g., after the first contact by a first finger ends/lifts off, a second contact by the same first finger is detected as part of a second press input) on the touch-sensitive surface that corresponds to the focus selector at a second location of a second media control (e.g., the play control) on the display, wherein the second playback control is distinct from the first playback control. The device determines whether the intensity of the second contact (e.g., characteristic intensity) is above the first intensity threshold. In accordance with a determination that the intensity of the second contact is above the first intensity threshold, the device presents the media content at a first fractional playback speed, wherein the first fractional playback speed is faster than the normal playback speed and less than two times the normal playback speed. In accordance with a determination that the intensity of the second contact is below the first intensity threshold, the device maintains presentation of the media content at the normal playback speed. In some embodiments, the fractional playback speeds include 1.1×, 1.2×, 1.5×, and 1.7×. Alternatively, in some embodiments, the fractional playback speeds are accessed in response to detecting a press input at a location corresponding to the first playback control in addition to detecting activation of a modifier key (e.g., the option key).

In some embodiments, while continuing to detect the second contact on the touch-sensitive surface: the device detects (748) that the intensity of the second contact is above a second intensity threshold distinct from the first intensity threshold. In response to detecting that the intensity of the second contact is above the second intensity threshold, the device presents the media content at a second fractional playback speed, wherein the second fractional playback speed is faster than the first fractional playback speed and less than two times the normal playback speed.

In some embodiments, in response to detecting the subsequent press input, the device displays (750) a fractional playback scrubber at least partially overlaid on the second playback control that indicates a current playback speed of the media content. In some embodiments, the fractional playback scrubber is adjacent to but not overlaid on the second playback control. In some embodiments, detents are provided when crossing above all intensity thresholds over a predetermined minimum intensity value. In some embodiments, detents are provided when crossing below all intensity thresholds.

In some embodiments, the second playback control corresponds (752) to at least one of: a play control and a pause control.

It should be understood that the particular order in which the operations in FIGS. 7A-7H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 7A-7H. For example, the contacts, gestures, press input, user interface objects, tactile outputs, intensity thresholds, focus selectors, and playback speeds described above with reference to method 700 optionally have one or more of the characteristics of the contacts, gestures, press input, user interface objects, tactile outputs, intensity thresholds, focus selectors, playback speeds described herein with reference to other methods described herein (e.g., method 800). For brevity, these details are not repeated here.

FIGS. 8A-8C illustrate a flow diagram of a method 800 of controlling media presentation in accordance with some embodiments. The method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to control playback speed of media presentation. The method reduces the cognitive burden on a user when changing media playback speed in software applications, thereby creating a more efficient human-machine interface. For battery-operated electronic devices, enabling a user to control media playback faster and more efficiently conserves power and increases the time between battery charges.

In some embodiments, while presenting media content (e.g., a collection of images in a slideshow, an audio track, a video, or the like) at a first speed, the device detects (802) a press input by a first contact on the touch-sensitive surface that corresponds to a focus selector at a first location of a first media control on the display (e.g., a fast-forward control). In some embodiments, the first speed is not a fast-forward speed. For example, the first speed is 0× speed (e.g., paused) or 1× speed (e.g., normal playback).

In response to detecting the press input by the first contact: the device determines (804) whether a first intensity of the first contact (e.g., a characteristic intensity) has satisfied a first intensity threshold (e.g., an activation intensity threshold). In some embodiments, the first intensity threshold is an activation intensity threshold for a first intensity stage. Subsequent to determining whether the first intensity of the first contact has satisfied the first intensity threshold (e.g., an activation intensity threshold), the device determines whether the first contact continues to satisfy a second intensity threshold (e.g., remaining above a release intensity threshold) during a predefined time interval (e.g., before a lock time threshold is reached). In some embodiments, the second intensity threshold is a release intensity threshold for the first intensity stage.

In accordance with determining that the first intensity of the first contact has satisfied the first intensity threshold and determining that the first contact continues to satisfy the second intensity threshold during the predefined time interval, the device presents the media content at a first fast-forward speed that is higher than the first speed as long as the first contact satisfies the second intensity threshold (e.g., as shown in FIGS. 6B and 6F, where the higher speed is not locked in at the end of the press input).

In accordance with determining that the intensity of the first contact has satisfied the first intensity threshold and determining that the first contact does not continue to satisfy the second intensity threshold during the predefined time interval (e.g., the first contact is lifted off or the intensity of the first contact falls below the second intensity threshold during the predefined time interval), the device presents the media content at the first fast-forward speed (e.g., even though the first contact is no longer detected on the touch-sensitive surface) (e.g., as shown in FIGS. 6A and 6E, where the higher speed is locked in).

In some embodiments, the first intensity threshold is (806) higher than the second intensity threshold (e.g., the activation intensity threshold for the first fast forward speed may be higher than the release intensity threshold for the first fast forward speed). In some embodiments, the first intensity threshold is identical to the second intensity threshold.

In some embodiments, while presenting the media content at the first fast-forward speed (e.g., 2×) in accordance with determining that the first intensity of the first contact has satisfied the first intensity threshold and determining that the first contact continues to satisfy the second intensity threshold during the predefined time interval, the device detects (808) a second intensity of the first contact that does not satisfy the second intensity threshold subsequent to the predefined time interval (e.g., as shown in FIGS. 6B and 6F, where the intensity of the press input falls below the release intensity threshold for 2× after the lock time threshold has expired). In response to detecting the second intensity of the first contact that does not satisfy the second intensity threshold subsequent to the predefined time interval, the device ceases to present the media content at the first fast-forward speed (e.g., as shown in FIGS. 6B and 6F, where the playback speed is returned to the initial playback speed when the contact intensity crosses the release intensity threshold associated with the first fast forward speed of 2×). In some embodiments, ceasing to present the media content at the first fast-forward speed includes presenting the media content at the first speed. In some embodiments, ceasing to present the media content at the first fast-forward speed includes presenting the media content at a normal playback speed (e.g., as shown in FIG. 6F where the final speed is 1×). In some embodiments, ceasing to present the media content at the first fast-forward speed includes presenting a still image of the media content (e.g., paused state and/or 0× speed) (e.g., as shown in FIG. 6B where the final speed is 0×).

In some embodiments, while presenting the media content at the first fast-forward speed (e.g., 2×) in accordance with determining that the first intensity of the first contact has satisfied the first intensity threshold and determining that the first contact does not continue to satisfy the second intensity threshold during the predefined time interval, the device detects (810) a press input by a second contact on the touch-sensitive surface that corresponds to the focus selector at the first location of the first media control on the display. In some embodiments, the second contact is distinct and separate from the first contact. The device determines whether a first intensity of the second contact (e.g., a characteristic intensity) has satisfied the first intensity threshold (e.g., an activation intensity threshold). Subsequent to determining whether the first intensity of the second contact has satisfied the first intensity threshold (e.g., an activation intensity threshold), the device determines whether the second contact satisfies the second intensity threshold (e.g., remaining above a release intensity threshold). In accordance with determining that the first intensity of the second contact has satisfied the first intensity threshold (e.g., $I_{LA}$) and subsequently determining that the second contact does not satisfy the second intensity threshold (e.g., $I_{LR}$), the device presents the media content at a second fast-forward speed (e.g., 5×) that is higher than the first fast-forward speed (e.g., 2×). This is illustrated in FIG. 6I, for example, after the intensity of the press input has risen above $I_{LA}$, reached a peak, and then fallen to a point just below $I_{LR}$, the playback speed is increased to 5×.

In some embodiments, in response to detecting the press input by the second contact, in accordance with determining that the first intensity of the second contact has satisfied the first intensity threshold (e.g., $I_{LA}$) and subsequently determining that the second contact satisfies the second intensity threshold (e.g., $I_{LR}$), the device presents (812) the media content at the first fast-forward speed while the second contact satisfies the second intensity threshold. This is illustrated in FIG. 6I, for example, where, after the intensity of the press input has risen above $I_{LA}$, and remains above $I_{LR}$, the playback speed remains at 2×, and does not increase to 5× until the intensity falls to a point below $I_{LR}$.

In some embodiments, in response to detecting the press input by the second contact, in accordance with determining that the first intensity of the second contact has satisfied the first intensity threshold and subsequently determining that the second contact satisfies the second intensity threshold, the device visually distinguishes (814) the first media control on the display while the second contact satisfies the second intensity threshold. In some embodiments, the visual distinction indicates that the second contact satisfies the second intensity threshold. For example, in FIG. 6I, during the period of time after the intensity of the press input has risen above $I_{LA}$, reached a peak, and then fallen to a point just above $I_{LR}$, the playback speed remains at 2×, but the media control being activated by the press input is optionally highlighted to indicate that the activation intensity threshold for the next higher play speed has been achieved, and that ceasing the press input now would cause an increase in the playback speed and subsequent locking in of the increased playback speed.

In some embodiments, while presenting the media content at the first fast-forward speed (e.g., 2×) in accordance with determining that the first intensity of the first contact has satisfied the first intensity threshold and determining that the first contact continues to satisfy the second intensity threshold during the predefined time interval and while continuing to detect the first contact on the touch-sensitive surface, the device detects (816) a second intensity of the first contact that satisfies a third intensity threshold (e.g., $I_{5\times A}$) that is higher than the first intensity threshold (e.g., $I_{2\times A}$). In some embodiments, the third intensity threshold is an activation intensity threshold for the second intensity stage (e.g., 5×). In response to detecting the second intensity of the first contact, the device presents the media content at the second fast-forward speed (e.g., 5×) that is higher than the first fast-forward speed (e.g., 2×). This is illustrated in FIG. 6J, where a deep press meeting $I_{5\times A}$ causes the playback speed to increase from 2× to 5×.

In some embodiments, while presenting the media content at the second fast-forward speed (e.g., 5×) and while continuing to detect the first contact on the touch-sensitive surface, the device detects (818) a third intensity of the first contact that does not satisfy a fourth intensity threshold (e.g., $I_{5\times R}$). In some embodiments, the fourth intensity threshold is a release intensity threshold for the second intensity stage. In some embodiments, the fourth intensity threshold is identical to the third intensity threshold. In some embodiments, the fourth intensity threshold is distinct from the third intensity threshold. In response to detecting the third intensity of the first contact, the device presents the media content at the first fast-forward speed. This is illustrated in FIG. 6J, where after the intensity of the deep press input falls below the release intensity threshold $I_{5\times R}$, the previously achieved higher playback speed 5× is reduced to 2× again.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 8A-8C. For example, the contacts, gestures, press input, user interface objects, tactile outputs, intensity thresholds, focus selectors, and playback speeds described above with reference to method 800 optionally have one or more of the characteristics of the contacts, gestures, press input, user interface objects, tactile outputs, intensity thresholds, focus selectors, playback speeds described herein with reference to other methods described herein (e.g., method 700). For brevity, these details are not repeated here.

Figure 9:
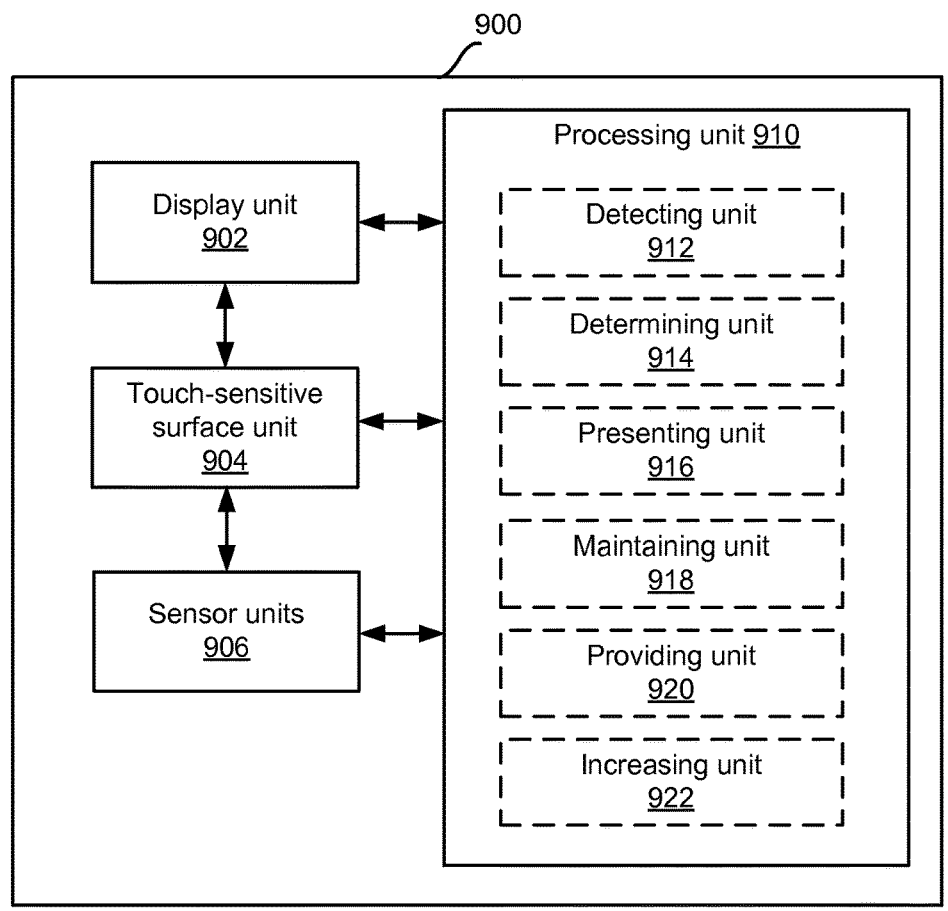
FIGS. 9 and 10 are functional block diagrams of an electronic device in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902 configured to display a user interface, a touch-sensitive surface unit 904 configured to receive contacts, one or more sensor units 906 configured to detect intensity of contacts with the touch-sensitive surface unit 904; and a processing unit 910 coupled with the display unit 902, the touch-sensitive surface unit 904 and the one or more sensor units 906. In some embodiments, the processing unit 910 includes: a detecting unit 912, a determining unit 914, a presenting unit 916, a maintaining unit 918, a providing unit 920, and an increasing unit 922.

The processing unit 910 is configured to: while presenting media content at a first non-zero playback speed, detect a press input by a first contact on the touch-sensitive surface that corresponds to a focus selector at a first location of a first media control on the display (e.g., with the detecting unit 912); and, in response to detecting the press input: determine whether an intensity of the first contact is above a first intensity threshold (e.g., with the determining unit 914); in accordance with a determination that the intensity of the first contact is above the first intensity threshold, present the media content at a second playback speed (e.g., with the presenting unit 916), wherein the second playback speed is faster than the first non-zero playback speed; and, in accordance with a determination that the intensity of the first contact is below the first intensity threshold, maintain presentation of the media content at the first non-zero playback speed (e.g., with the maintaining unit 918).

In some embodiments, the first non-zero playback speed is a normal playback speed.

In some embodiments, the first non-zero playback speed is a fast-forward playback speed that is greater than or equal to two times a normal playback speed.

In some embodiments, the first non-zero playback speed is a rewind playback speed whose magnitude is greater than or equal to two times a normal playback speed.

In some embodiments, the first intensity threshold corresponds to a predetermined minimum intensity value.

In some embodiments, the first playback control corresponds to a fast-forward control.

In some embodiments, the first playback control corresponds to a rewind control.

In some embodiments, the media content includes a collection of one or more images, an audio track, and/or a video.

In some embodiments, the processing unit 910 is further configured to: while presenting the media content at the second playback speed, detect a subsequent press input by a second contact distinct from the first contact on the touch-sensitive surface that corresponds to the focus selector at the first location of the first media control on the display (e.g., with the detecting unit 912); in response to detecting the subsequent press input, determine whether an intensity of the second contact has crossed a second intensity threshold that is above the first intensity threshold (e.g., with the determining unit 914); while continuing to detect the second contact on the touch-sensitive surface, and in accordance with a determination that the intensity of the second contact has crossed above the second intensity threshold: provide tactile output that corresponds to the second intensity threshold (e.g., with the providing unit 920); and present the media content at a third playback speed greater than the second playback speed (e.g., with the presenting unit 916); and, in accordance with a determination that the intensity of the second contact has not crossed above the second intensity threshold, forego provision of the tactile output that corresponds to the second intensity threshold and continuing to present the media content at the second playback speed (e.g., with the providing unit 924).

In some embodiments, the processing unit 910 is further configured to: in response to detecting the press input: in accordance with the determination that the intensity of the first contact is above the first intensity threshold, provide tactile output that corresponds to the first intensity threshold (e.g., with the providing unit 920); and, in accordance with the determination that the intensity of the first contact is below the first intensity threshold, forego provision of the tactile output that corresponds to the first intensity threshold (e.g., with the providing unit 920).

In some embodiments, the processing unit 910 is further configured to: while presenting the media content at the second playback speed, detect a subsequent press input by a second contact distinct from the first contact on the touch-sensitive surface that corresponds to the focus selector at the first location of the first media control on the display (e.g., with the detecting unit 912); in response to detecting the subsequent press input, detect that an intensity of the second contact has crossed above the first intensity threshold (e.g., with the detecting unit 912); in response to detecting that the intensity of the second contact has crossed above the first intensity threshold: in accordance with a determination that the first intensity threshold is above a predetermined minimum intensity value, provide tactile output that corresponds to the first intensity threshold (e.g., with the providing unit 920); and, in accordance with a determination that the first intensity threshold is below the predetermined minimum intensity value, forego provision of the tactile output that corresponds to the first intensity threshold (e.g., with the providing unit 920); and, while continuing to detect the second contact on the touch-sensitive surface, detect that the intensity of the second contact has crossed above a second intensity threshold that is above the first intensity threshold (e.g., with the detecting unit 912): in response to detecting that the intensity of the second contact has crossed above the second intensity threshold: in accordance with a determination that the second intensity threshold equals or exceeds the predetermined minimum intensity value, provide tactile output that corresponds to the second intensity threshold (e.g., with the providing unit 920); and, in accordance with a determination that the second intensity threshold does not equal or exceed the predetermined minimum intensity value, forego provision of the tactile output that corresponds to the second intensity threshold (e.g., with the providing unit 920).

In some embodiments, the processing unit 910 is further configured to: in response to detecting the press input, and in accordance with the determination that the intensity of the first contact is above the first intensity threshold: in accordance with a determination that the first intensity threshold is above a predetermined minimum intensity value, provide tactile output that corresponds to the first intensity threshold (e.g., with the providing unit 920); and, in accordance with a determination that the first intensity threshold is below the predetermined minimum intensity value, forego provision of the tactile output that corresponds to the first intensity threshold (e.g., with the providing unit 920).

In some embodiments, the processing unit 910 is further configured to: while presenting the media content at the second playback speed, and while continuing to detect the first contact on the touch-sensitive surface: detect that the intensity of the first contact is above a second intensity threshold distinct from the first intensity threshold (e.g., with the detecting unit 912); and, in response to detecting that the intensity of the first contact is above the second intensity threshold, present the media content at a third playback speed, wherein the third playback speed is faster than the second playback speed (e.g., with the presenting unit 912).

In some embodiments, the processing unit 910 is further configured to: while presenting the media content at the third playback speed, and while continuing to detect the first contact on the touch-sensitive surface, detect that the intensity of the first contact has crossed below the second intensity threshold (e.g., with the detecting unit 912); in response to detecting that the intensity of the first contact has crossed below the second intensity threshold: provide tactile output that corresponds to the second intensity threshold (e.g., with the providing unit 920); and present the media content at the second playback speed (e.g., with the presenting unit 916); and, while presenting the media content at the second playback speed, and while continuing to detect the first contact on the touch-sensitive surface, detect that the intensity of the first contact has crossed below the first intensity threshold (e.g., with the detecting unit 912); in response to detecting that the intensity of the first contact has crossed below the first intensity threshold: provide tactile output that corresponds to the first intensity threshold (e.g., with the providing unit 920); and present the media content at a fourth playback speed (e.g., with the presenting unit 916).

In some embodiments, the processing unit 910 is further configured to: while presenting the media content at the second playback speed, detect a subsequent press input by a second contact distinct from the first contact on the touch-sensitive surface that corresponds to the focus selector at the first location of the first media control on the display (e.g., with the detecting unit 912); and while detecting the subsequent press input: determine whether an intensity of the second contact has not crossed above a second intensity threshold that is above the first intensity threshold (e.g., with the determining unit 914); and, subsequent to a determination that the intensity of the second contact has not crossed above the second intensity threshold: detect that the intensity of the second contact has crossed below the first intensity threshold (e.g., with the detecting unit 912); and, in response to detecting that the intensity of the second contact has crossed below the first intensity threshold, forego provision of a tactile output that corresponds to the first intensity threshold (e.g., with the providing unit 920).

In some embodiments, the processing unit 910 is further configured to: while presenting the media content at the second playback speed, and while continuing to detect the first contact on the touch-sensitive surface, detect that the intensity of the first contact is below the first intensity threshold (e.g., with the detecting unit 912); and, in response to detecting that the intensity of the first contact is below the first intensity threshold, present the media content at a fourth playback speed (e.g., with the presenting unit 914).

In some embodiments, the fourth playback speed is the second playback speed.

In some embodiments, the fourth playback speed is the first non-zero playback speed.

In some embodiments, the fourth playback speed is a normal playback speed.

In some embodiments, the processing unit 910 is further configured to: while presenting a still image that corresponds to the media content, detect a subsequent press input by a second contact distinct from the first contact on the touch-sensitive surface that corresponds to the focus selector at the first location of the first media control on the display (e.g., with the detecting unit 912); and, in response to detecting the subsequent press input: determine whether an intensity of the second contact is above the first intensity threshold (e.g., with the determining unit 914); in accordance with a determination that the intensity of the second contact is above the first intensity threshold, present the media content at the second playback speed (e.g., with the presenting unit 916); and, in accordance with a determination that the intensity of the second contact is below the first intensity threshold, increase the playback speed of the media content from the still image up to the second playback speed according to the intensity of the second contact (e.g., with the increasing unit 922).

In some embodiments, the processing unit 910 is further configured to: while presenting the media content at a normal playback speed, detect a subsequent press input by a second contact distinct from the first contact on the touch-sensitive surface that corresponds to the focus selector at a second location of a second media control on the display (e.g., with the detecting unit 912), wherein the second playback control is distinct from the first playback control; and, in response to detecting the subsequent press input: determine whether the intensity of the second contact is above the first intensity threshold (e.g., with the determining unit 914); in accordance with a determination that the intensity of the second contact is above the first intensity threshold, present the media content at a first fractional playback speed, wherein the first fractional playback speed is faster than the normal playback speed and less than two times the normal playback speed (e.g., with the presenting unit 916); and, in accordance with a determination that the intensity of the second contact is below the first intensity threshold, maintain presentation of the media content at the normal playback speed (e.g., with the maintaining unit 918).

In some embodiments, the processing unit 910 is further configured to: while continuing to detect the second contact on the touch-sensitive surface: detect that the intensity of the second contact is above a second intensity threshold distinct from the first intensity threshold (e.g., with the detecting unit 912); and, in response to detecting that the intensity of the second contact is above the second intensity threshold, present the media content at a second fractional playback speed (e.g., with the presenting unit 916), wherein the second fractional playback speed is faster than the first fractional playback speed and less than two times the normal playback speed.

In some embodiments, the processing unit 910 is further configured to: in response to detecting the subsequent press input, display a fractional playback scrubber at least partially overlaid on the second playback control that indicates a current playback speed of the media content (e.g., with the display unit 902).

In some embodiments, the second playback control corresponds to at least one of: a play control and a pause control.

Figure 10:
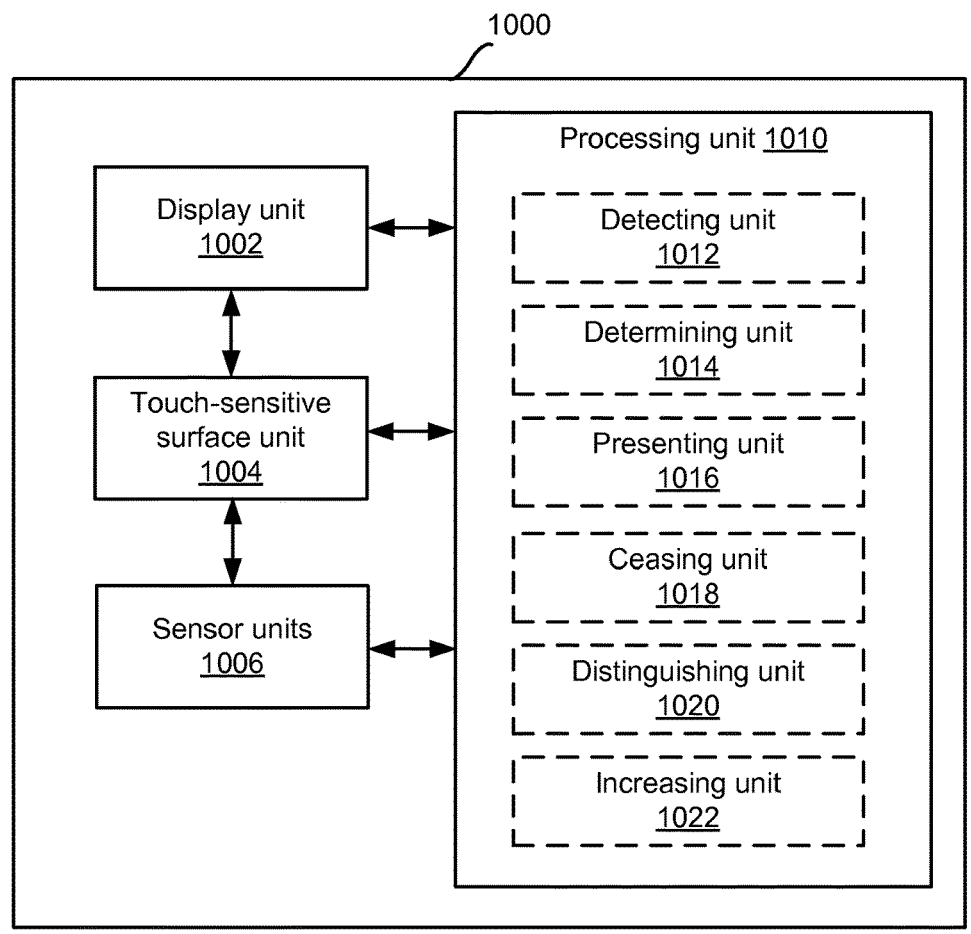

In accordance with some embodiments, FIG. 10 shows a functional block diagram of an electronic device 1000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 configured to display a user interface, a touch-sensitive surface unit 1004 configured to receive contacts, one or more sensor units 1006 configured to detect intensity of contacts with the touch-sensitive surface unit 1004; and a processing unit 1010 coupled with the display unit 1002, the touch-sensitive surface unit 1004 and the one or more sensor units 1006. In some embodiments, the processing unit 1010 includes: a detecting unit 1012, a determining unit 1014, a presenting unit 1016, a ceasing unit 1018, and a distinguishing unit 1020.

The processing unit 1010 is configured to: while presenting media content at a first speed, detect a press input by a first contact on the touch-sensitive surface that corresponds to a focus selector at a first location of a first media control on the display (e.g., with the detecting unit 1012); and, in response to detecting the press input by the first contact: determine whether a first intensity of the first contact has satisfied a first intensity threshold (e.g., with the determining unit 1014); subsequent to determining whether the first intensity of the first contact has satisfied the first intensity threshold, determine whether the first contact continues to satisfy a second intensity threshold during a predefined time interval (e.g., with the determining unit 1014); in accordance with determining that the first intensity of the first contact has satisfied the first intensity threshold and determining that the first contact continues to satisfy the second intensity threshold during the predefined time interval, present the media content at a first fast-forward speed that is higher than the first speed as long as the first contact satisfies the second intensity threshold (e.g., with the presenting unit 1016); and, in accordance with determining that the intensity of the first contact has satisfied the first intensity threshold and determining that the first contact does not continue to satisfy the second intensity threshold during the predefined time interval, present the media content at the first fast-forward speed (e.g., with the presenting unit 1016).

In some embodiments, the first intensity threshold is higher than the second intensity threshold.

In some embodiments, the processing unit 1010 is further configured to: while presenting the media content at the first fast-forward speed in accordance with determining that the first intensity of the first contact has satisfied the first intensity threshold and determining that the first contact continues to satisfy the second intensity threshold during the predefined time interval, detect a second intensity of the first contact that does not satisfy the second intensity threshold subsequent to the predefined time interval (e.g., with the detecting unit 1012); and, in response to detecting the second intensity of the first contact that does not satisfy the second intensity threshold subsequent to the predefined time interval, cease to present the media content at the first fast-forward speed (e.g., with the ceasing unit 1018).

In some embodiments, the processing unit 1010 is further configured to: while presenting the media content at the first fast-forward speed in accordance with determining that the first intensity of the first contact has satisfied the first intensity threshold and determining that the first contact does not continue to satisfy the second intensity threshold during the predefined time interval, detect a press input by a second contact on the touch-sensitive surface that corresponds to the focus selector at the first location of the first media control on the display (e.g., with the detecting unit 1012); determine whether a first intensity of the second contact has satisfied the first intensity threshold (e.g., with the determining unit 1014); subsequent to determining whether the first intensity of the second contact has satisfied the first intensity threshold, determine whether the second contact satisfies the second intensity threshold (e.g., with the determining unit 1014); and, in accordance with determining that the first intensity of the second contact has satisfied the first intensity threshold and subsequently determining that the second contact does not satisfy the second intensity threshold, present the media content at a second fast-forward speed that is higher than the first fast-forward speed (e.g., with the presenting unit 1016).

In some embodiments, the processing unit 1010 is further configured to: in response to detecting the press input by the second contact, in accordance with determining that the first intensity of the second contact has satisfied the first intensity threshold and subsequently determining that the second contact satisfies the second intensity threshold, present the media content at the first fast-forward speed while the second contact satisfies the second intensity threshold (e.g., with the presenting unit 1016).

In some embodiments, the processing unit 1010 is further configured to: in response to detecting the press input by the second contact, in accordance with determining that the first intensity of the second contact has satisfied the first intensity threshold and subsequently determining that the second contact satisfies the second intensity threshold, visually distinguish the first media control on the display while the second contact satisfies the second intensity threshold (e.g., with the distinguishing unit 1020).

In some embodiments, the processing unit 1010 is further configured to: while presenting the media content at the first fast-forward speed in accordance with determining that the first intensity of the first contact has satisfied the first intensity threshold and determining that the first contact continues to satisfy the second intensity threshold during the predefined time interval and while continuing to detect the first contact on the touch-sensitive surface, detect a second intensity of the first contact that satisfies a third intensity threshold that is higher than the first intensity threshold (e.g., with the detecting unit 1012); and, in response to detecting the second intensity of the first contact, present the media content at the second fast-forward speed that is higher than the first fast-forward speed (e.g., with the presenting unit 1016).

In some embodiments, the processing unit 1012 is further configured to: while presenting the media content at the second fast-forward speed and while continuing to detect the first contact on the touch-sensitive surface, detect a third intensity of the first contact that does not satisfy a fourth intensity threshold (e.g., with the detecting unit 1012); and, in response to detecting the third intensity of the first contact, present the media content at the first fast-forward speed (e.g., with the presenting unit 1016).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7H and 8A-8C are, optionally, implemented by components depicted in FIGS. 1A-1B or FIGS. 9 and 10. For example, detection operation 702, and determination and presentation operations 704 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a touch-sensitive surface and a display, wherein the electronic device includes one or more sensors to detect intensities of contacts with the touch-sensitive surface:
      while presenting media content at a first non-zero playback speed, detecting a press input by a first contact on the touch-sensitive surface that corresponds to a focus selector at a first location of a first media control on the display; and,
      in response to detecting the press input:
         determining whether an intensity of the first contact is above a first intensity threshold;
         in accordance with a determination that the intensity of the first contact is above the first intensity threshold, presenting the media content at a second playback speed, wherein the second playback speed is faster than the first non-zero playback speed; and,
         in accordance with a determination that the intensity of the first contact is below the first intensity threshold, maintaining presentation of the media content at the first non-zero playback speed;
while presenting the media content at the second playback speed and after the first contact ends, detecting a second press input by a second contact distinct from the first contact on the touch-sensitive surface that corresponds to the focus selector at the first location of the first media control on the display;
in response to detecting the second press input, determining whether an intensity of the second contact has crossed a second intensity threshold that is above the first intensity threshold;
while continuing to detect the second contact on the touch-sensitive surface, and in accordance with a determination that the intensity of the second contact has crossed above the second intensity threshold:
providing tactile output that corresponds to the second intensity threshold; and
presenting the media content at a third playback speed greater than the second playback speed; and,
in accordance with a determination that the intensity of the second contact has not crossed above the second intensity threshold, forgoing provision of the tactile output that corresponds to the second intensity threshold and continuing to present the media content at the second playback speed.

2. The method of claim 1, including:
in response to detecting the press input:
in accordance with the determination that the intensity of the first contact has crossed above the first intensity threshold, providing tactile output that corresponds to the first intensity threshold; and,
in accordance with the determination that the intensity of the first contact has not crossed above the first intensity threshold, forgoing provision of the tactile output that corresponds to the first intensity threshold.

3. The method of claim 1, including:
while presenting a still image that corresponds to the media content, detecting a third press input by a third contact distinct from the first contact on the touch-sensitive surface that corresponds to the focus selector at the first location of the first media control on the display; and,
in response to detecting the third press input:
determining whether an intensity of the third contact is above the first intensity threshold;
in accordance with a determination that the intensity of the third contact is above the first intensity threshold, presenting the media content at the second playback speed; and,
in accordance with a determination that the intensity of the third contact is below the first intensity threshold, increasing the playback speed of the media content from the still image up to the second playback speed according to the intensity of the third contact.

4. The method of claim 1, including:
while presenting the media content at a normal playback speed, detecting a third press input by a third contact distinct from the first contact on the touch-sensitive surface that corresponds to the focus selector at a second location of a second media control on the display, wherein the second media control is distinct from the first media control;
determining whether an intensity of the third contact is above the first intensity threshold;
in accordance with a determination that the intensity of the third contact is above the first intensity threshold, presenting the media content at a first fractional playback speed, wherein the first fractional playback speed is faster than the normal playback speed and less than two times the normal playback speed; and,
in accordance with a determination that the intensity of the third contact is below the first intensity threshold, maintaining presentation of the media content at the normal playback speed.

5. The method of claim 4, including:
while continuing to detect the third contact on the touch-sensitive surface:
detecting that the intensity of the third contact is above the second intensity threshold distinct from the first intensity threshold; and,
in response to detecting that the intensity of the third contact is above the second intensity threshold, presenting the media content at a second fractional playback speed, wherein the second fractional playback speed is faster than the first fractional playback speed and less than two times the normal playback speed.

6. The method of claim 4, including:
in response to detecting the second press input, displaying a fractional playback scrubber at least partially overlaid on the second media control that indicates a current playback speed of the media content.

7. The method of claim 4, wherein the second media control corresponds to at least one of: a play control and a pause control.

8. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
while presenting media content at a first non-zero playback speed, detecting a press input by a first contact on the touch-sensitive surface that corresponds to a focus selector at a first location of a first media control on the display; and,
in response to detecting the press input:
determining whether an intensity of the first contact is above a first intensity threshold;
in accordance with a determination that the intensity of the first contact is above the first intensity threshold, presenting the media content at a second playback speed, wherein the second playback speed is faster than the first non-zero playback speed; and,
in accordance with a determination that the intensity of the first contact is below the first intensity threshold, maintaining presentation of the media content at the first non-zero playback speed;
while presenting the media content at the second playback speed and after the first contact ends, detecting a second press input by a second contact distinct from the first contact on the touch-sensitive surface that corresponds to the focus selector at the first location of the first media control on the display;

in response to detecting the second press input, determining whether an intensity of the second contact has crossed a second intensity threshold that is above the first intensity threshold;
while continuing to detect the second contact on the touch-sensitive surface, and in accordance with a determination that the intensity of the second contact has crossed above the second intensity threshold:
providing tactile output that corresponds to the second intensity threshold; and
presenting the media content at a third playback speed greater than the second playback speed; and,
in accordance with a determination that the intensity of the second contact has not crossed above the second intensity threshold, forgoing provision of the tactile output that corresponds to the second intensity threshold and continuing to present the media content at the second playback speed.

9. The electronic device of claim 8, wherein the one or more programs include instructions for:
in response to detecting the press input:
in accordance with the determination that the intensity of the first contact has crossed above the first intensity threshold, providing tactile output that corresponds to the first intensity threshold; and,
in accordance with the determination that the intensity of the first contact has not crossed above the first intensity threshold, forgoing provision of the tactile output that corresponds to the first intensity threshold.

10. The electronic device of claim 8, wherein the one or more programs include instructions for:
while presenting a still image that corresponds to the media content, detecting a third press input by a third contact distinct from the first contact on the touch-sensitive surface that corresponds to the focus selector at the first location of the first media control on the display; and,
in response to detecting the third press input:
determining whether an intensity of the third contact is above the first intensity threshold;
in accordance with a determination that the intensity of the third contact is above the first intensity threshold, presenting the media content at the second playback speed; and,
in accordance with a determination that the intensity of the third contact is below the first intensity threshold, increasing the playback speed of the media content from the still image up to the second playback speed according to the intensity of the third contact.

11. The electronic device of claim 8, wherein the one or more programs include instructions for:
while presenting the media content at a normal playback speed, detecting a third press input by a third contact distinct from the first contact on the touch-sensitive surface that corresponds to the focus selector at a second location of a second media control on the display, wherein the second media control is distinct from the first media control;
determining whether an intensity of the third contact is above the first intensity threshold;
in accordance with a determination that the intensity of the third contact is above the first intensity threshold, presenting the media content at a first fractional playback speed, wherein the first fractional playback speed is faster than the normal playback speed and less than two times the normal playback speed; and,
in accordance with a determination that the intensity of the third contact is below the first intensity threshold, maintaining presentation of the media content at the normal playback speed.

12. The electronic device of claim 11, wherein the one or more programs include instructions for:
while continuing to detect the third contact on the touch-sensitive surface:
detecting that the intensity of the third contact is above the second intensity threshold distinct from the first intensity threshold; and,
in response to detecting that the intensity of the third contact is above the second intensity threshold, presenting the media content at a second fractional playback speed, wherein the second fractional playback speed is faster than the first fractional playback speed and less than two times the normal playback speed.

13. The electronic device of claim 11, wherein the one or more programs include instructions for:
in response to detecting the second press input, displaying a fractional playback scrubber at least partially overlaid on the second media control that indicates a current playback speed of the media content.

14. The electronic device of claim 11, wherein the second media control corresponds to at least one of: a play control and a pause control.

15. A non-transitory computer readable storage medium storing one or more programs, the one or more programs comprising instructions which, when executed by an electronic device with a display, a touch-sensitive surface, and one or more sensors to detect intensities of contacts with the touch-sensitive surface, cause the electronic device to:
while presenting media content at a first non-zero playback speed, detect a press input by a first contact on the touch-sensitive surface that corresponds to a focus selector at a first location of a first media control on the display; and,
in response to detecting the press input:
determine whether an intensity of the first contact is above a first intensity threshold;
in accordance with a determination that the intensity of the first contact is above the first intensity threshold, present the media content at a second playback speed, wherein the second playback speed is faster than the first non-zero playback speed; and,
in accordance with a determination that the intensity of the first contact is below the first intensity threshold, maintain presentation of the media content at the first non-zero playback speed;
while presenting the media content at the second playback speed and after the first contact ends, detect a second press input by a second contact distinct from the first contact on the touch-sensitive surface that corresponds to the focus selector at the first location of the first media control on the display;
in response to detecting the second press input, determine whether an intensity of the second contact has crossed a second intensity threshold that is above the first intensity threshold;
while continuing to detect the second contact on the touch-sensitive surface, and in accordance with a determination that the intensity of the second contact has crossed above the second intensity threshold:

provide tactile output that corresponds to the second intensity threshold; and present the media content at a third playback speed greater than the second playback speed; and, in accordance with a determination that the intensity of the second contact has not crossed above the second intensity threshold, forgo provision of the tactile output that corresponds to the second intensity threshold and continue to present the media content at the second playback speed.

16. The non-transitory computer readable storage medium of claim 15, including instructions which, when executed by the electronic device, cause the electronic device to:

in response to detecting the press input:

in accordance with the determination that the intensity of the first contact has crossed above the first intensity threshold, provide tactile output that corresponds to the first intensity threshold; and, in accordance with the determination that the intensity of the first contact has not crossed above the first intensity threshold, forgo provision of the tactile output that corresponds to the first intensity threshold.

17. The non-transitory computer readable storage medium of claim 15, including instructions which, when executed by the electronic device, cause the electronic device to:

while presenting a still image that corresponds to the media content, detect a third press input by a third contact distinct from the first contact on the touch-sensitive surface that corresponds to the focus selector at the first location of the first media control on the display; and, in response to detecting the third press input:

determine whether an intensity of the third contact is above the first intensity threshold;

in accordance with a determination that the intensity of the third contact is above the first intensity threshold, present the media content at the second playback speed; and, in accordance with a determination that the intensity of the third contact is below the first intensity threshold, increase the playback speed of the media content from the still image up to the second playback speed according to the intensity of the third contact.

18. The non-transitory computer readable storage medium of claim 15, including instructions which, when executed by the electronic device, cause the electronic device to:

while presenting the media content at a normal playback speed, detect a third press input by a third contact distinct from the first contact on the touch-sensitive surface that corresponds to the focus selector at a second location of a second media control on the display, wherein the second media control is distinct from the first media control;

determine whether an intensity of the third contact is above the first intensity threshold;

in accordance with a determination that the intensity of the third contact is above the first intensity threshold, present the media content at a first fractional playback speed, wherein the first fractional playback speed is faster than the normal playback speed and less than two times the normal playback speed; and, in accordance with a determination that the intensity of the third contact is below the first intensity threshold, maintain presentation of the media content at the normal playback speed.

19. The non-transitory computer readable storage medium of claim 18, including instructions which, when executed by the electronic device, cause the electronic device to:

while continuing to detect the third contact on the touch-sensitive surface:

detect that the intensity of the third contact is above the second intensity threshold distinct from the first intensity threshold; and, in response to detecting that the intensity of the third contact is above the second intensity threshold, present the media content at a second fractional playback speed, wherein the second fractional playback speed is faster than the first fractional playback speed and less than two times the normal playback speed.

20. The non-transitory computer readable storage medium of claim 18, including instructions which, when executed by the electronic device, cause the electronic device to:

in response to detecting the second press input, display a fractional playback scrubber at least partially overlaid on the second media control that indicates a current playback speed of the media content.

21. The non-transitory computer readable storage medium of claim 18, wherein the second media control corresponds to at least one of: a play control and a pause control.

* * * * *